US012521314B2

(12) United States Patent
Duda et al.

(10) Patent No.: US 12,521,314 B2

(45) Date of Patent: Jan. 13, 2026

(54) PILL DISPENSERS, SYSTEMS AND/OR METHODS

(71) Applicant: Richard J. Freedland, Mountain View, CA (US)

(72) Inventors: W. Gregory Duda, Grass Valley, CA (US); Richard J. Freedland, Mountain View, CA (US); Alex Moraru, Aptos, CA (US); Milton R. Grinberg, Palo Alto, CA (US)

(73) Assignee: Richard J Freedland, Mountain View, CA (US)

( * ) Notice: Subject to any disclaimer, the term of this patent is extended or adjusted under 35 U.S.C. 154(b) by 764 days.

(21) Appl. No.: 17/839,428

(22) Filed: Jun. 13, 2022

(65) Prior Publication Data

US 2022/0313558 A1 Oct. 6, 2022

Related U.S. Application Data

(63) Continuation-in-part of application No. 16/792,737, filed on Feb. 17, 2020, now Pat. No. 11,357,704, which is a continuation of application No. 15/175,513, filed on Jun. 7, 2016, now Pat. No. 10,561,580.

(60) Provisional application No. 63/210,069, filed on Jun. 13, 2021.

(51) Int. Cl.

| | |
|---|---|
| ***A61J 7/00*** | (2006.01) |
| ***A61J 1/00*** | (2023.01) |
| ***A61J 1/03*** | (2023.01) |
| ***A61J 7/04*** | (2006.01) |
| ***B65D 83/04*** | (2006.01) |

(52) U.S. Cl.

CPC ............... *A61J 7/0084* (2013.01); *A61J 1/00* (2013.01); *A61J 1/03* (2013.01); *A61J 7/0418* (2015.05); *A61J 7/0427* (2015.05); *A61J 7/0454* (2015.05); *A61J 7/0481* (2013.01); *B65D 83/04* (2013.01)

(58) Field of Classification Search

CPC .... A61J 7/84; A61J 7/418; A61J 7/427; A61J 7/454; A61J 7/00; A61J 7/03; A61J 7/481; A61J 7/04; A61J 1/00; A61J 1/03; A61J 7/0481; B65D 83/04

USPC ............................................................ 221/12

See application file for complete search history.

(56) References Cited

U.S. PATENT DOCUMENTS

| | | | | |
|---|---|---|---|---|
| 3,276,636 A * | 10/1966 | Johnson, Jr. ....... | B65D 83/0409 | 221/266 |
| 4,505,381 A * | 3/1985 | Major .................. | B65G 47/261 | 198/781.04 |
| 4,674,651 A * | 6/1987 | Scidmore .............. | A61J 7/0481 | 221/9 |
| 4,677,283 A * | 6/1987 | Lewis ....................... | A61J 7/02 | 198/383 |

(Continued)

FOREIGN PATENT DOCUMENTS

| | | | |
|---|---|---|---|
| EP | 2975233 A1 * | 1/2016 | ........... F01N 3/2066 |
| WO | WO-02063554 A1 * | 8/2020 | ............. B65B 57/20 |

*Primary Examiner* — Rakesh Kumar

(74) *Attorney, Agent, or Firm* — Peter B Scull

(57) ABSTRACT

Pill dispenser devices, systems and methods are shown and/or described herein. Include are a method, device or system for pill delivery including disposing a pill at a known location; contacting the pill with a pick-up member; and, moving the pill from the known location by movement of the pick-up member.

19 Claims, 49 Drawing Sheets

(56) References Cited

U.S. PATENT DOCUMENTS

| | | | | | |
|---|---|---|---|---|---|
| 4,811,764 | A * | 3/1989 | McLaughlin | A61J 7/0084 | 141/105 |
| 4,838,453 | A * | 6/1989 | Luckstead | A61J 7/0481 | 221/83 |
| 5,317,645 | A * | 5/1994 | Perozek | G06M 11/00 | 382/141 |
| 5,323,929 | A * | 6/1994 | Marlar | A61J 7/0481 | 221/121 |
| 5,463,839 | A * | 11/1995 | Stange | B65B 5/103 | 53/504 |
| 5,638,417 | A * | 6/1997 | Boyer | B65B 37/04 | 377/6 |
| 5,671,262 | A * | 9/1997 | Boyer | G06M 1/101 | 377/6 |
| 5,860,563 | A * | 1/1999 | Guerra | G07F 9/002 | 221/172 |
| 6,053,302 | A * | 4/2000 | Leu | G06M 11/00 | 198/803.5 |
| 6,378,858 | B1 * | 4/2002 | Suga | B65H 3/5261 | 271/10.01 |
| 6,510,962 | B1 * | 1/2003 | Lim | G07F 17/0014 | 700/243 |
| 6,622,887 | B1 * | 9/2003 | Roediger | G07F 11/44 | 221/13 |
| 6,732,884 | B2 * | 5/2004 | Topliffe | A61J 7/0481 | 221/121 |
| 7,149,600 | B2 * | 12/2006 | Rippolone | G06Q 10/087 | 221/12 |
| 7,225,597 | B1 * | 6/2007 | Knoth | B65B 5/103 | 53/244 |
| 7,922,167 | B2 * | 4/2011 | Kajiyama | B65H 5/36 | 271/4.01 |
| 8,083,078 | B2 * | 12/2011 | Omura | G07F 11/38 | 211/59.3 |
| 8,108,068 | B1 * | 1/2012 | Boucher | G01G 17/00 | 700/240 |
| 8,225,925 | B2 * | 7/2012 | Bassani | B65B 57/20 | 198/758 |
| 8,712,268 | B2 * | 4/2014 | Iwasaki | G03G 15/2064 | 399/329 |
| 9,043,015 | B2 * | 5/2015 | Ratnakar | A61J 7/0445 | 700/244 |
| 9,492,355 | B2 * | 11/2016 | Ratnakar | G16H 20/13 | |
| 9,542,534 | B1 * | 1/2017 | Ducatt | G07F 9/002 | |
| 9,984,213 | B2 * | 5/2018 | Howieson | A61B 5/1176 | |
| 11,498,761 | B1 * | 11/2022 | Wijnia | G07F 11/16 | |
| 2003/0024943 | A1 * | 2/2003 | MacDonald | G07F 17/0092 | 221/92 |
| 2006/0006190 | A1 * | 1/2006 | Janet | G07F 17/0092 | 221/211 |
| 2006/0071011 | A1 * | 4/2006 | Varvarelis | A61J 7/0481 | 221/9 |
| 2009/0218363 | A1 * | 9/2009 | Terzini | B65B 5/103 | 221/4 |
| 2009/0321470 | A1 * | 12/2009 | Knoth | B65B 5/103 | 221/7 |
| 2010/0256808 | A1 * | 10/2010 | Hui | G07F 17/0092 | 221/133 |
| 2010/0318218 | A1 * | 12/2010 | Muncy, Jr. | G16H 20/13 | 221/199 |
| 2011/0088810 | A1 * | 4/2011 | Cicognani | B65B 35/14 | 141/192 |
| 2012/0072017 | A1 * | 3/2012 | Kim | B65B 57/20 | 700/231 |
| 2013/0270291 | A1 * | 10/2013 | Omura | A61J 7/0084 | 221/92 |
| 2014/0138398 | A1 * | 5/2014 | Daniels | B65D 83/04 | 221/202 |
| 2014/0353327 | A1 * | 12/2014 | Bae | G07F 17/0092 | 221/12 |
| 2014/0358278 | A1 * | 12/2014 | Zhang | G16H 20/13 | 700/240 |
| 2015/0175287 | A1 * | 6/2015 | Tidhar | B65B 57/14 | 700/240 |
| 2016/0109273 | A1 * | 4/2016 | LaFosse | G01F 11/24 | 222/71 |
| 2016/0247345 | A1 * | 8/2016 | Ratnakar | G16H 70/40 | |
| 2016/0346167 | A1 * | 12/2016 | Littman | G07F 11/44 | |
| 2020/0022876 | A1 * | 1/2020 | Anderson | A61J 7/0445 | |
| 2020/0134962 | A1 * | 4/2020 | Debarge | G07F 17/0092 | |

* cited by examiner

FIG.13H
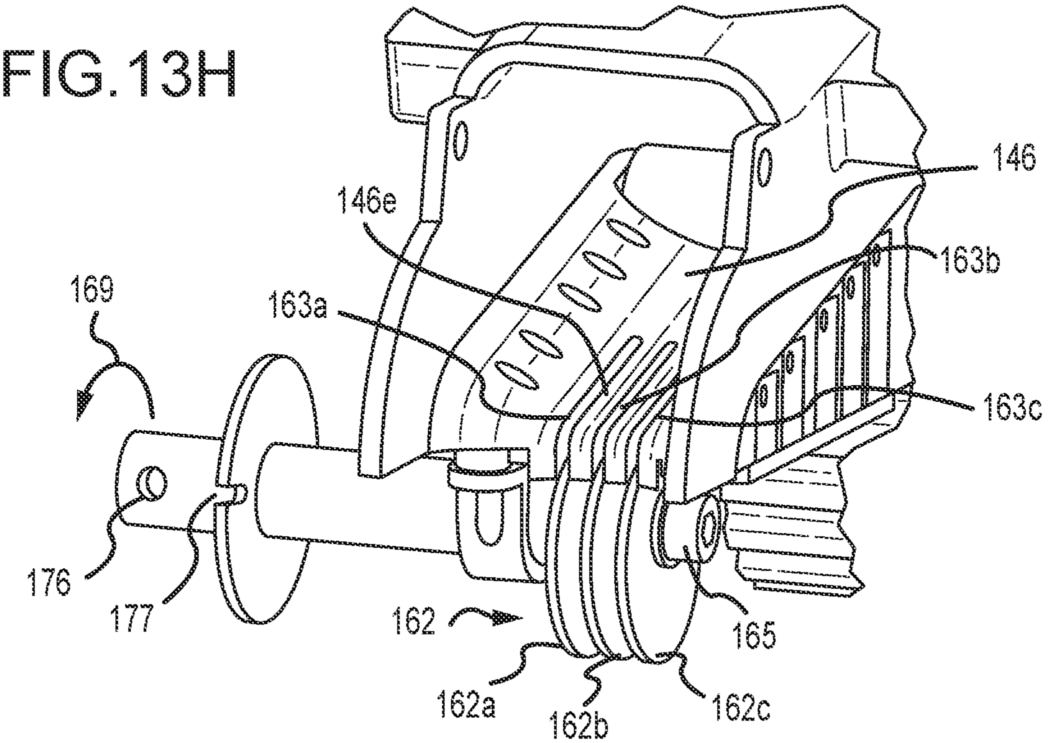
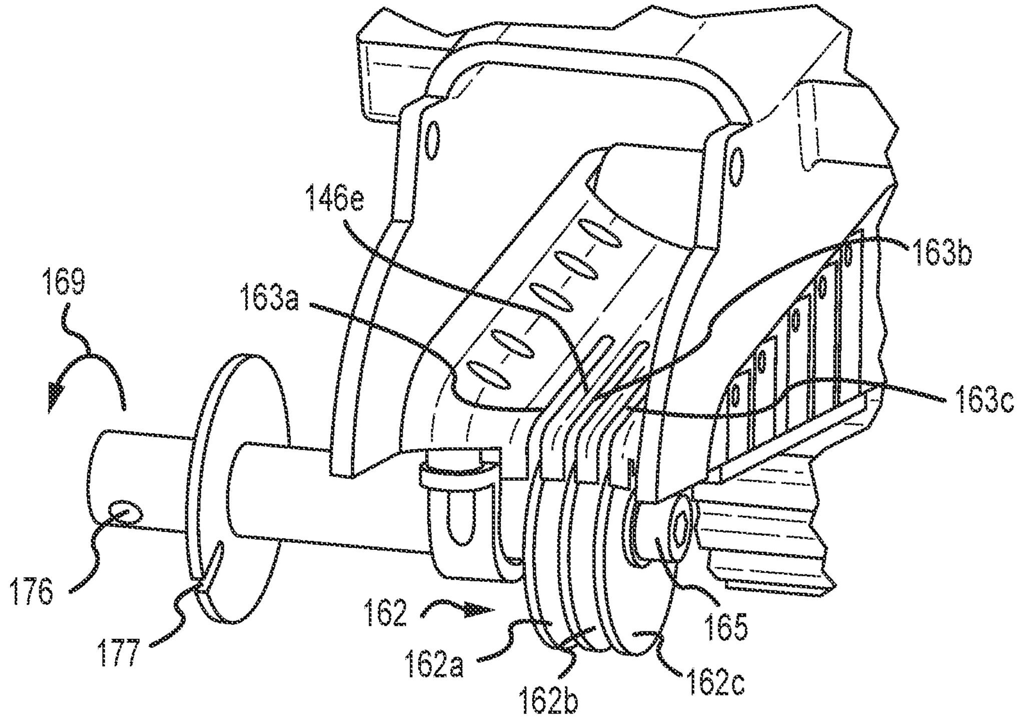
FIG.13I

PILL DISPENSERS, SYSTEMS AND/OR METHODS

BACKGROUND

The usage of pills, both prescription drugs and supplements, to regain and/or maintain health has increased with the advancement of medical science. It is not unusual for a person to take more than one type of pill, or to have different regimens and timings for taking same. Often, each type of pill may be in a different amount, and though typically may be at regular times each day; some may be early, others late, some with food, some not, and so on. The tasks of correctly taking pills, often several different types of pills, regularly, pose challenges to many individuals, especially the elderly population living without full time medical care. The improper taking of pills can be detrimental to health resulting in emergency room visits, hospital admissions, relocation to nursing facilities and even sometimes death.

The need for devices, systems and/or methods that will provide for properly dispensing the proper pill(s) in the proper amount(s) at the proper time(s) each day is evident. Moreover, several possible/optional desiderata for further options of automations and programmability in dispensing and/or in alerting the user to take the dispensed pill(s) are also evident.

This statement of background is for information purposes only and is not intended to be a complete or exhaustive explication of all potentially relevant background art.

SUMMARY

Briefly summarized, devices, methods, and systems of the presently disclosed subject matter are directed to devices and/or methods configured to accurately and timely dispense selected pills for consumption by a patient. Thus, pill dispenser devices, systems and/or methods are shown and/or described herein. Further, Included are methods, devices and/or systems for pill delivery including disposing a pill at a known location; contacting the pill with a pick-up member; and, moving the pill from the known location by movement of the pick-up member.

BRIEF DESCRIPTION OF DRAWINGS

FIGS. 13F, 13G, 13H, 13I, 13J, 13K, 13L, 13M, 13N, and 13O provide partially cut-away isometric and elevational views, of some interior components of an alternative pill dispenser according hereto;

DETAILED DESCRIPTION

The present developments relate to automatic or automated pill dispensers. In many implementations, these may particularly include and/or be directed to methods, systems and/or devices which may be programmed to automatically dispense a particular pill or particular quantities and/or selected types of pills whether on demand or at preset times.

The presently-described subject matter may be configured to provide for dispensing proper amount(s) of proper type(s) of pill(s) at proper time(s).

In some implementations the subject matter hereof may provide for alerting a pill taker to consume the pills. In further possible implementations, the subject matter hereof may also include apparatuses and/or methods for notifying family members, caregivers, and/or medical professionals (e.g. in some instances these can include those professionals making, or in some situations those not making the change) when a change has been made to any pill regimen or dosage. This can be very helpful particularly for seniors and the elderly who may have more than one doctor or medical professional prescribing medication.

Figure 1A:
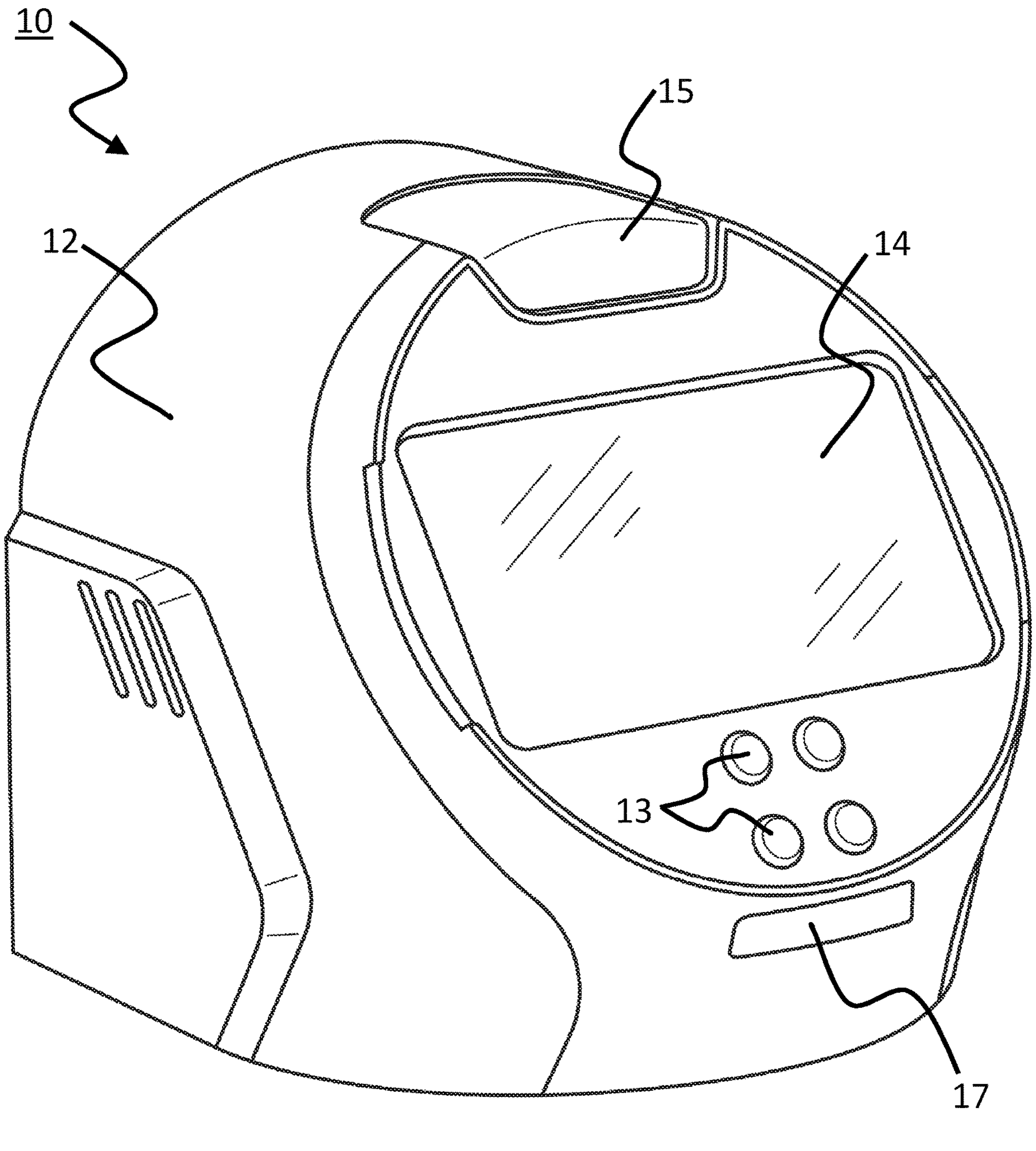
FIGS. 1A, 1B and 1C, provide front isometric views of an alternative pill dispenser hereof.
Figure 1B:
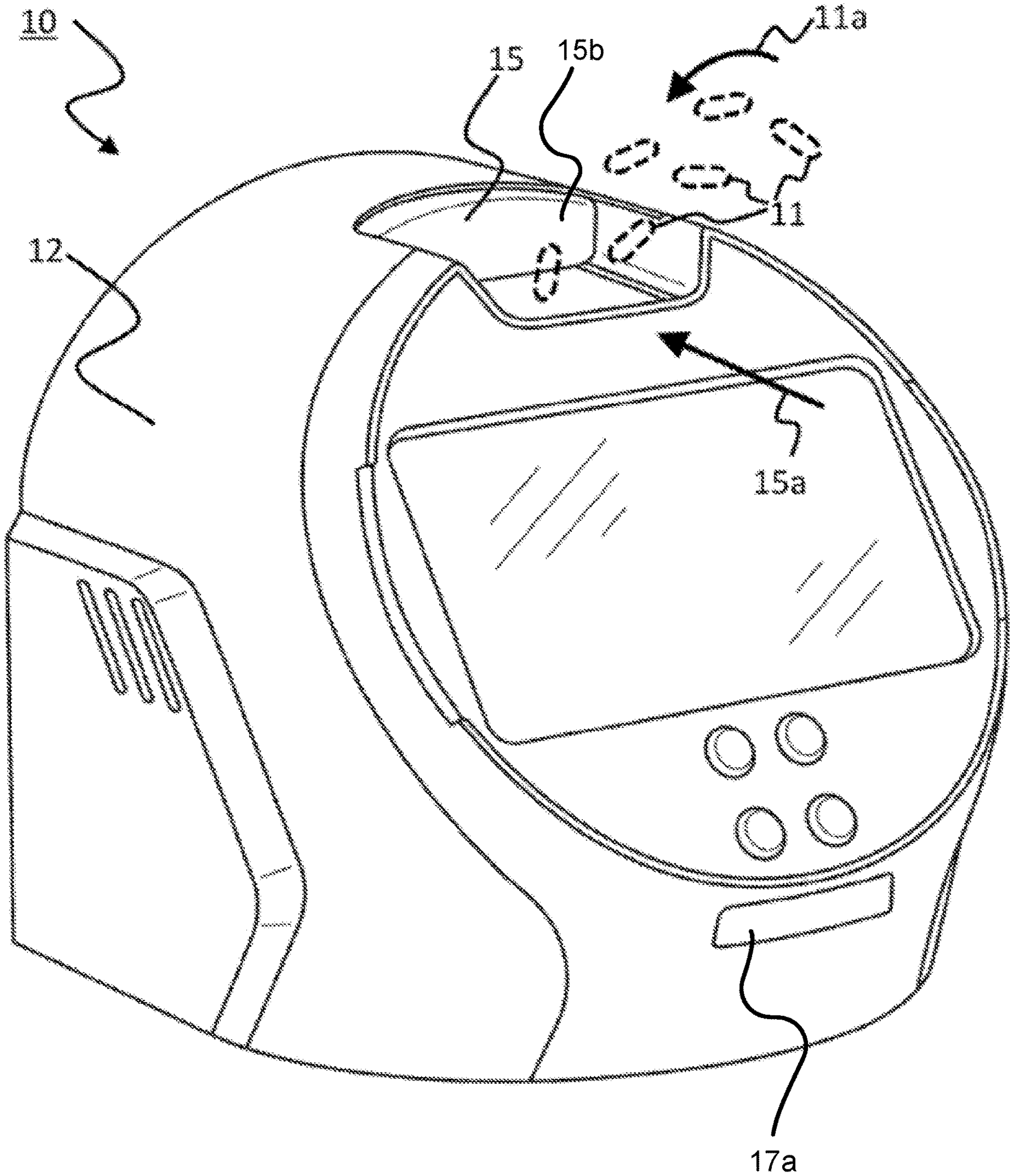
Figure 1C:
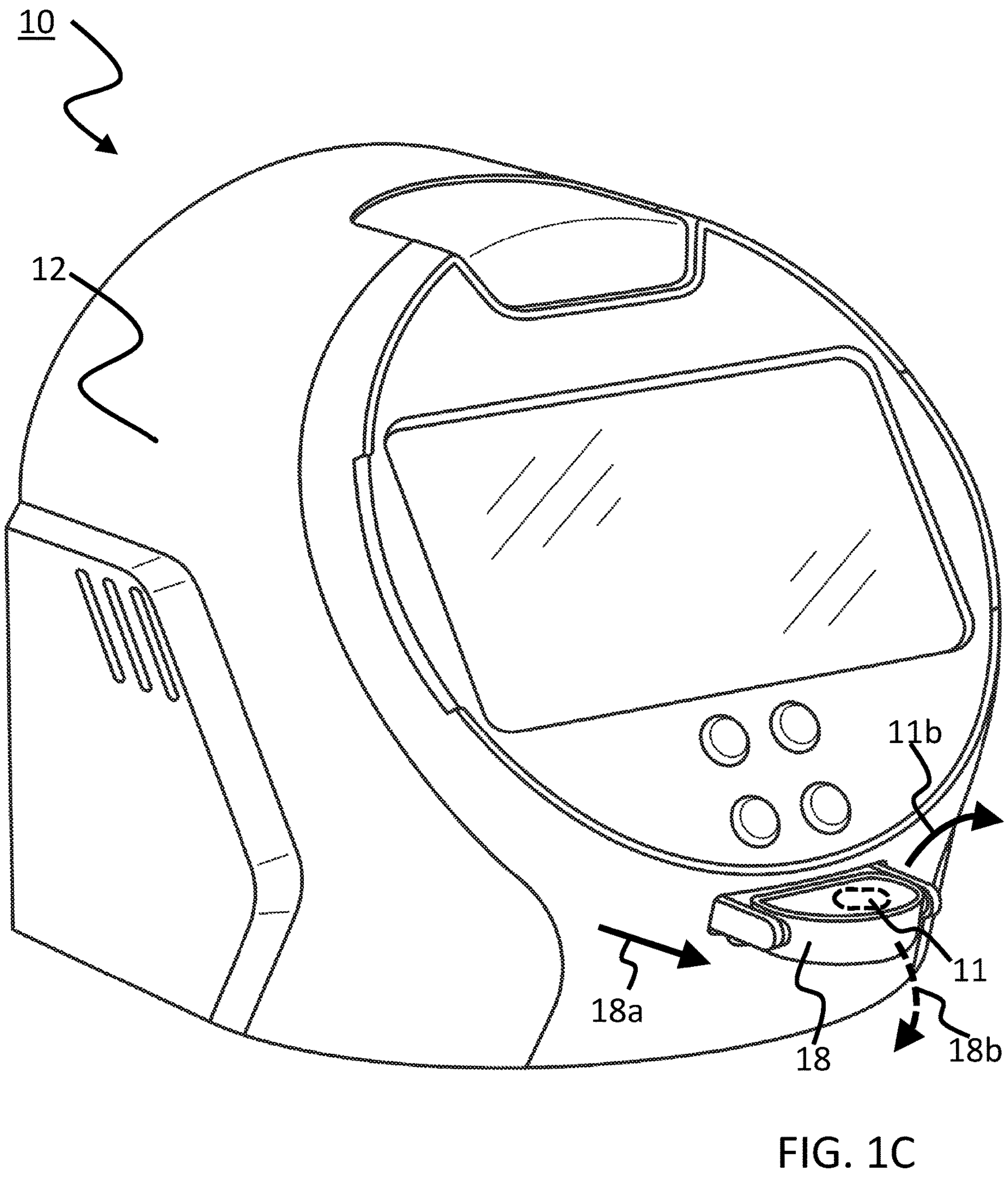

In accordance herewith, an isometric front view of a schematically-represented, alternative pill dispenser 10 according hereto is shown in FIGS. 1A, 1B and 1C. Myriad other forms of pill dispensers may fit within the scope hereof with no requirement to be limited to the implementations shown, whether in FIG. 1A, 1B, or 1C, or otherwise; limited only by the proper scope of the claims appended hereto.

More particularly, the alternative implementation of FIG. 1A, 1B, or 1C, may include a housing 12, a set of one or more buttons 13, a user interface or display 14, and one or more openings or apertures 15, 17, each of which are described in more detail herein.

For example, FIG. 1A shows a pill dispenser 10 including a housing 12 and a user interface 14, which may be a touchscreen or otherwise and/or may provide visually and/or aurally perceived communications to a user, and if a touchscreen or otherwise may receive communications from a user. A set of one or more buttons 13 may also/alternatively be provided for user interaction, input or the like, though again, same might be provided by touchscreen or other inputs, as for example from/through wireless or cabled communications, USB, Wi-Fi, or Bluetooth® or otherwise (none of which here shown) to and/or from the device 10.

Further shown are respective openings or apertures 15 and 17 in and/or through the housing 12; represented here by a slidable door 15*b* and an aperture 17 that may also include a door (slidable or otherwise) or other covering 17*a*. In the presently described and shown implementation of FIG. 1A, 1B, or 1C, inter alia, the door 15*b* is slidable toward the rear (as indicated by arrow 15*a*; FIG. 1B) to an open position as shown in FIG. 1B, to provide for ingress for one or more pills 11 (six exemplar pills 11 shown in dashed lines) (ingress, as indicated generally by arrow 11*a* in FIG. 1B). Such pills 11 are received within one or more particular bins 44 as described further below.

Then, ultimately, per the operation of the device 10 (described further below), one or more pills 11 will be delivered to the user as shown by/in FIG. 1C. In FIG. 1C, shown is a movement of a pill cup 18 having a pill 11 (only one pill 11 shown in FIG. 1C) therein moved out translationally from the interior of the dispenser 10 (as represented by arrow 18*a*) ready for removal by a user (see arrow 11*b*). Note, the cup 18 may be, as shown in one interpretation of FIG. 1C, pivotally disposed to allow for optional tilting thereof (as shown by dashed line arrow 18*b*; down to the front for one option of an ultimate delivery). In some implementations the cup 18 may be detached, disconnected and/or removed from its location and/or disposition to the device 10, to provide a vessel for transporting the one or more pills 11 to a patient for consumption.

Figure 2:
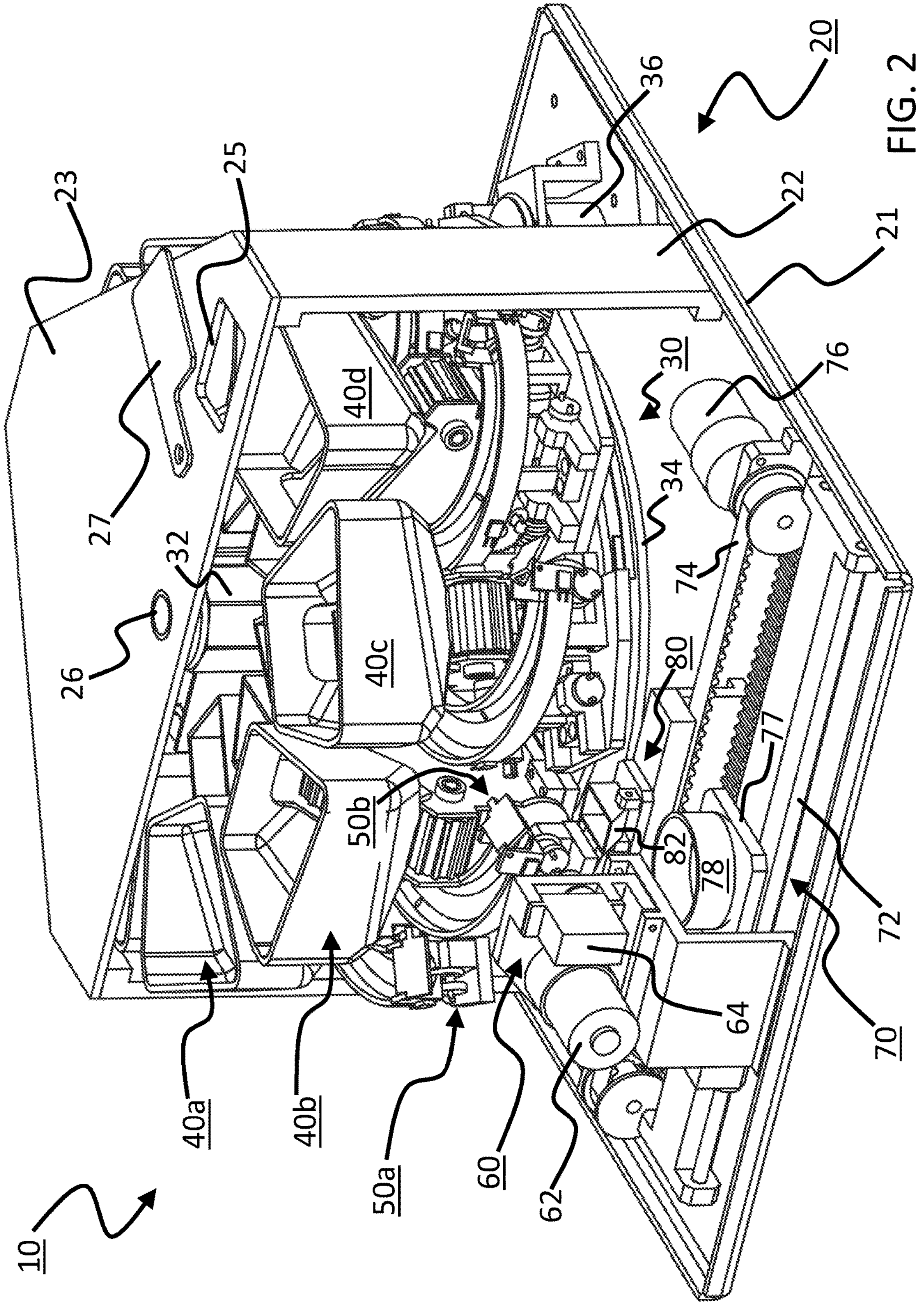
FIG. 2 provides a partially cut-away isometric view of many interior components of an alternative pill dispenser according hereto.

An isometric view of many alternatively-implemented internal working components of a pill dispenser 10 hereof is shown in FIG. 2. FIG. 2 shows some of the major components of a pill dispenser 10 which may in this implementation, inter alia, include disposed in and operationally connected to a frame sub-assembly 20, an operationally rotationally movable sub-assemblage 30 on or to which is/are disposed one or more pill handling sub-assembly/ies 40; though shown in FIG. 2 are respective such sub-assemblies 40*a*, 40*b*, 40*c* and 40*d*, a separate representative assembly 40 not shown in FIG. 2, but being shown in FIGS. 4A and 5A, inter alia, below (reference to any assembly 40 includes the one or more or all of the other possible sub-assemblies 40*a*, 40*b*, 40*c* and/or 40*d* or others not shown, or separately identified). Each sub-assembly 40 has a pill control sub-assembly 50 (described further below; see FIGS. 4A and 5A, inter alia; reference to any assembly 50 includes the one or more or all of the other possible sub-assemblies 50*a*, and/or 50*b* of FIG. 2 or others not shown, or separately identified); though shown in FIG. 2 are respective such sub-assemblies 50*a* and 50*b*, a separate representative assembly 50 not shown in FIG. 2. Still further sub-assemblies, including a motor sub-assembly 60; a belt-driven, cup moving sub-assembly 70 and a scale sub-assembly 80 are also shown in FIG. 2; these are described further below.

Figure 3:
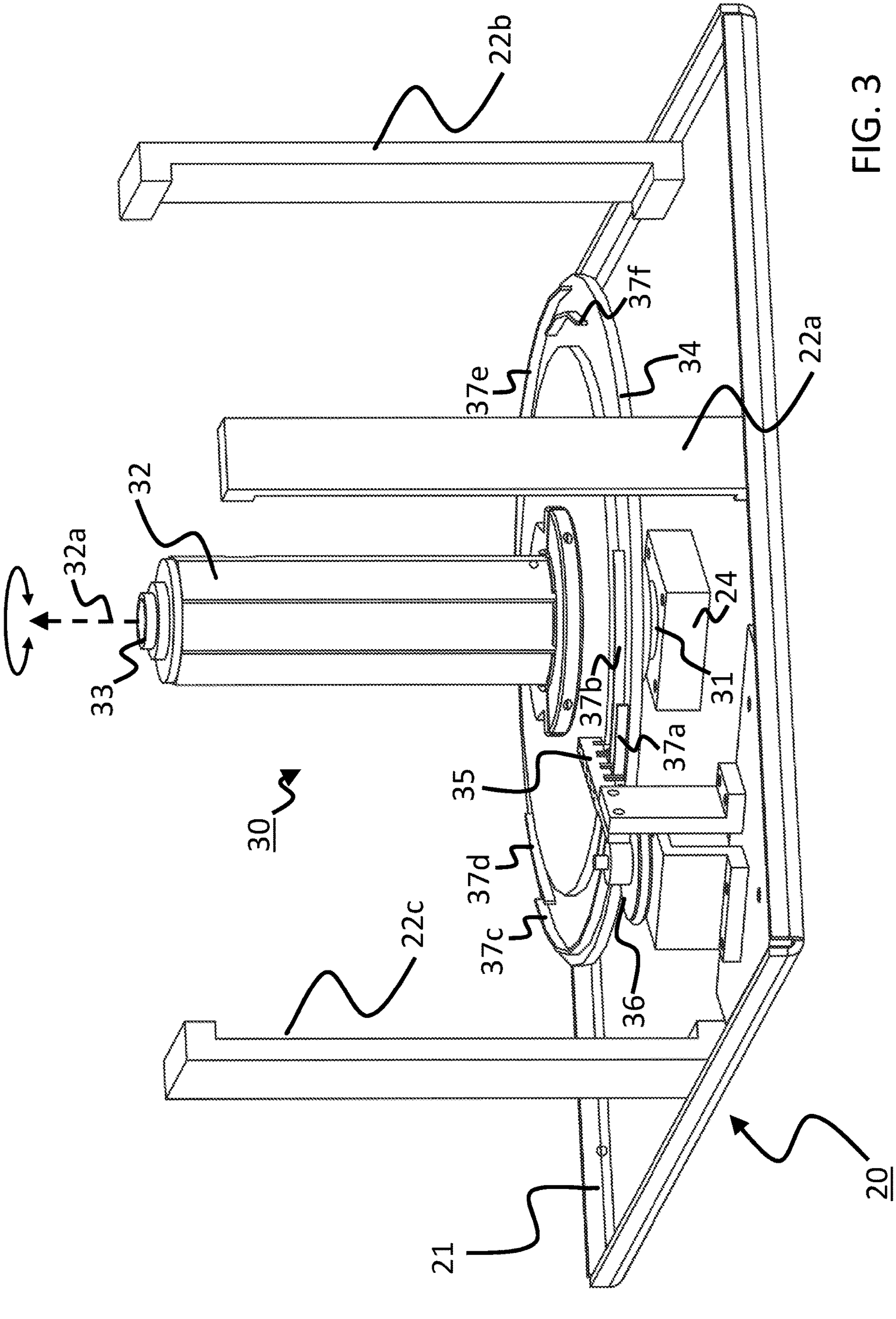
FIG. 3 provides an isometric view of some interior components of an alternative pill dispenser according hereto.

As shown at least in FIGS. 2 and 3, the frame sub-assembly 20 may include a main base plate 21 to which may be affixed one or more support arm/s 22 (one such arm identified in FIG. 2); shown as respective arms 22*a*, 22*b* and 22*c* in FIG. 3 (reference to an arm 22 includes one or more or all of the sub-part arms 22*a*, 22*b* and/or 22*c*, unless otherwise specified). A frame top portion 23 is shown in FIG. 2 (but not in FIG. 3) with an aperture 25 defined therein; aperture 25 being disposed to receive passed therethrough one or more pills, such as pills 11 in FIG. 1A, 1B, or 1C, as these might initially be passed through a housing aperture 15 as described relative to FIG. 1A, 1B, or 1C (see particularly FIGS. 1A and 1B). An optional cover 27 may be included to alternately open or close the aperture 25; and, this may be separately motor-driven or spring-loaded or tied/connected to the top door 15*b* from FIG. 1A, 1B, or 1C, to open and/or close therewith or in some association thereto; noting that aperture 25 may thus be disposed underneath or immediately adjacent or otherwise communicative with door 15*b*/aperture 15 to provide for receiving pills to be passed therethrough to the pill assembly or assemblies 40 described below).

Two further frame sub-assembly components are also shown in FIGS. 2 and 3; relative fixed position connections 24 (lower, in FIG. 3) and 26 (upper, in FIG. 2) may be provided in the frame 20 to provide for rotational connection of shaft 32 of rotational sub-assembly 30 within and relative to frame 20. Lower rotational connection 24 might then be relatively fixed relative to the base, here base plate 21, and upper connection 26 might then be relatively fixed relative to the top frame portion 23. Rotational bearings or other rotationally-supportive structures may be implemented at such connections 24/26; allowing for fixing the shaft 32 in an appropriate or desirable rotational disposition (further described below).

Focusing next on the rotational sub-assemblage 30 as shown in FIGS. 2 and 3 (FIG. 3 being from the reverse side of that shown in FIG. 2 and without the other sub-assemblies 40, 50, 60, 70 and 80 disposed relative thereto), this may be disposed on/in the frame sub-assembly 20 and be rotational therewithin and relative thereto. Here, for example, the frame 20 is relatively fixed and the rotational parts of rotational sub-assembly 30 rotate relative thereto about the axis defined axially through and by the axis of the shaft 32 (axis of shaft 32 represented schematically by dashed arrow 32*a* in FIG. 3). Shaft 32 rotates relative to the fixed connection points 24/26 by/through the rotational contact disposition of its respective ends 31 and 33 (connection of rotational upper end 33 relative to frame point/connection 26 is not separately shown, but see rotational lower end 31 relative to fixed structure 24 in FIG. 3).

An optional turntable 34 and a motor 36 are also shown, at least partially, in FIG. 2, but in more detail in FIG. 3. In the shown implementation, turntable 34 is another rotational component or part of rotational sub-assembly 30 and is connected to shaft 32 to be rotatable/rotated therewith. Motor 36 may be, as shown in FIGS. 2 and 3, fixed to the frame 20, as on or adjacent base plate 21, but as shown here would engage the rotational components, one or both of the shaft 32 and/or turntable 34 to rotate same. Here shown is engagement of motor 36 with turntable 34, by which the motor rotates the turntable which in turn carries with it and rotates the shaft 32 about axis 32*a*. The rotational connection/communication may be one or more of many sorts and may include, inter alia, a belt drive (not shown), gears (not shown) or a frictional engagement of the motor 36 with a surface or edge of the table 34, as shown in FIG. 3, or shaft 32 (not shown).

The turntable, if used, may be used for, inter alia, spinning the shaft (see above); and/or for carrying a load (see alternative description relative to sub-assemblies 40 below); and/or may be used for positional control and/or sensing. For the latter, shown also in FIG. 3 is inclusion of an optional sensor array 35 that may also be disposed to operationally interface with one or more parts of an encoder wheel; see ridges or projections 37, which are referred to as "contacts" in wheel encoding terminology even in non-contact examples; hence, projections 37 may be referred to as contacts 37 hereafter. Contacts 37 are defined by and include the disparate contacts 37*a*, 37*b*, 37*c*, 37*d*, 37*e* and 37*f* shown in FIG. 3, inter alia (reference to one or more contacts 37 includes one or more or all of the sub-part contacts 37*a*, 37*b*, 37*c*, 37*d*, 37*e* and 37*f*, inter alia; potentially one or more not shown) to provide angular position information to control electronics or control system (described below). Array 35 can be optical (including in some implementations using "computer vision"), electrical (e.g., capacitive), magnetic, contact or other form of sensor array to sense corresponding indicia, here contacts, on the turntable or shaft or other part of the rotating sub-assembly. Though a variety of encoding options might be used (e.g., binary, et al.); in some alternatives, Gray encoding may be used.

In operation in short, when the turntable 34 is rotated, different combinations of contacts 37, or no contacts, will be disposed adjacent the sensor array 35 and the sensor array 35 may be disposed to sense the relative presence or absence of those none, one or more contacts 37 (again, including one or more sub-part contacts 37*a*, 37*b*, 37*c*, 37*d*, 37*e* and 37*f*, inter alia), and by that information determine the relative position of the table 34 and/or shaft 32, and by consequence any pill handlers 40 (as shown and described in FIG. 2, inter alia). By this, the control electronics or control system is configured to determine and thus will 'know' which of potentially one or more pill handling assemblies 40 is disposed at a particular location. In FIG. 3, it appears that only contacts 37*a* and 37*b* are in relative of range of sensing by the array 35, the other contacts 37*c*, 37*d*, 37*e* and 37*f*, inter alia, not being present there and thus not being sensed in this particular disposition. And, referring briefly back to the view of FIG. 2, inasmuch as any of the pill sub-assemblies can be rotated to the desired position; here, however, shown is pill sub-assembly 40*d* in pill receiving disposition below the aperture 25 for pills to be initially delivered thereto (see FIG. 1A) and pill sub-assembly 40*b* in the desired pill delivery position relative to motor assembly 60 and the scale receiver 82 of scale sub-assembly 80 (see FIGS. 4A and 5A, inter alia, described below); more details of the operation and relative dispositions of which to be provided below, the note being that a particular arrangement of contacts can be used to establish what pill-handling assembly 40 is disposed after rotation to be at the particular designated position for further operation/pill receiving and/or delivery. If and when a different pill or group of pills from/to a different pill-handling sub-assembly 40 is desired to be delivered or received, then, the motor 36 may actuated and thereby be used to rotate the overall rotatable sub-assembly 30 to move the newly desired pill handling assembly 40 to the required position for delivery or receipt. Note, a number of robust alternative rotary position sensors may be available and/or substituted herefor.

Further shown in FIG. 2, and to be described in further detail below are several parts of the pill delivery sub-assembly 50, motors 62 and 64 of motor sub-assembly 60, and for the cup moving sub-assembly 70, a rail 72, drive belt 74, motor 76, movable base 77 and cup 78 (which might be the same as cup 18 from FIG. 1C, though is shown in a slightly different non-pivotal implementation in FIG. 2, thus, re-numbered 78, here). Also shown is scale sub-assembly 80 with receiving/tilting cup 82, to be described further below.

Also included as introduced relative to FIG. 2 may be one or multiple pill storage and handling sub-assemblies 40 (shown as sub-assemblies 40*a*, 40*b*, 40*c* and 40*d* in FIG. 2). These sub-assemblies may, as shown in FIGS. 4A, 4B, 4C, 4D and 4E, et al., include one or more corresponding pill storage bins 44, one or more corresponding ridged conveyor belts 46, respective chutes or slides 48 and gate/delivery sub-assemblies 50 (all described further below), all of which being operationally fixed to or relative to a frame 42 and/or a base 41. These one or more pill storage and handling assemblies 40 are in this implementation attached to the central shaft 32 above the turntable, shown in FIGS. 2 and 3 and are thereby rotatable therewith. As introduced in FIG. 2, several such assemblies 40 are visible (see 40*a*, 40*b*, 40*c* and 40*d*, inter alia), though several more are not visible being disposed behind the visible examples and/or under the frame part 23. As shown, these may particularly be arranged when multiple such assemblies are used in or extending in a radial orientation about and extending out from the central shaft 32.

In some alternatives of connection of one or more of the pill handling assemblies 40 to the rotatable sub-assembly 30, a first note may be made of the several substantially flat surfaces presented by the shaft 32 of FIG. 3; such surfaces being so configured to readily accept connection by a rear surface 42*a* (see FIG. 4A, described below) of a sub-assembly 40, as by riveting, bolting, welding or some other fixation process, removable or not (numerous options beyond these may also be used). It may be alternatively that the base 41 is configured for attachment to the shaft 32, or may alternatively be configured for attachment to a turntable not unlike turntable 34 (though not likely with the encoder wheel implementation on the top side of the table as shown in FIG. 3; though could be if/when perhaps with an encoder wheel disposition on the bottom, or on a separate portion altogether or even optionally on a separate table separately attached to the shaft but, moving together therewith). Fixed or removable options for one or more assemblies 40 relative to rotatable assembly 30 are numerous and varied.

Figure 4A:
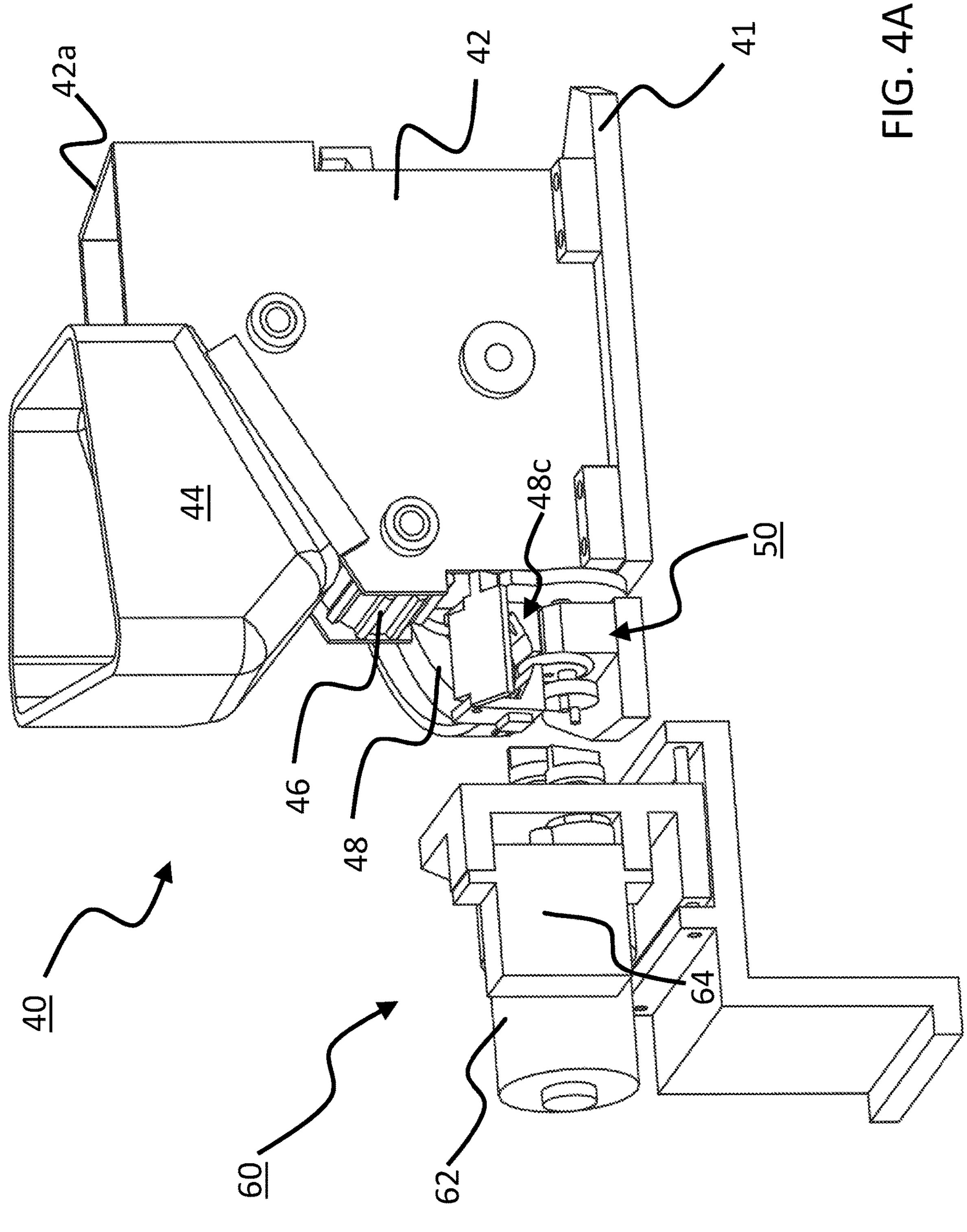
FIGS. 4A, 4B, 4C, 4D and 4E, provide isometric views of some interior components, some partially cut-away, of an alternative pill dispenser according hereto.
Figure 4B:
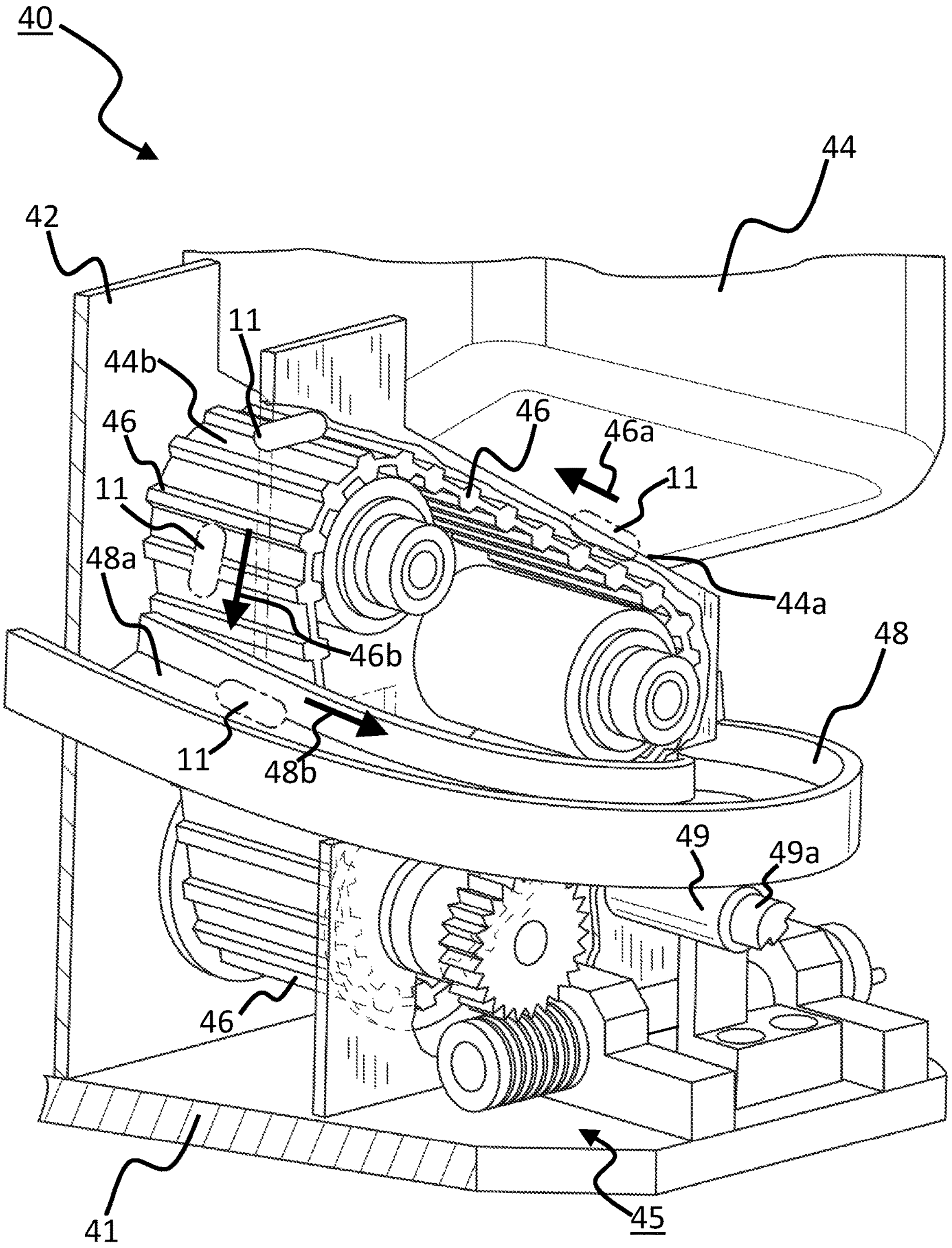

More details of pill storage and/or handling sub-assemblies 40 will now be described, with at least initial particular detail relative to FIGS. 4A-4E, inter alia. The pill storage bins 44, as introduced above, are open on the top to allow for pill loading (as from and through the aperture 25 in frame 20 (FIG. 2) as fed by and through the aperture 15 in the housing 12 (FIG. 1A, 1B, or 1C)). A section of and/or communicative with the interior of each storage bin 44 may include a motor driven conveyor belt 46 which receives and delivers a desired and/or programmed and/or small number of pills 11 to be placed into the corresponding pill trough or chute 48. This can be seen in further detail in FIG. 4B, for example, where one or more pills 11 may be picked up by the conveyor 46 in or from the bin 44, at or in the area or location 44*a*, carried by the conveyor belt 46 toward (see arrow 46*a*) and delivered at bin exit area or location 44*b* to a chute 48, often herein also referred to as a slide 48. In FIG. 4B, the conveyor lifts the pill or pills 11 out of the bin 44 (arrow 46*a*) and then delivers them to a location where the pill or pills 11 fall (see arrow 46*b*) from the conveyor belt 46 to the chute 48. Though a lifting conveyor is shown here, a relative lateral or even decline conveyor (neither shown) could instead be used in an appropriate arrangement.

A conveyor moving sub-assembly 45 may be as shown (unshown alternatives may be used instead). Such a conveyor moving sub-assembly 45 is shown in FIG. 4B, but in more detail in FIG. 4C (inasmuch as a portion of the chute/slide 48 is shown cut-away in FIG. 4C). A worm gear 45*a* is shown as it might be engaging a rotational gear 45*b* that spins a shaft or axle 45*c*. Axle 45*c* is operationally supported by side walls 42*b* and 42*c* and turns an internal toothed drum 45*d* (indicated partially by dashed lines as partially hidden by side wall 42*c* and indicated here with a dashed leader line) which in turn engages the interior ridges of the conveyor belt 46. Rotation of the worm gear 45*a* in the direction indicated by the arrow 45*e* causes the rotational gear 45*b* to rotate in the direction indicated by arrow 46*f*; this then causes the belt 46 to move as indicated by the arrow 46*c*. To get the worm gear 45*a* to turn, the shaft 43 is engaged by a motor 62 (shown in FIGS. 4A and 4D, but, not shown in any of the other sub-parts 4B, 4C or 4E). An engagement part 47 connected to the shaft 43 provides for the operational connection with motor 62 as described below.

First, returning to FIG. 4B, gravity may be used as shown to assist in delivery from the conveyor 46 to the chute 48, the pill or pills 11 falling the direction 46*b* from the conveyor 46 at the top or delivery end/location 44*b* thereof. The pill or pills 11 may then move along chute 48 as shown by arrow 48*b*. Here also, gravity may be used to assist in having the pill or pills 11 slide down the chute or slide 48, or the chute may be rather disposed for lateral movement or even upward movement depending upon circumstances and movement assist options that might be used. The pill or pills 11 would then be delivered to the pill delivery sub-assembly 50 described further below.

Figure 4C:
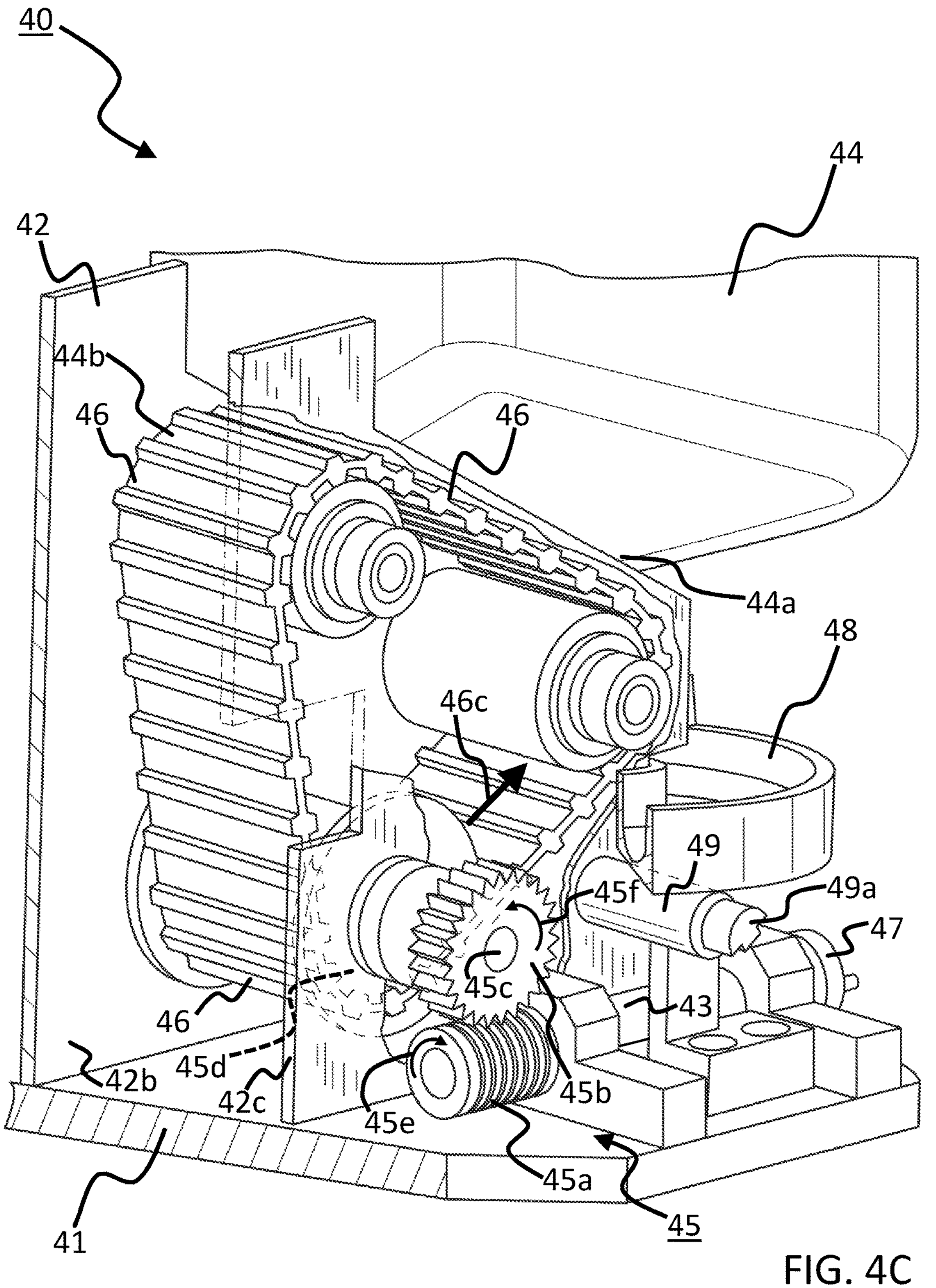

Also shown in FIGS. 4B and 4C is a vibratory motor 49 that may also be used to move a pill or pills 11 along the chute 46. In an example such as that shown in FIGS. 4B and 4C, the motor 49 may be a rotational motor attached or operationally connected to the chute 46 so that in rotating an end 49*a* projecting therefrom, particularly an eccentrically formed end 49*a* as shown may cause a rotational fluctuation that results in a vibration on chute 46. The vibration can then cause the pill or pills 11 to move in and along the chute 46. Other vibratory devices or other movement assist methods or devices might be used in addition or instead. Gravity may also be sufficient in some implementations. Note, in some implementations, the pill storage and movement assemblies 40 may be attached to the central shaft with a relatively flexible mount 42*a* as shown in FIG. 4A. A flexible mount may assist an electric vibrator 49 to agitate the respective pill storage and movement assembly 40 (referred to in other instances as a pill handling assembly) to cause the pills, having been placed near the top of the pill trough 48*a* after the conveyor belt motion, to travel (see arrow 48*b*) to the pill drop off location near the lower end 48*c* of the pill trough 48 (pill drop off location not shown in FIGS. 4B and 4C, but see FIGS. 4A, 4D and 4E, described further below). As described further below, the pills in a pill trough 48 align in the trough to form a single line, generally end to end, the leading pill being at the end of the trough or chute 48 at the pill drop off location (again, see FIGS. 4A, 4D and 4E). This final stationary position of the pill 11 at the lower end 48*c* of the trough 48 is sometimes also referred to herein as "The Known Location."

Figure 4D:
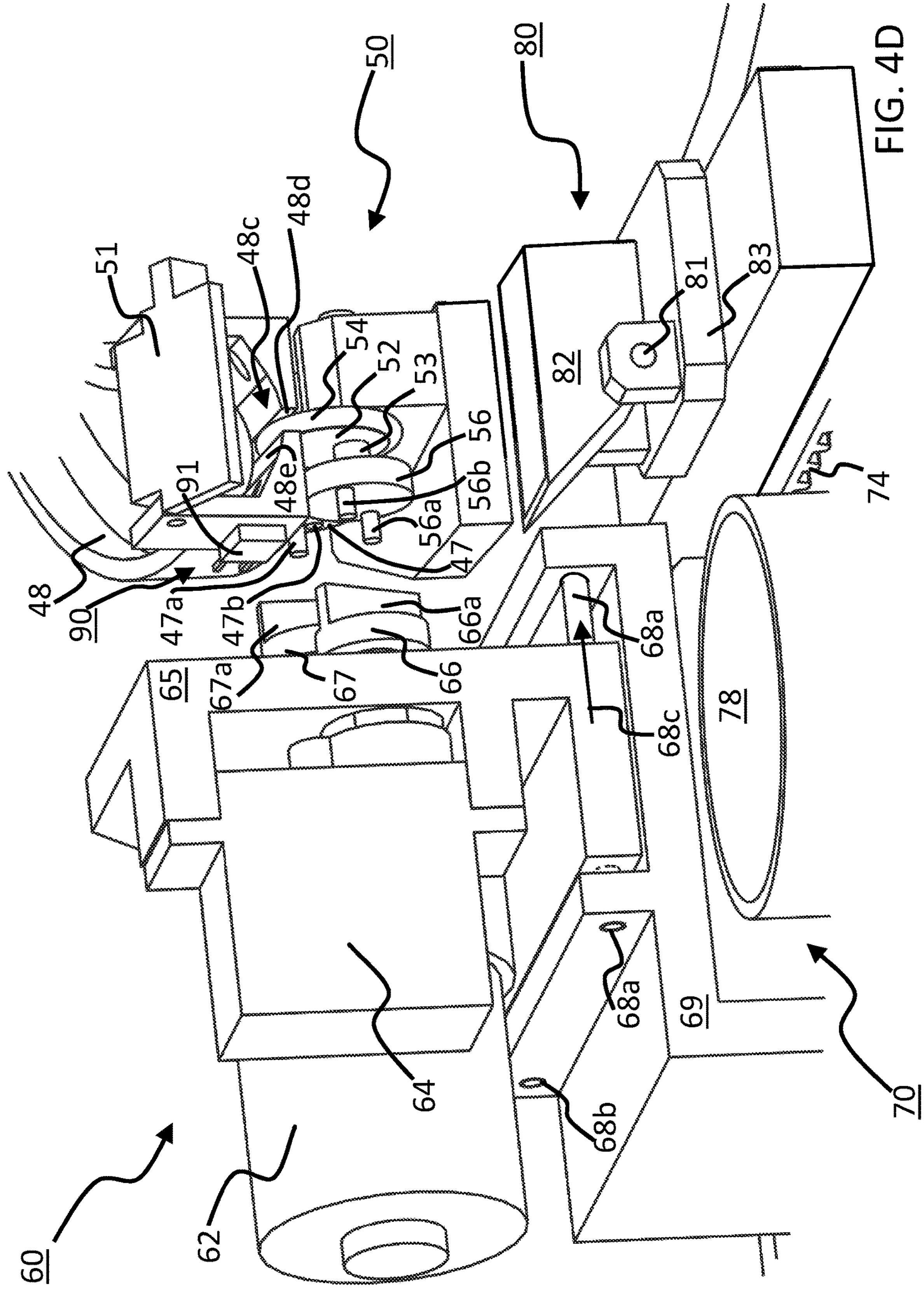
Figure 4E:
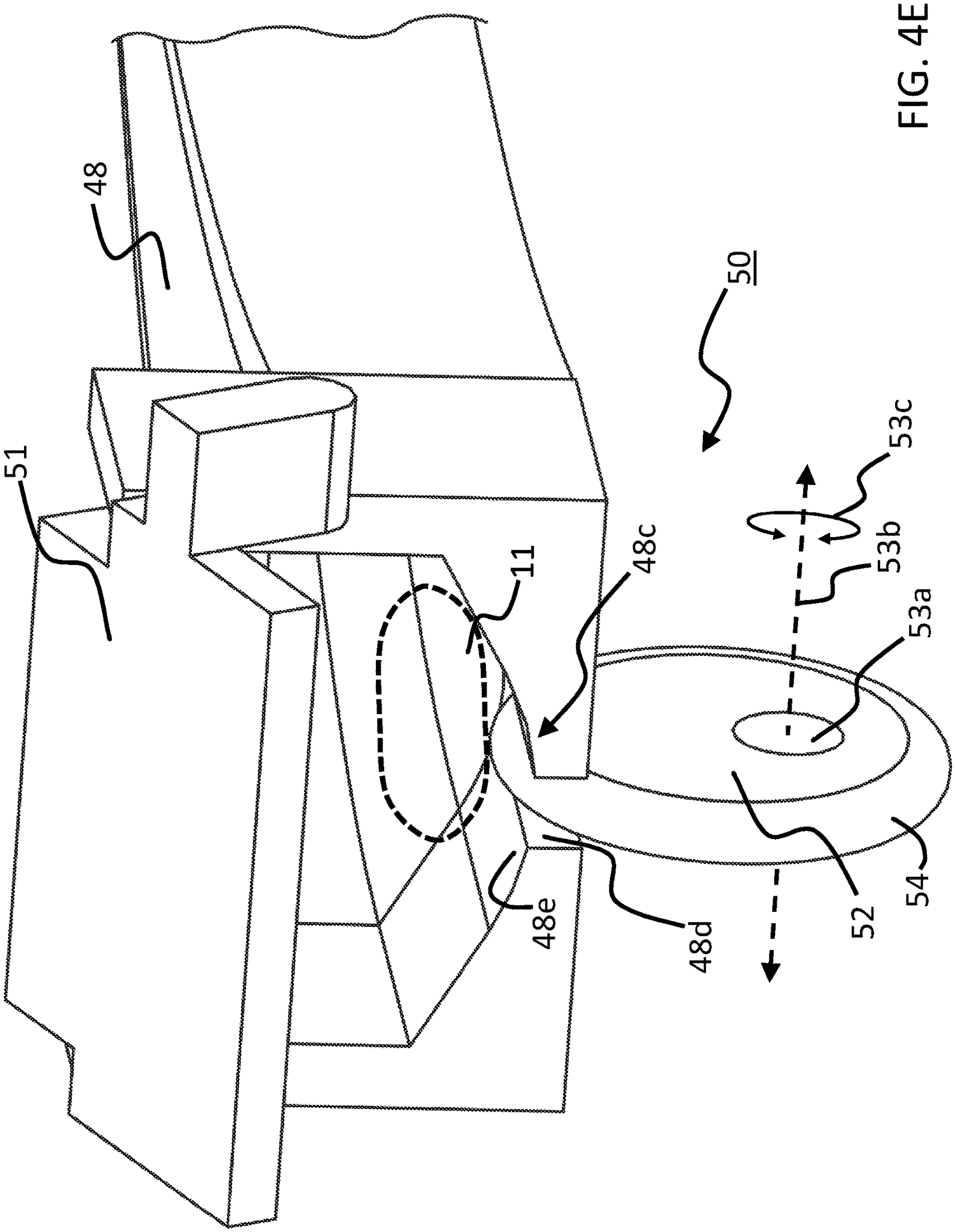

The Known Location 48*c* (as shown in FIGS. 4A, 4D, 4E, 5A, 5B, and 5C, inter alia) is thus disposed at and/or adjacent the pill gate or delivery sub-assembly 50 and more particularly at or adjacent the door 51 of sub-assembly 50. Though introduced above, sub-assembly 50 is shown in greater detail in FIGS. 4D and 4E; the pill delivery sub-assembly 50 being shown enlarged and isolated from most of the other elements/sub-assemblies in FIG. 4E, but isometrically is shown operationally adjacent and together with other operational features 48, 60, 70 and 80 (or at least one or more parts thereof) in FIG. 4D. The sub-assembly 50 may, as shown in FIGS. 4D and 4E, contain a gate or shutter 51 and a pick-up member 52, in the shown implementations also referred to as a delivery cam 52 (reference to either is intended to include the other herein). The shown implementation is of a rotational pick-up member 52, though non-rotational implementations may be used. Moreover, the shown implementation of cam 52 is as an off-center cam, the cam being rotatable on a relatively fixed axis, though off-center thereof so that alternately a smaller part and then a larger part of the cam is rotated to and/or relative to the known location 48*c*. The pick-up member or delivery cam 52 is shown being substantially and/or operationally near and disposed mostly below the lower end 48*c* of the pill trough or chute 48. The cam 52 is disposed relative to the chute 48 such that it is operatively movable within a slot 48*d* defined by opposing sidewalls within chute 48. The rotation of the cam 52 within the slot 48*d* is such that the cam 52 is at times disposed below the interior surface 48*e* of chute 48, and at other times at and at other times above the surface 48*e* of chute 48; surface 48*e* being only partially visible in FIG. 4D, but more visible in FIG. 4E.

Also shown in FIG. 4D is an axle or shaft 53 and an engaging surface 54, both being operationally connected to pick-up and/or delivery member or cam 52. In FIG. 4E, the engaging surface 54 is shown, but, the cam 52 includes only the aperture 53*a* in/through which the axle 53 is/would be disposed. An axis of rotation 53*b* is also shown in FIG. 4E with an indication at arrow 53*c* of rotation that may be used for the cam 52. The cam 52 may thus be operationally disposed upon an axle or shaft 53 which can then impart rotation to the cam 52 to such that the cam 52 may engage a single pill 11 (dashed line representation in FIG. 4E, not shown in FIG. 4D), regardless of practical size (practical sizing including and/or meaning within an appropriate human or other animal condition; not too big to be delivered to the human or animal, and not too small to not be readily manipulatable for ordinary use), may be moved off the end of the trough or chute 48 and fall by gravity to the scale and/or dispensing sub-assemblies 80/70 as described further below, particularly with regard to FIGS. 5A, 5B, 5C, 5D, 5E, 5F and/or 5G. Note, shown is an eccentric or off-center cam 52, which here may be rotated about a relatively fixed axis 53*c* such that initially, the smaller part of the cam 52 is adjacent the known location 48*c*, and then in further rotation, the larger part of the cam 52 rotates up into the slot 48*d* to the known location 48*c* eventually rising above surface 48*e* (if only miniscule1y, though to whatever extent necessary to engage and move a pill 11) and thereby engaging pill 11. Continued rotation moves the pill off surface 48*e*, whether by lifting pill 11 off surface 48*e* or simply moving pill 11 along the surface 48*e* to ultimately drop off as described below. Other shapes or types of cams or moving members 52 or number of moving members 52 may be employed in alternative to the desired effect, some implementations are described in further detail below in FIGS. 12D, 13D, 13E, 13F, 13G, 13H, 13I, 13J, and 13K, inter alia.

Further, in FIG. 4D, some other operational sub-parts of an implementation of the developments hereof can be seen slightly enlarged from the exemplar disposition shown in FIG. 2. For example, a scale receiving cup 82 may be used, cup 82 being part of sub-assembly 80, and being disposed sufficiently under and near the delivery end of sub-assemblies 40 and 50 such that a pill (not shown in FIG. 4D) may fall thereinto as/when desired. Similarly, a delivery cup 78 of delivery sub-assembly 70 may be, as shown, disposed to operationally receive a pill from the scale cup 82 when appropriate. Scale cup 82 is shown pivotally disposed about one or more pivot pins, one pin 81 shown, relative to a scale base 83. A portion of the conveyor belt 74 is also visible, though more detail description and visibility of this and other parts of sub-assembly 70 are set forth below (see FIGS. 5A, 5B, 5C, 5D, 5E, 5F and 5G description, e.g.).

To rotate the cam 52, a motor 64 of motor sub-assembly 60 may be used. A motor 62 also of sub-assembly 60 may be used to engage and move the conveyor 46 via assembly 45 as is also described herein. Motor sub-assembly 60 may include as shown here a fixed frame part 69 and a movable frame part 65 on or to which the motors 62 and/or 64 may be disposed. The motors 62, 64 then each may have a rotational end feature 67, 66 each of which being preferably configured to engage respective engagement parts 47 and 56. The engagement of the implementations shown is by a respective projecting blade 67*a*, 66*a* that each respectively engage the respective engagement parts 47, 56 in between respective projecting pins 47*a*, 47*b* of engagement part 47 and pins 56*a*, 56*b* of engagement part 56. I.e., blade 67*a* is extended to and becomes operationally disposed between respective pins 47*a*, 47*b*; and, discretely, blade 66*a* of motor 64 is extended to and becomes operationally disposed between pins 56*a* and 56*b*. Then, respectively, rotation by motor 64, for a first example, of its end part 66 and consequently also blade 66*a*, then causes blade 66*a* to engage and move the pins 56*a*, 56*b* which in turn, causes rotational turning of engagement end 56 which turns axle/shaft 53 to in turn, also cause rotation of cam 52—this would achieve the rotational effect indicated as/by arrow 53*c* (FIG. 4E) and get the cam to and through the desired positions for pill delivery. Similarly, rotation by motor 62, for a second example, of its end part 67 and consequently also blade 67*a*, then causes blade 67*a* to engage and move the pins 47*a*, 47*b* which in turn, causes rotational turning of engagement end 47 (better shown in FIG. 4C) which turns shaft/rod 43 to in turn, also cause rotation of the gear system 45 (e.g., worm gear 45*a* and rotational gear 45*b* to in turn move conveyor 46, as described with respect to FIG. 4C, above).

The extension of the end features 66, 67 can be accomplished in a variety of ways, though here shown is a movability of the frame part 65 on/relative to a pair of rails 68*a*, 68*b* (rail 68*b* mostly hidden though visible at its rear end part as it may extend through the fixed part of the frame 69). The movement of frame 65 may thus be in a direction as indicated by arrow 68*c* (along rail 68*a*) in a relative forward fashion for and toward and to engagement with the engagement ends 47, 56. When disengagement is desired a reverse movement of the frame 65 relative to rails 68 (defined by and including sub-parts 68*a* and/or 68*b*) and frame 69 to the position shown in FIG. 4D.

Such a dis-engageable engagement of a motor sub-assembly 60 as this may provide optionality to have one set of motors configured to engage (and dis-engage) with more than one (i.e., a plurality) of pill handling (conveyor) and gate delivery (cam) sub-assemblies 40, 50. E.g., in FIG. 2, between four and eight possible such assemblies 40, 50 are shown (four clearly visible (identified as 40*a*, 40*b*, 40*c*, and 40*d*), two-three further ones barely visible (few parts thereof), and one to two possible additional ones completely hidden behind and under the cover 23); any and each of which set of sub-assemblies 40, 50 being discretely and dis-engagably engagable with the set of motors 62, 64 in the single motor sub-assembly 60. Thus, one set of pills may be the subject of a particular delivery from any one particular set of conveyor/cam sub-assemblies 40, 50 at any particular time, and then, a subsequent operation with a different set of sub-assemblies, which may have a different kind/type of pill disposed therein, can then be moved (rotated on shaft 34) to the motor engaging position (see e.g., the sub-assembly 40*b* in FIG. 2 with its associated gate/cam sub-assembly both disposed in motor-engaging position opposite the motor sub-assembly 60) to undergo a respective pill delivery operation.

Figure 5A:
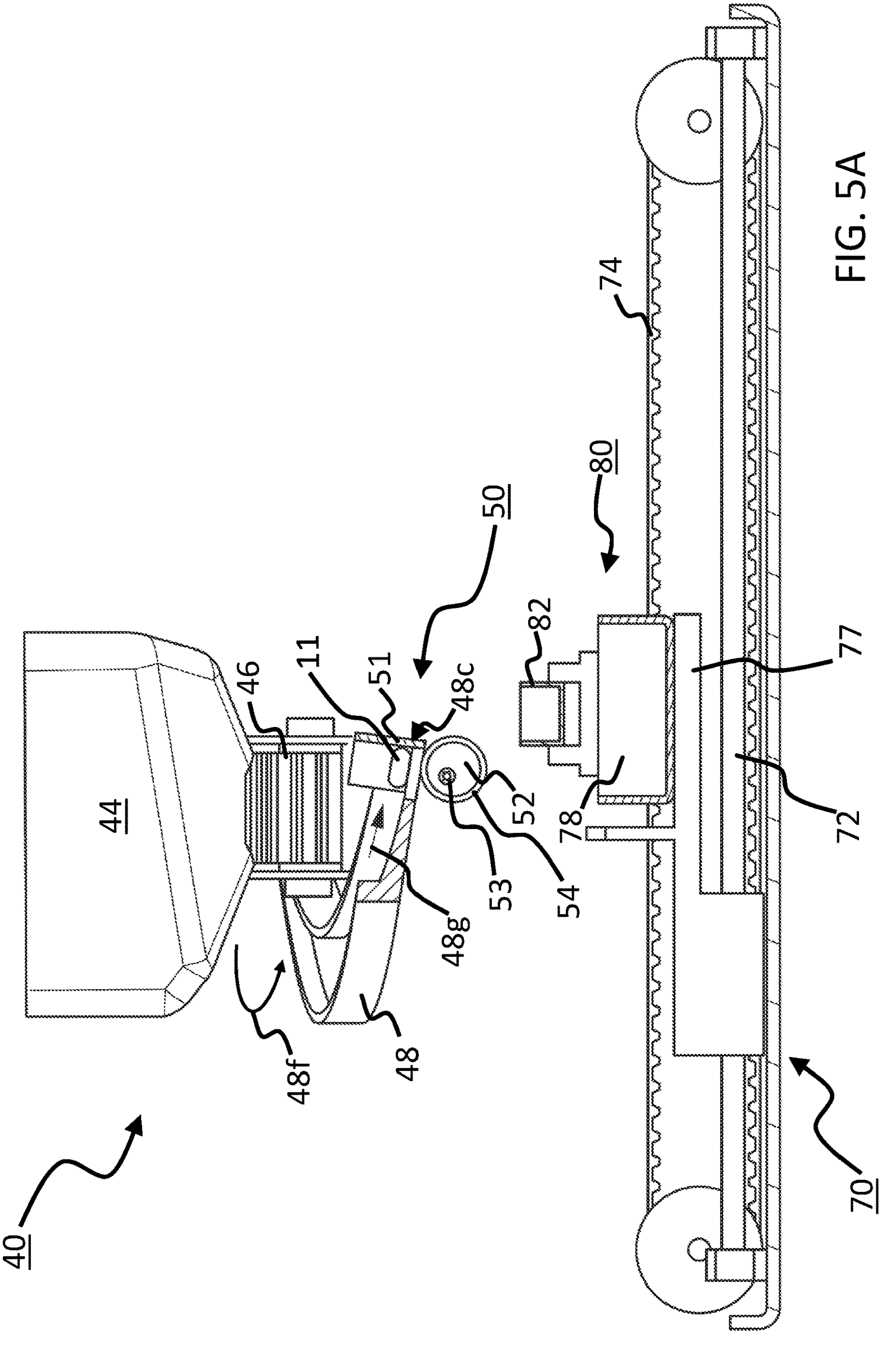
FIGS. 5A, 5B, 5C, 5D, 5E, 5F and 5G, provide elevational views, some partially cut-away, of some interior components of an alternative pill dispenser according hereto.

A pill delivery option will now be described relative to FIGS. 5A, 5B, 5C, 5D, 5E, 5F and 5G. First, shown in FIG. 5A is a pill handling sub-assembly 40, a corresponding pill control sub-assembly 50, a scale sub-assembly 80 and an exit cup sub-assembly 70. The dominant parts thereof include bin 44, conveyor 46 and chute 48 of pill handling assembly 40; gate/door 51, cam 52, shaft 53 and pill handling/engaging surface 54 of sub-assembly 50; rail 72, belt 74, movable base 77 and cup 78 of assembly 70 and scale cup 82 of scale sub-assembly 80. Continuing the progression of a pill through a system or sub-combination hereof as from FIG. 4C; where a pill 11 was taken from a conveyor loading area 44*a* in a direction 46*a* on the conveyor 46 to a pill dropping location 44*b*, dropped in a direction 46*b* to the pill receiving location 48*a* of slide/chute 48; the pill then sliding along the slide/chute 48, first in direction 48*b* ultimately to the pill known location 48*c* (not shown FIG. 4C, but see FIGS. 4D and 4E, inter alia). Shown as a furtherance thereof in FIG. 5A is a first directional arrow 48*f* indicating a movement of the pill along the curvature of the chute/slide 48 to the final movement arrow 48*g* in/associated with the chute/slide 48. Arrow 48*g* shows the pill 11 on final approach to the pill known location 48*c*.

Figure 5B:
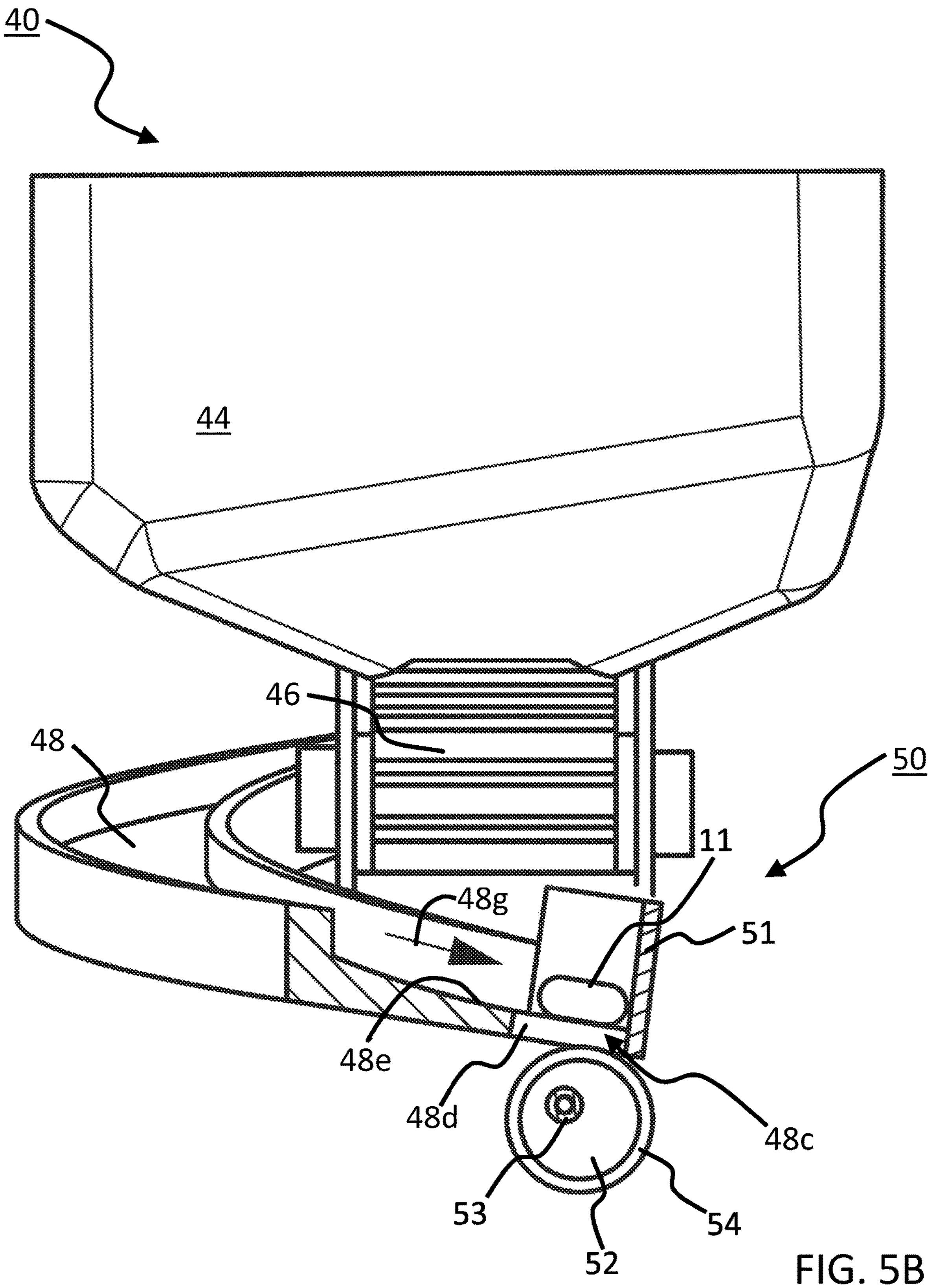
Figure 5C:
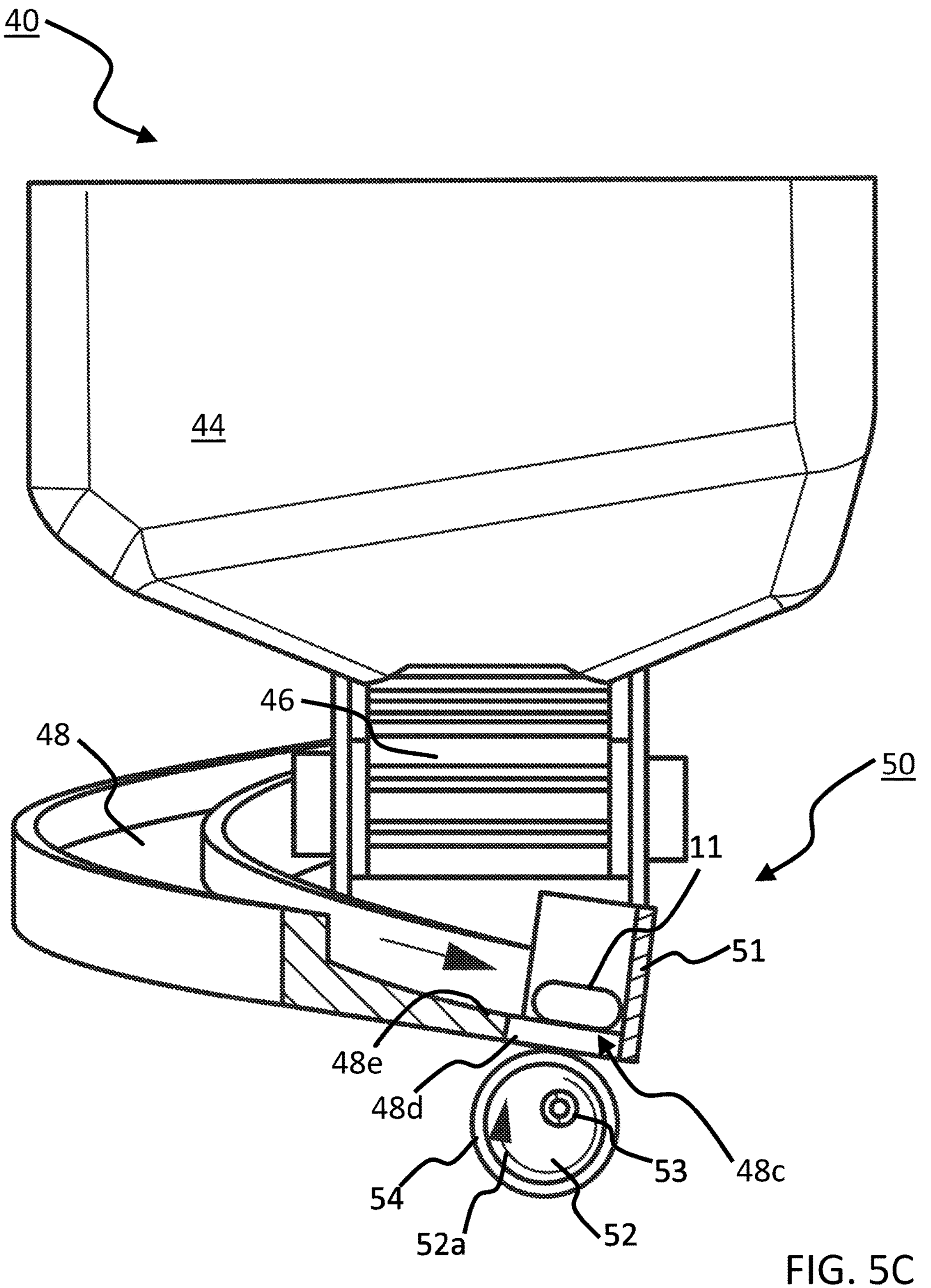

At this point, the pill control sub-assembly 50 takes over control of the further handling and delivery of a single pill 11. Note, first, FIG. 5B shows an identical position of the pill 11 relative to the pill handling and control assemblies 40, 50, though enlarged for further detail in the description of the process, thus, here forward the process will be described relative to FIG. 5B, first, then, also to and through further FIGS. 5C, 5D, 5E, 5F and 5G. As shown in FIG. 5B, the door 51 is closed at the close of the chute movement and the initiation of a control and delivery process using sub-assembly 50. Also at this initial point of the pill control sub-assembly 50 process, the cam 52, here an eccentric or off-center cam 52, is disposed in an initial position of relative rotation (about shaft 53) relative to the slot 48*d* where the cam 52 is below the surface 48*e* of the chute 48 and thus as introduced above, a smaller part of cam 52 being directly under the known location 48*c*, the cam is not yet engaged with the pill 11. Moving next to FIG. 5C, the cam 52 is shown in partial rotation, rotating in the direction set forth by arrow 52*a*; the smaller part of cam 52 still substantially below the surface 48*e* and pill 11; however, as then shown in FIG. 5D, with still further continued rotation in the direction 52*a*, the larger part of the eccentric or off-center cam 52 is then rotated up into the slot 48*d*, eventually raising at least a little above the interior surface 48*e* and thereby lifting the pill 11 up, though it might simply engage and move the pill without perhaps actually lifting it per se. The pill-engaging surface 54 may be configured to be sufficiently frictional to, in effect, grab the pill 11 and move the pill 11 with the cam 52 and move it therewith in the direction of the arrow 52*a*; see below (as such a rubberized surface as might be presented by an o-ring might be employed for surface 54).

Figure 5D:
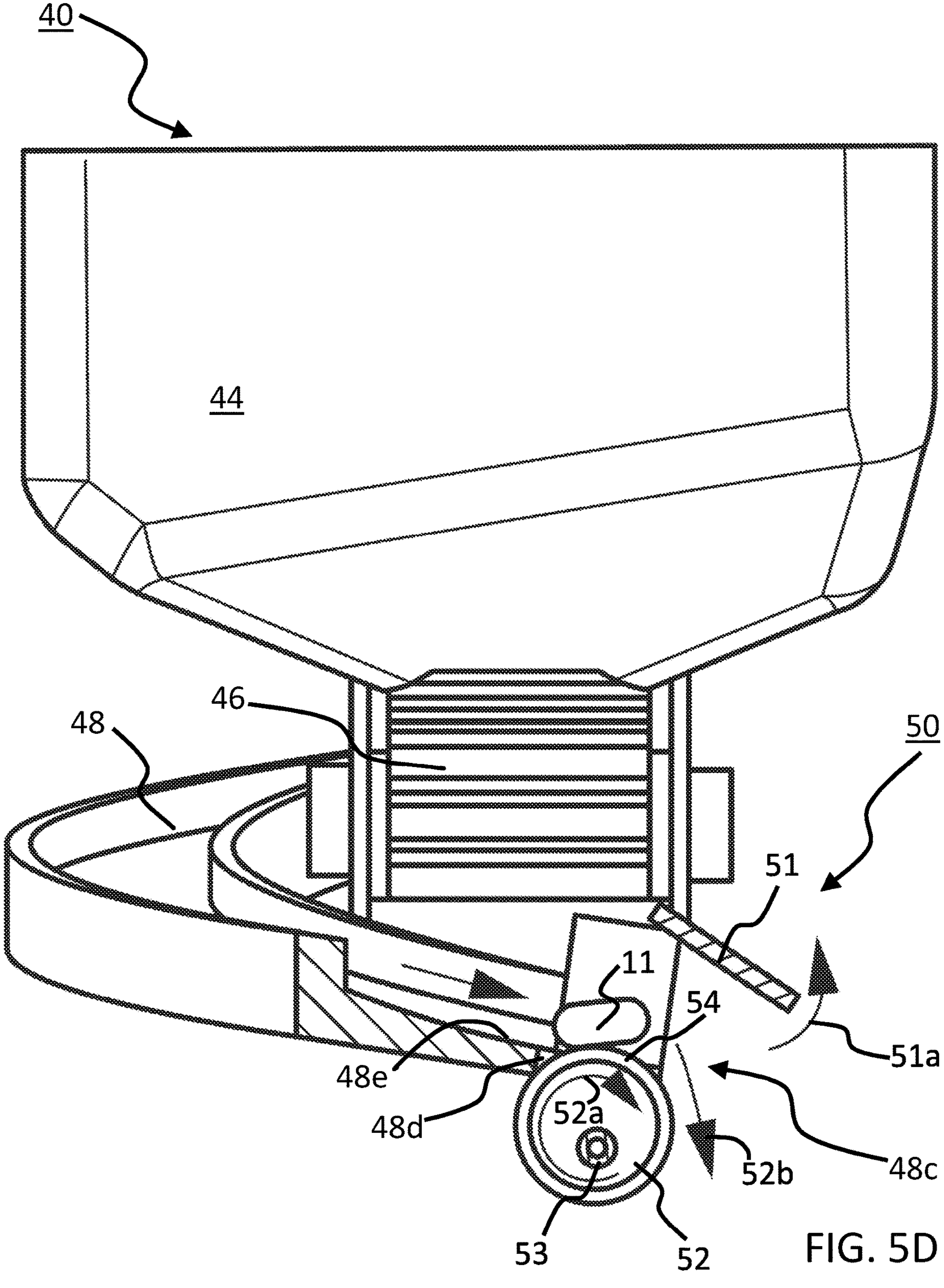

Remaining with FIG. 5D briefly, we see also that the door 51 is opened or at least in the process of opening, see arrow 51*a* indicating the rotational, hinge-like movement of the gate or door 51. It is noted briefly here that the door 51 may be opened with the lifting and moving of the pill 11 by cam 52. Indeed, the same mechanism for rotating cam 52 may be used for opening door 51, so operation thereof may be connected, or alternatively, the door 51 may be opened in a discrete operation and using a discrete motor (not separately shown). Operation of the door 51 may nevertheless occur simultaneous with or near in time to the lifting and moving of the pill 11, or in some implementations, operation, i.e., opening of the door 51 may be completely independent of the movement of the pill. Even so, the door 51 will be coordinated so that when the pill 11 is sufficiently ready for being moved off the cam 52, the door will be open or opened. In some implementations, separately controllable door opening and perhaps more interestingly (in perhaps some cases), door closing may be tightly controlled for different sized pills; e.g., smaller pills 11 may invoke a desire for quicker door closing operations to ensure catching any following pills in/on the chute 48 after the one being delivered; e.g., closing before the pill is completely dropped off to stop the next pill in line from moving out of turn. Larger pills may allow for longer or slower closing times.

Figure 5E:
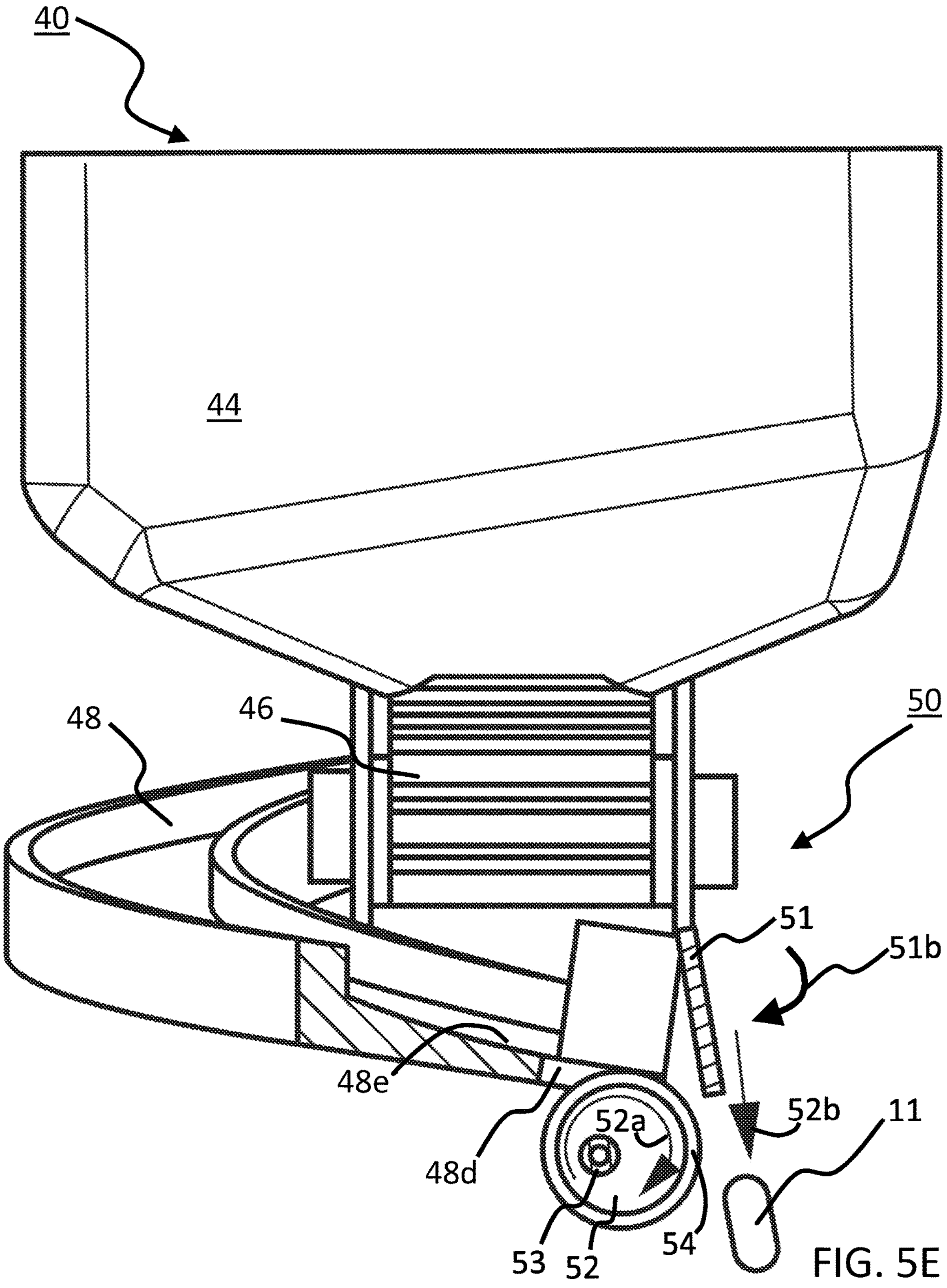
Figure 5F:
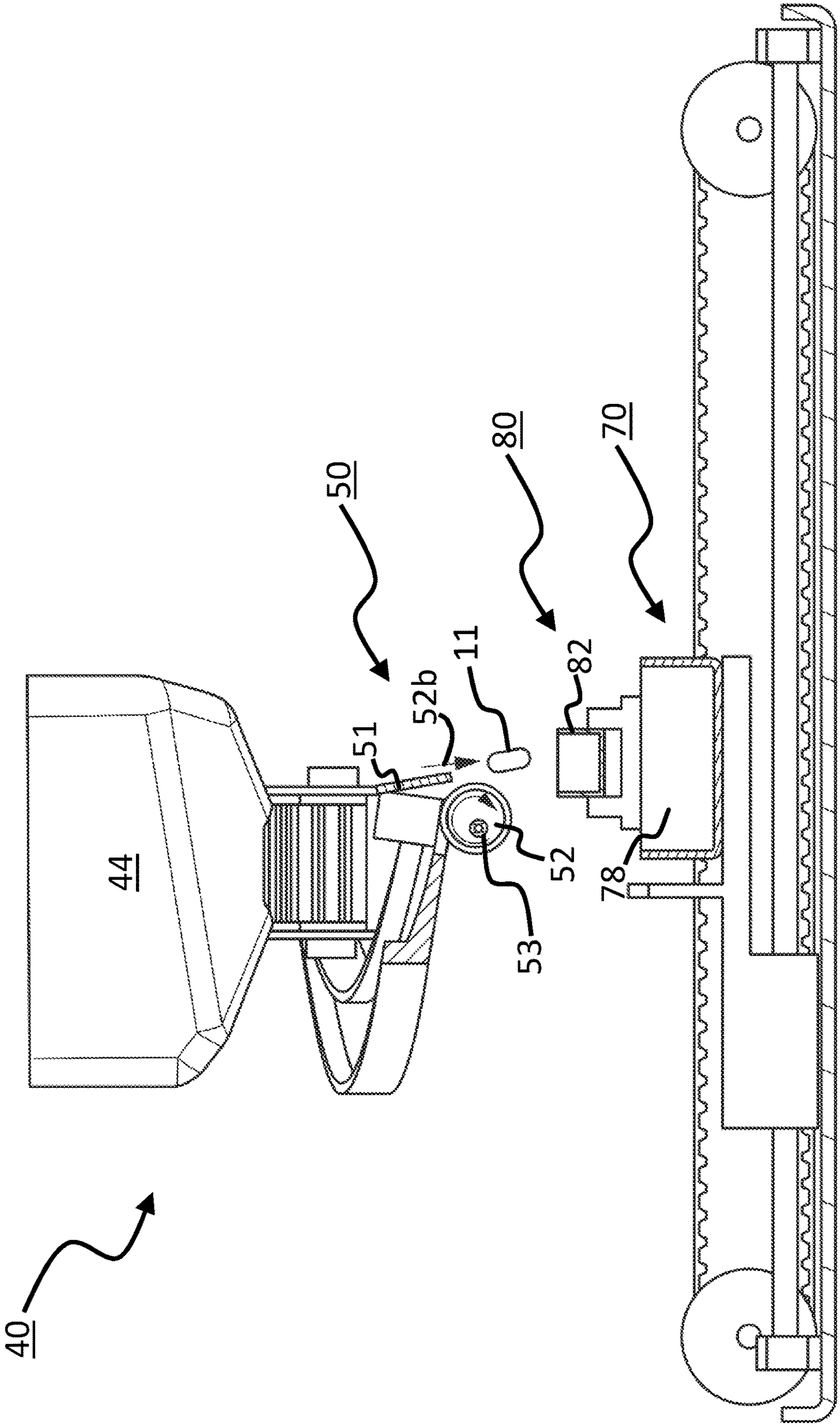

In FIG. 5D, an arrow 52*b* indicates where the pill 11 would be moving to as the cam 52 continues still further rotation in the same direction as indicated by arrow 52*a*. FIG. 5E continues the rotation of cam 52 such that the larger part thereof has moved mostly past the slot 48*d* and the pill 11 has thus moved off the cam 52, dis-engaging from surface 54. The pill 11 then falls off in direction 52*b*. The gate or door 51 is also shown closing moving in the direction 51*b*. FIG. 5F includes the same relative positions of the cam 52, pill 11 and door 51, though further includes the scale cup 82 of scale sub-assembly 80 into which the pill 11 is shown being deposited. The scale then confirms the proper weight, as would be expected from the particular pill 11. If the weight is not as expected, too little or too much (if the pill is either not delivered or a larger or smaller than expected pill, or even if multiple pills are un-expectedly delivered), then the process is halted and re-set to have a different new pill delivered. If the proper weight is achieved, then, as shown in FIG. 5G, the scale cup 82 is rotated forward (see arrow 82*a*) to deliver the pill 11 (see arrow 82*b*) to the output delivery cup 78.

Figure 5G:
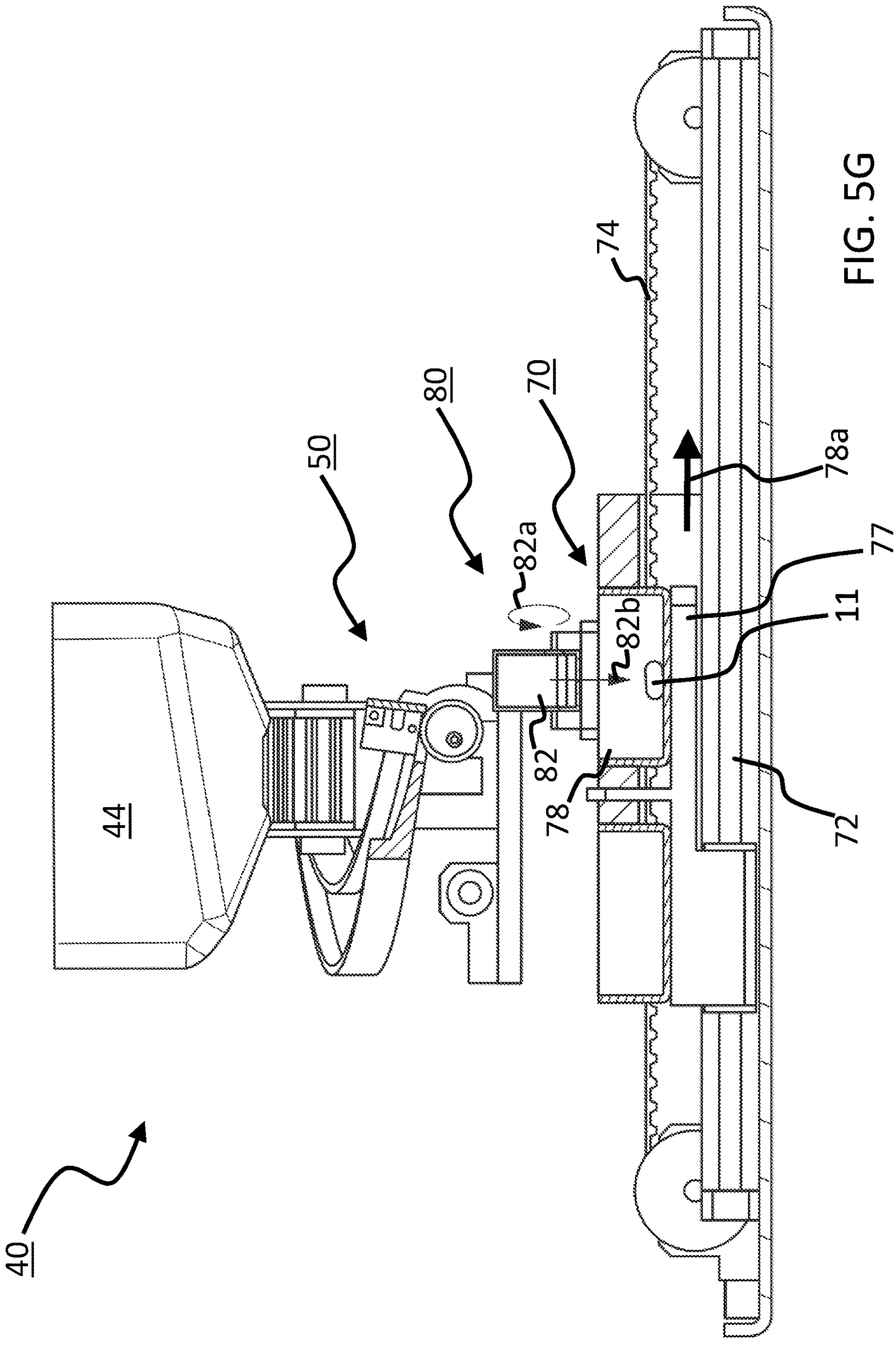

Then, further operation of the output cup subassembly 70 as shown in this implementation in FIG. 5F and FIG. 5G may include an output cup 78 mounted to a linear slide or base element 77 shown here disposed on and movable relative to one or more rails 72 powered by a motor 76 (not shown FIG. 5F, but, see FIG. 2). The slide element 77 and cup 78 can then be moved (see direction indicated by arrow 78*a*) by the conveyor belt 74 to which the slide element/base 77 is operationally attached. This motion may be computer controlled to deliver the pill(s) 11 to the user when desired and/or required (see FIG. 1C). A reverse motion (opposite of the direction of arrow 78*a*) can then be used to move the pill cup 78 back to receive another one or more further pills 11 for ultimate delivery to a user.

An optional sensor sub-assembly 90 may include one or more sensor(s) 91 as shown in FIG. 4D. One or more sensors 91 may be used to determine whether a pill 11 is at the known location 48*c*. The sensors may be of an optical sensor transmissive/slotted interrupter style or otherwise.

For the full cycle then, returning briefly first to FIGS. 1B and 2, the pill loading port or, aperture, 25 (FIG. 2) accessed by door or shutter 15 (FIG. 1B) located at the top of the pill dispenser 10 is/are opened to and do receive the pills 11 for operational manipulation as described herein. In one or more implementations, this port may be operated by or include a computer controlled shutter, see shutter/door 15 in FIG. 1A, 1B, or 1C, and shutter 27 in FIG. 2 (which may be additional to and operation with shutter 15, or may be in lieu of shutter 15), which may be configured to open to allow the user to pour one or more pills into a pre-selected storage bin 44; pre-selected having a variety of optional meanings, whether pre-selected by a user, or by a computerized selection process, or perhaps even in manufacturing, as for example when perhaps only a single bin might be included. In many implementations, the system and/or shutter may be configured so that the shutter 27 (FIG. 2, if used) may be opened when some criteria, as for example, the name, dosage and/or manufacturer of the prescription or over the counter pill has been confirmed by the user. Similarly, the system may be computer controlled to deliver through the processes described herein, one or more pills to output 17 via cup 78 or 18 as shown for example in FIG. 1C.

Figure 6:
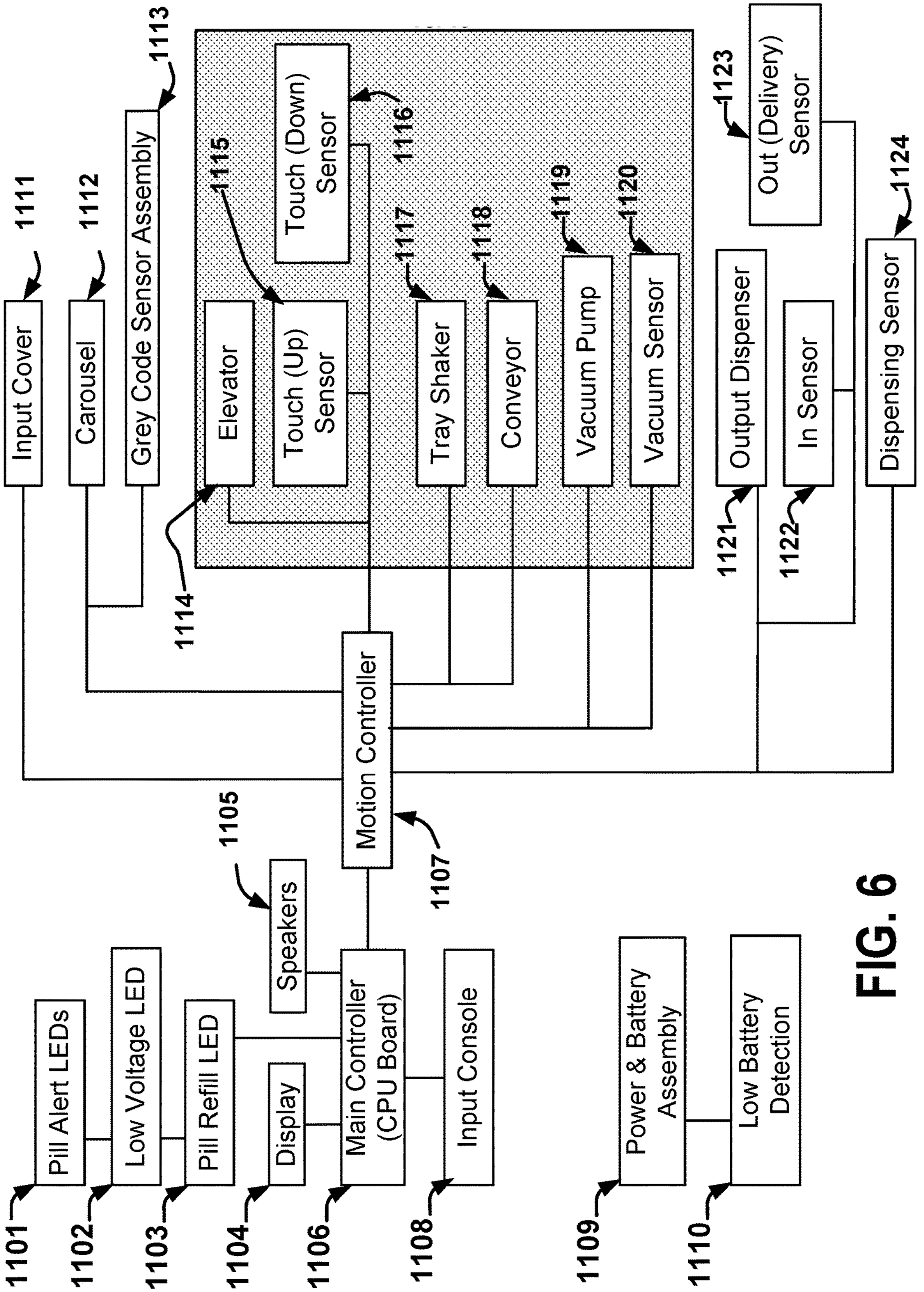
FIG. 6 is a block diagram of an electronics control combination or system according hereto.

FIG. 6 provides an electrical control system diagram that shows an implementation of a construction of some one or more circuits or combinations of one or more modules for possible use with/in the subject matter hereof. Although there are numerous ways a circuit may be designed to achieve a particular function or objective, some implementations herein/hereof may utilize one or more microprocessors and/or other circuit and/or other computer hardware. For a non-limiting example as shown in FIG. 6, a CPU board 1106 may be employed as a main controller for the pill dispenser. A motion control circuit board 1107 may also be used to provide the control circuitry and interface with the CPU board 1106. Additional driver circuits or modules may also be included to energize each motor and read each sensor. The functions and interactions of motor driver circuits and sensor outputs are described below.

In FIG. 6 other modules may include the Power and Battery Assembly 1109 which may include an AC cord and plug for use with a standard wall outlet, an AC/DC transformer for supplying the proper DC voltages and may include a battery such as a 5 Volt DC battery. A low DC voltage detection circuitry or low power/low battery detection circuitry 1110 may be included to monitor routinely or at designated times or constantly the DC power to the CPU board and directly to other circuits. A low voltage condition will, when/if used, be detected and cause activation of a Low Voltage LED 1102 and in some implementations may be configured to send an automatic message to the user and/or one or more third parties via internet or otherwise.

To initialize use of pill dispenser 10 hereof (shown in FIG. 1; however not shown in FIG. 6), or an alternative method with alternative devices, the user may first be disposed to connect to a power source, as for example, to attach the device to a standard U.S. power outlet (110V, AC). This may also charge the back-up battery, if used, as needed. If the needed voltage of the dispenser deteriorates to a level that will no longer meet the power requirements of the pill dispenser 10, low power detection circuitry 1110 may activate notifications to the user, caregivers and/or third parties as indicated in the SETUP files as may be configured by the user or a designee.

A pill refill LED 1103 may be used and may be set by software routines which may indicate the quantity of pills in each pill storage bin 44. The specific pill(s) needing to be refilled may be indicated on the touch screen display 1104 (or display 14 as in FIG. 1A). Such software routines are explained below.

A set of Pill Alert LEDs 1101 may be used and may be activated per a programmed timer in conjunction with a User Request command for pill dispensing. If the user has not activated the User Request command prior to the programmed pill taking time period, one or more Pill Alert LEDs 1101 may be disposed to actively provide a visual alarm. When the visual alarm is active, and/or as an alternative to a visual alarm, an audio alarm may be used, in some examples an MP3 (audio) file may also be played through the Speakers 1105 providing a simultaneous and/or alternative audio alarm.

During the pill dispensing period, a display 1104 (and/or display 14 as shown in FIG. 1A) operatively connected to the main controller 1106, may in some implementations be configured to display one or more of the following: an image of each pill being dispensed, the total number of pills being dispensed, and any special instructions associated with any of the pills being dispensed.

An input console 1108 may be included and may utilize a keyboard (see e.g., buttons 13, FIG. 1A), camera, microphone or touchscreen (see e.g., screen or display 14, as in FIG. 1A), either attached or disposed in the housing 12, or connected by cable or Bluetooth connection. Such an input console may be used by the User or their designee to enter data as described in the operation below.

The Motion Controller 1107 may be used to provide control to motor driver circuits for running the DC motors and similar motors and/or reading the optical sensors to provide functionality for the pill dispenser 10. Further alternatives may include a clock, in some implementations a continuous running clock, in and/or otherwise associated with the Main Controller 1106. Such a clock may be used to trigger one or more commands in the Motion Controller 1107 that activate control circuits to activate the motors and read sensors as follows.

Pills 11 may initially be entered into the pill dispenser 10 through a shuttered opening, or aperture 15 on the top of the pill dispenser 10 (as shown in FIG. 1). Initial information may be provided that specifically identifies each pill medication 11 to be entered. Following identification of the pills 11 immediately being entered, the Input Shutter 15*b* may be activated to slide back or open to reveal the opening for pouring in the pills 11. The Input Shutter 15 may then be activated to close when the pills are completely inserted; in some implementations, a user communication of this completion may be by pressing a button and/or may include entry of the pill count of the number of pills 11 inserted. Note, shutter 27 of FIG. 2 may be in lieu of or in addition to shutter 15, operable together therewith or separately.

Figure 16:
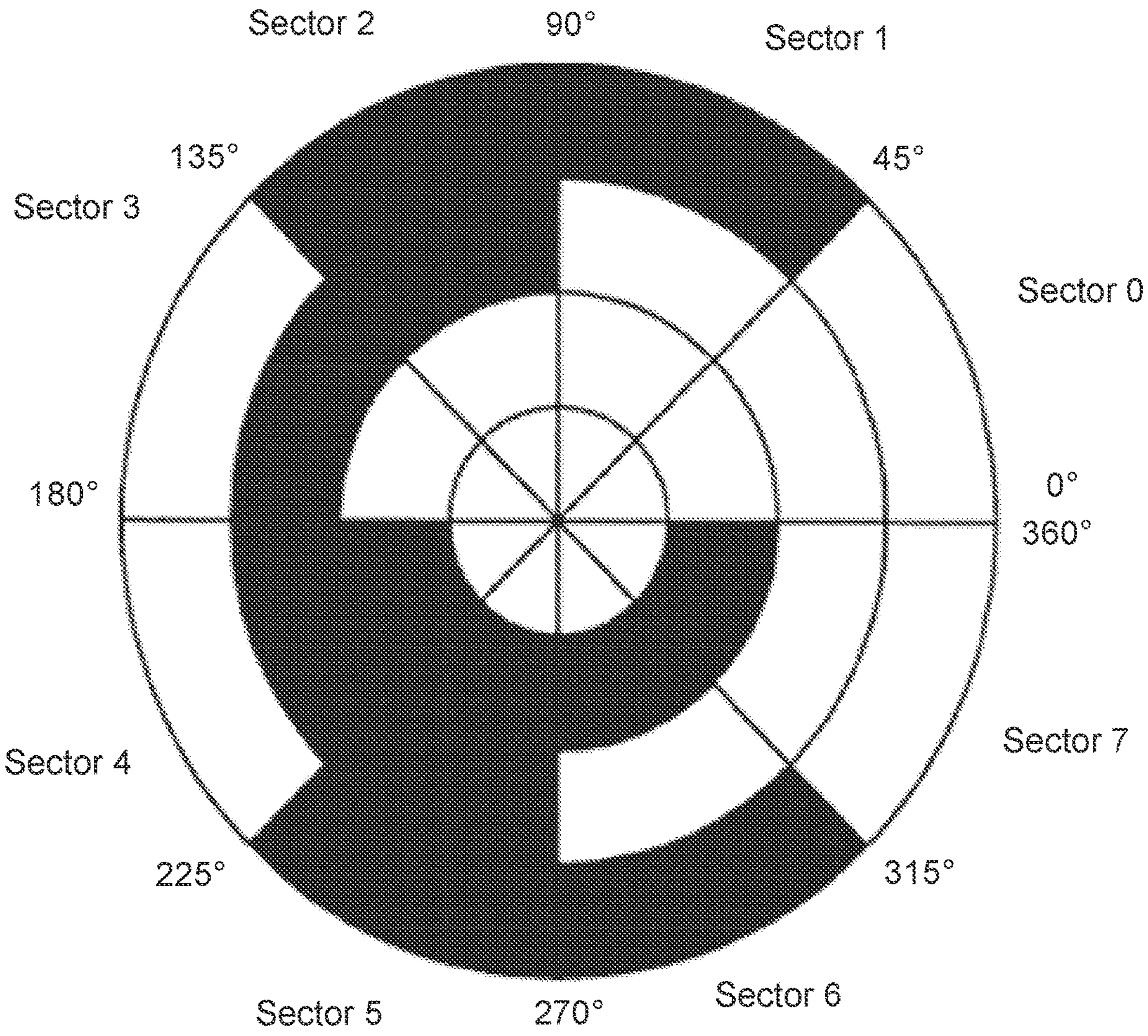

A programmed timetable or other interval for delivery may be generated and used, or other demand instructions may be used. When a specific pill 11 is requested whether per a programmed timetable, or upon other appropriate command, the movable sub-assembly 30, which has attached thereto all of the pill storage bins 44, may then be rotated into the desired specific pill drop off position corresponding to whichever pill is to be delivered. The positioning information for this rotation may be achieved using optical sensors 35 specifically positioned to ensure that only a single sensor changes state during the rotation. This may provide an unambiguous, fixed number of discreet positions (whether 1, 2, 4, 8, 16 or otherwise herebetween or hereabove). Each position may be uniquely identified by a single Gray Code (though incremental or binary or other encoding options could be used in addition or instead). (See example of a Gray Code Table 1 set forth herebelow; three bit rotary coding for eight positions; though other variables are available, e.g., 2 or 4 positions, or 16 positions, et cetera.) FIG. 16 provides a schematic of a Gray scale coding system according hereto.

TABLE 1

| Gray Coding | | | | |
|---|---|---|---|---|
| Sector | Contact 1 | Contact 2 | Contact 3 | Angle |
| 0 | off | off | off | 0° to 45° |
| 1 | off | off | ON | 45° to 90° |
| 2 | off | ON | ON | 90° to 135° |
| 3 | off | ON | off | 135° to 180° |
| 4 | ON | ON | off | 180° to 225° |
| 5 | ON | ON | ON | 225° to 270° |
| 6 | ON | off | ON | 270° to 315° |
| 7 | ON | off | off | 315° to 360° |

(Rotary encoder for angle-measuring devices marked in 3-bit binary. The inner ring corresponds to Contact 1 in the table. Black sectors are "on." Zero degrees is on the right-hand side, with angle increasing counterclockwise.)

After the movable sub-assembly 30 has reached the pill drop off position, the respective conveyor 46, if used, is activated to move one or more pills from bin 44 to the respective chute or slide 48, if used, to get the pill to the known location 48*c*. The respective electric vibrator 49, if used, may be activated causing the pills to align within the pill trough 48 so that one pill 11 is in the known location directly over the moveable cam 52. The cam 52 may be activated to rotate, at a controlled speed, until the cam positioning sensor 91, if used, changes state thereby indicating the cam may have rotated sufficiently to cause a single pill 11 to move off the end of the pill trough 48.

With the pill storage and gate assembly 50 having the cam 52 thereof rotated to a position for the pill 11 to be over the scale cup 82 and/or the respective output dispenser cup 78 (in some implementations, the cam 52 may deliver directly to an output cup 78), the pill is moved by the cam 52 off the end of the trough 48 and allowed to fall by gravity into the scale cup 82 or output dispensing cup 78.

Depending on the number of pills 11 contained in the pill trough 48, the conveyor belt subassembly 46 may be activated to refill the pill trough 48 with one or more pills 11. An electric motor 62 may be used to rotate the conveyor belt subassembly 46 to the required position.

The movable sub-assemblage 30 may then be moved, as needed or desired, to the next position for the storage and gate assembly 50 to allow additional pills 11 to be dropped into the output cup 78 per the preprogrammed timetable or other appropriate demand initiation.

After the final pill 11 has been loaded/dropped into the output cup 48 for a particular pill taking period, the output dispensing cup 78 may then be moved into position for delivery of the pills 11 to the user. The output dispenser cup motor 76 may be activated which moves the output dispensing cup 78, mounted on a slide assembly 77, to a position external to the footprint of the pill dispenser 10. The motion may be stopped in some implementations when either a Move Out (Delivery) Sensor (not shown), if used, is tripped, or some other initiating indicator is activated. The pills 11 may then be manually removed from the output dispensing cup 78 by tipping the cup 18.

A dispensing sensor (not shown) may be used and may hereby change state to indicate the output dispensing cup 78 has been turned sufficiently to remove or other indication is made that all pills 11 are taken therefrom. When such a sensor returns to its initial state, indicating the pills have been removed, the linear slide assembly 77 may be configured to retract until a Move In (Return) Sensor (not shown), if used, or other indicating signal production indicates the end of travel.

Figure 7:
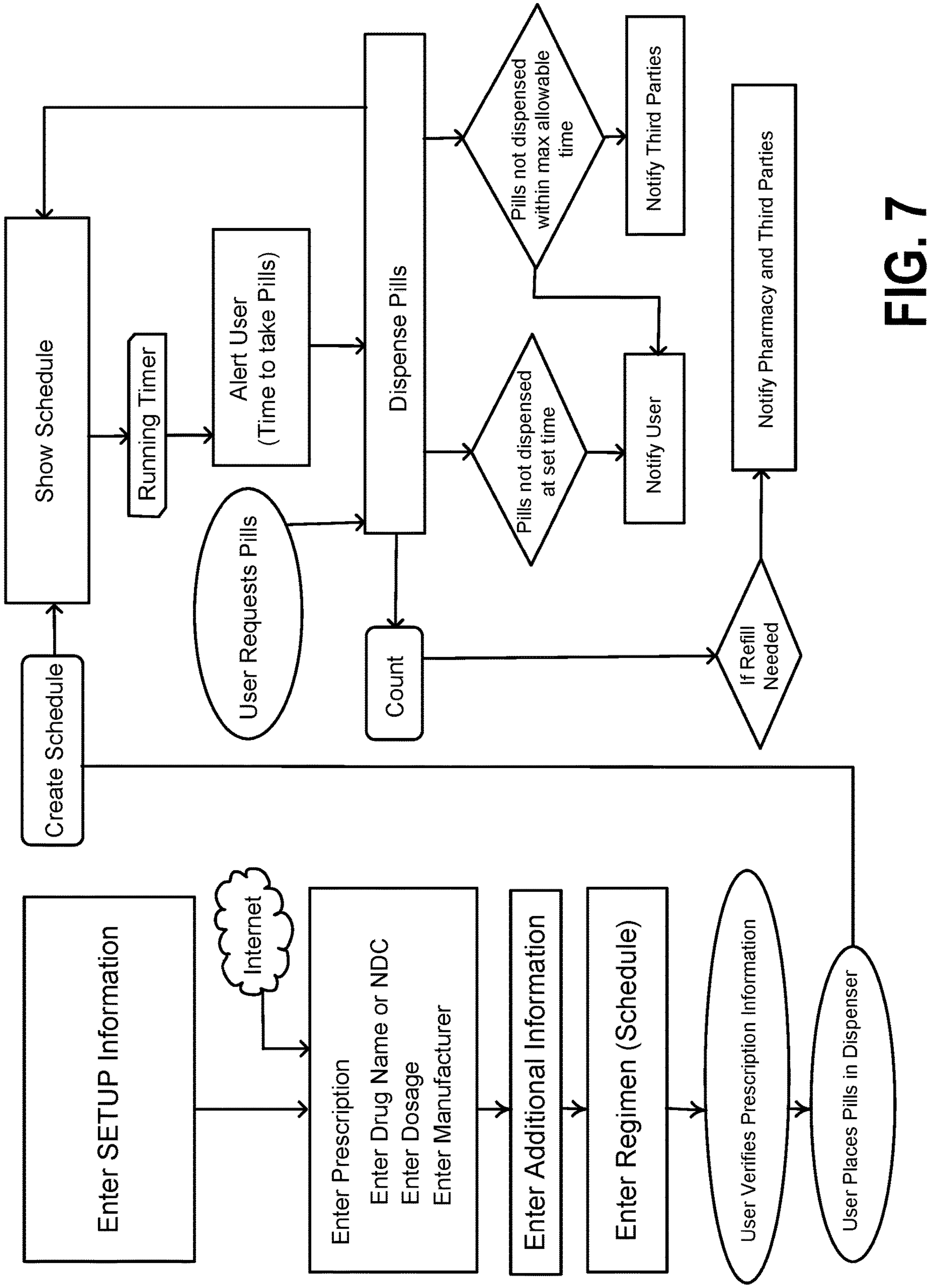
FIG. 7 is a block diagram of a combination or system or method according hereto.

There are numerous ways to program a particular function or objective. In an exemplar implementation, an Android™ operating system implementation may be used, but other Operating Systems (OS) programs could be utilized. A diagram of exemplar software architecture is shown in FIG. 7.

The operation and an exemplar software flow may be as follows.

The user, or their designee, may initialize use of the system by selecting an initiating command, such as SETUP, from the main menu. The user sets initial information which may include one or more of the language of choice, the user's name, user's mobile information, the email address or addresses or other contacts for third party notifications, the remote account name and the remote access password.

The user may then set parameters such as for the duration of each alert to the user to take pills, the time span of continuing alerts (snooze control) for each pill taking time period and the time delay before notifying one or more third parties, such as caregivers or medical professionals, that pills have not been requested or removed from the dispensing cup.

The user may then enter a time of day for each pill taking periods of in some examples, Pre-Breakfast, Breakfast, Lunch, Dinner and Bedtime or accept the default times provided. Additional pill taking periods within the day may also or alternatively be named and added.

The system after being initialized may contain some one or more or all of the following information:

Display Language
User's name
User's email address
User's cellphone number
User's device specific passCODE
User's device specific passWORD
Recipient(s) (i.e. caregiver) email address(es)
Recipient(s) cellphone number(s)
Delay for Recipient Notification (in minutes)
Initial Alert Active Period (in seconds)
Alert Wait (Snooze) Period (in minutes)
Time Period Information:
 Pre-Breakfast (default 7:30 am)
 Breakfast (default 8:00 am)
 Lunch (default 12:00 pm)
 Dinner (default 5:30 pm)
 Bedtime (default 10:00 pm)

The setup routine may be edited at any time.

Following the system setup as described above, the drug and supplement information may be entered.

The user may initiate a program for loading pills 11 by selecting the icon, such as "Rx" on the display 1104. Each container bin 44, each generally for discrete pills 11, may then be loaded as follows: pill name or National Drug Code (NDC) is entered, the correct dosage of the pill 11 may be identified from a pop-up menu list of options, and the manufacturer may be selected from a pop-up menu list of manufacturers. The drug or supplement may be entered into the initial drug entry screen by utilizing one of the available input methods. This implementation may contain databases from the U.S. Food and Drug Administration (FDA) and the National Institute of Health (NIH), or other national or international database, which may be part of an initial load of software. The databases may be maintained automatically as new data becomes available from the FDA and/or the NIH and/or other national or international database. The drugs may be entered via their National Drug Code (NDC) which may uniquely identify its name/manufacturer/strength or by first entering the drug name.

When the NDC code is not used for initially identifying the pill 11, the name of the drug may be searched as a drop down menu of all drugs which may be configured to appear as each additional letter of the drug's name is entered. The User may then select the drug from a drop down menu list that exactly matches the prescription. Supplement names are entered manually. Following the entry of a drug name, the next screen may contain a drop down menu list of all available doses of the prescription or over-the-counter FDA approved drug. Dosage (strength) information may only be entered manually for supplements. Following the selection of the dosage, the next screen may provide a drop down menu list of all manufacturers for the entered pill in the dosage selected. The manufacturer of the supplement may be configured to only be entered manually.

When a pill 11 has been entered which meets the identification criteria, it may be configured that an image, photograph or description of the pill 11 or OTC (Over the Counter) drug is shown graphically or in text, if available, on the dispenser's display 1104 as in FIG. 6, or display 14 as in FIG. 1A, inter alia. In some implementation such information may be obtained from and/or providing the pill dispenser 10 is connected to the internet. Following the image or description or other identification of the pill 11, the user may acknowledge the pill 11 is correctly identified and then a loading shutter 15 and/or 27 may automatically be repositioned (opened) to allow pouring the pills 11 from their original container into the pill dispenser 10. The pills 11 will be directed into a predetermined storage bin 44. There is typically one storage bin 44 and corresponding storage and gate assembly 50 for each unique set of pills 11 (see e.g., discrete pill handling assemblies 40*a*, 40*b*, 40*c* and 40*d* inter alia from FIG. 2).

After loading one particular set or at some point during loading or after loading each set of unique pills 11 in the pill dispenser 10, the user may enter the regimen (schedule) per instructions provided with the prescription or supplement.

A set of display pages may be provided for viewing on the display 14/1104 to deal with entering the regimen (schedule). The user can select from several options for the type of time period in which the drug is taken; non-limiting examples including:

On Going (daily or cyclical days)
Limited Period (start and end date)
As Needed (with optional restrictions on frequency)

After setting the regimen, the user may enter additional information such as the name of the prescribing doctor, the doctor's contact information, the reason for taking the medication and/or special instructions given for taking or handling the medication. Additional information may also be entered as follows:

Rx Prescription Number
Pharmacy
Pharmacy Contact Information

In the case of non-solid or non-oral medications, the device may me employed to only act as a reminder and may not typically be used to store or dispense the supplement or drug. The user may indicate if the form of the supplement is a solid oral medication for the correct handling of the medication. Following the entry of all information regarding the medication, the data may be stored in a local database and a schedule for the next set number of days is created. In one implementation, the schedule may be displayed as the home page on the display 14/1104 of the pill dispenser 10.

The user may have optional views of the schedule in durations of the current day (today), some number of days into the future from today or some number of days prior to today.

The procedure may be repeated for each unique set of pills and as new pills are added for medical purposes.

When the pill loading and regimens have been entered, the pill dispenser 10 may then be ready for use.

To begin use of the pill dispenser 10, a pill dispensing icon on the display 1104/14 may be touched to activate the pill gathering cycle required to load the dispensing cup 78 for the next pill taking time period. The one or more pills 11 may then be dispensed. In this manner, the pill or pills 11 can be dispensed either a short time prior to the programmed first alert or a limited period of time after the first alert. Multiple alerts may be given during the full alert period of each pill taking time period. If the pill dispensing icon has not been activated within a preset time from the first alert, the dispenser may be configured to send an alert to the personal mobile device of the user. If the pill dispensing icon has not been activated within the time parameter for an optional caregiver notification, the dispenser may be configured to send a notification to one or more caregivers and/or medical professionals to investigate the situation.

The pill counter memory, a part of the microprocessor or CPU board 1106, may be used to track pill count and may be reduced for each pill dispensed based on the number of pills that have been dispensed. When the number of pills falls below a preset limit, the dispenser may be configured to send a notification whether via the internet or other methods or devices or systems to the user or specified pharmacy and/or one or more other third parties. A pill refill LED 1103 may also be activated on the unit to indicate, to the User, that a refill is needed and/or expected for at least one dispensable medication.

Software routines may be used to count each pill 11 as they are dispensed. The device 10 may maintain quantity information for each pill type and can then provide refill information. The pill dispenser 10 may continue to automatically dispense the needed pills 11 to the user and/or pill taker as long as it contains the necessary quantity of pills 11 and power is applied, whether from the AC source or the back-up battery.

If the user has not initiated a request for pill dispensing, as the actual time of day reaches the start of a pill taking period for which pills or supplements are available, visual and/or audio alerts may in some implementations be issued by the device. Some configurations may provide for alerts to be simultaneously or otherwise activated in devices in other locations or rooms.

If the User has not initiated a request for pills to be dispensed within a preset time period after the initial alert (wait time), a notification may be sent to the User's personal remote device and may be done so repeatedly over a particular time period. The User may selectively turn off all notifications for a limited amount of time. If the User has not requested the pills past a maximum allowable time, the User and/or one or more or all third parties may receive notification via the internet or other communication methods.

The removal of the pills 11 from the dispensing cup 78/18 may include actuation of a sensor or other indicator that will initiate return of the dispensing cup and in some configurations also store the time and list of pills that were dispensed. This database of pills dispensed may be stored on the device and in some cases copied in a remote data storage device for secure access by caregivers or medical professionals.

At the time the dispensing cup 78/18 has been moved into its dispensing position, the display 1104/14 may be configured to indicate all relevant special instructions for one or more of the pills 11 being dispensed. Moreover, a text message, email, and/or mobile device notification may be sent synchronously to the user to indicate any and all special instructions for the one or more or the pills 11 being dispensed. In this way, the user or designee is reminded of any particular instructions associated with the medication such as to drink a full glass of water, consuming on an empty stomach, consume with food, do not consume food within a prescribed period of taking the medicine, or any particular instructions associated with the medication, prescribing instructions, or instructions provided by the prescribing physician.

The dispenser may continue to be powered on and operate in the manner described above for each successive pill taking time for which one or more pills 11 are available and required or desired for the user.

As seen from the preceding description, the dispenser may in some implementations involve an electromechanical system that can be programmed and loaded with the proper pill(s) so that the proper pill(s) in the proper quantity can be dispensed at the desired time(s) with in some cases an alert signal for the pill taker. In addition to the alert, the pill taker may in some situations be provided additional information as necessary or desired to take the pills as advised by the prescribing doctor or medical advisor or otherwise.

The system may also provide for alerting a caregiver or medical professional when scheduled pills are not taken by the user or when there is a problem in the operation of the dispenser. One feature of a pill dispenser such as the device, systems, and methods, hereof, may be in the ability to remind the User to take their medication in a timely manner and removing the manual dispensing of pills into compartments related to fixed pill taking periods. Additionally, pill schedules and dosages can be changed by user or by computer input, either or both locally or remotely.

The system advantages may, though need not necessarily, include one or more of the following: (1) verifying with the use of FDA (Food & Drug Administration) and NIH (National Institute of Health) or other national or international databases that each specific group of same pills 11 is loaded into a pill storage bin designated by the pill dispenser 10 for that particular pill 11; (2) issuing a visual and/or audible alarm to alert the pill taker to remove the pill(s) from the extendable dispensing cup 18; (3) displaying any special instructions for taking the dispensed pills per the prescribing doctor's orders; (4) obtaining the proper quantity of each pill on a single pill basis for dispensing per user programmed input; (5) storing all medication in a secure, locked manner; (6) sending notifications to the third parties, such as caregivers and medical professionals, when dispensed pills have not been removed from the device; (7) sending reminders and/or notifications to third parties, such as caregivers and pharmacies, when refills of prescriptions or supplements are needed or expected; (8) allowing and/or assisting in implementing changes to the pill regimen (schedule) or quantity to be dispensed remotely via internet enabled device; (9) insuring safe, continuous operation via a powered connection, including a battery back-up power system, and (10) preventing unauthorized changes to the programming or removal of medication by employing, utilizing, configuring and/or implementing a physical locking mechanism or digital locking mechanism, or combination of both a physical and digital locking mechanism.

Accordingly, an aspect of the presently-described subject matter may, though not necessarily include providing an improved programmable automatic pill dispenser without the deficiencies and disadvantages of previous pill dispensing devices; specifically, to provide a simple and reliable programmable automatic pill dispenser that has one or more of the ability to provide each pill, as needed or desired, having been confirmed to match the prescription at time of loading, is dispensed per preset time(s), has a locking mechanism for security, and/or provides the necessary additional instructions during the dispensing to the user.

Still further objects and advantages may, though not necessarily, include one or more of: (a) providing a programmable automated pill dispenser that is capable of verifying the actual pill medication being loaded prior to placement in the device; (b) providing a programmable automated pill dispenser that has a system to select individual pills for dispensing per a programmable time table; (c) providing a programmable automated pill dispenser with the capability of storing pills in a secure manner; (d) providing displaying of special instructions or messages associated with corresponding pills during the dispensing process; (e) providing a programmable automated pill dispenser with capability of alerting the user by visual and audio alarms to pill taking periods; (f) providing alerting of or to a third party, such as a caregiver or medical professional, when pills have not been dispensed, quantities stored are low or the device is malfunctioning; (g) providing for notifying a third party, such as a pharmacy, when quantity is low in regards to planned dispensing over a pre-set amount of time; (h) providing a programmable automatic pill dispenser that is simple to use, compact, and reliable including back-up battery operation, (i) providing a programmable automated pill dispenser with a pill storage arrangement that can be easily removed as needed for medical and/or cleaning purposes, (j) providing a method of changing the pill quantity or schedule remotely via secure internet access, (k) providing a user-initiated command for dispensing pills on an as needed basis; (l) providing a programmable automated pill dispenser that reduces the possibility of the pill taker taking an improper accumulation of dispensed pills which may result in an overdose; and, (m) providing software controls that prevent dispensing pills in such a way as to avoid an overdose.

Some other advantages of a dispenser hereof may, though not necessarily, include one or more of: (a) pill storage bins which may be rotated for simple loading of the pills and as needed for the dispensing of pill(s); (b) an automated, non-removable, dispensing cup for simple dispensing to the user; (c) pill dispensing software which may prevent an accumulation of dispensed pills to eliminate the possibility of overdosing caused by the dispenser; (d) pill dispensing and management software that may be shown and displayed in a graphical user interface on a LCD, LED, or other panel like display that may provide for some programmability and controllability of the functions and features of the dispenser; (e) refill tracking software which may provide messages to caregivers or pharmacies as needed for refills; (f) remote setting of dispensing instructions via internet; and (g) remote setting of refill instructions for refilling storage bins.

The possible variations and ramifications of the present developments may be numerous. For example, additional levels of storage and gate assemblies can be added to increase the number of unique pills serviced by the pill dispenser.

Another variation may be to remove the need for manual entry of pill information into the device by including a bar code reader or QR (Quick Response) code reader for prescription and supplemental drug related information. Alternatively, the bar code reader or QR code reader may be associated, implemented, and used by a mobile device such as a WiFi and/or Bluetooth® enabled cellular phone, or, in some instances another device such as a tablet, laptop, or desktop computer, and an application installed on said cellular phone, where the cellular phone is in cooperative communication with the device. In this way, a user may utilize the bar code reader or QR code reader and associated mobile application to obtain prescription information and supplemental information and may also provide an additional way to adjust the programmable features of the dispenser. In yet another variation, the dispenser may employ a voice recognition system or communication with or through the internet or other communication line for data stored with each prescription, medication, and/or pill.

Other ramifications and variations of the basic concept are included within the scope of the appended claims and their legal equivalents, and the scope of the invention not be limited by the examples given, or the claims hereof.

Having fully described implementations in the descriptions and drawing figures above, some further alternative implementations are described in the following descriptions related to FIGS. 8A-8D-16 hereforward. In accordance herewith, isometric front views of schematically-represented, further alternative pill dispensers 100 according hereto is shown in FIGS. 8A, 8B, 8C and 8D. Myriad other forms of pill dispensers may fit within the scope hereof with no requirement to be limited to the implementations shown, whether in FIGS. 8A, 8B, 8C and 8D or otherwise; limited only by the proper scope of the claims appended hereto.

Figure 8A:
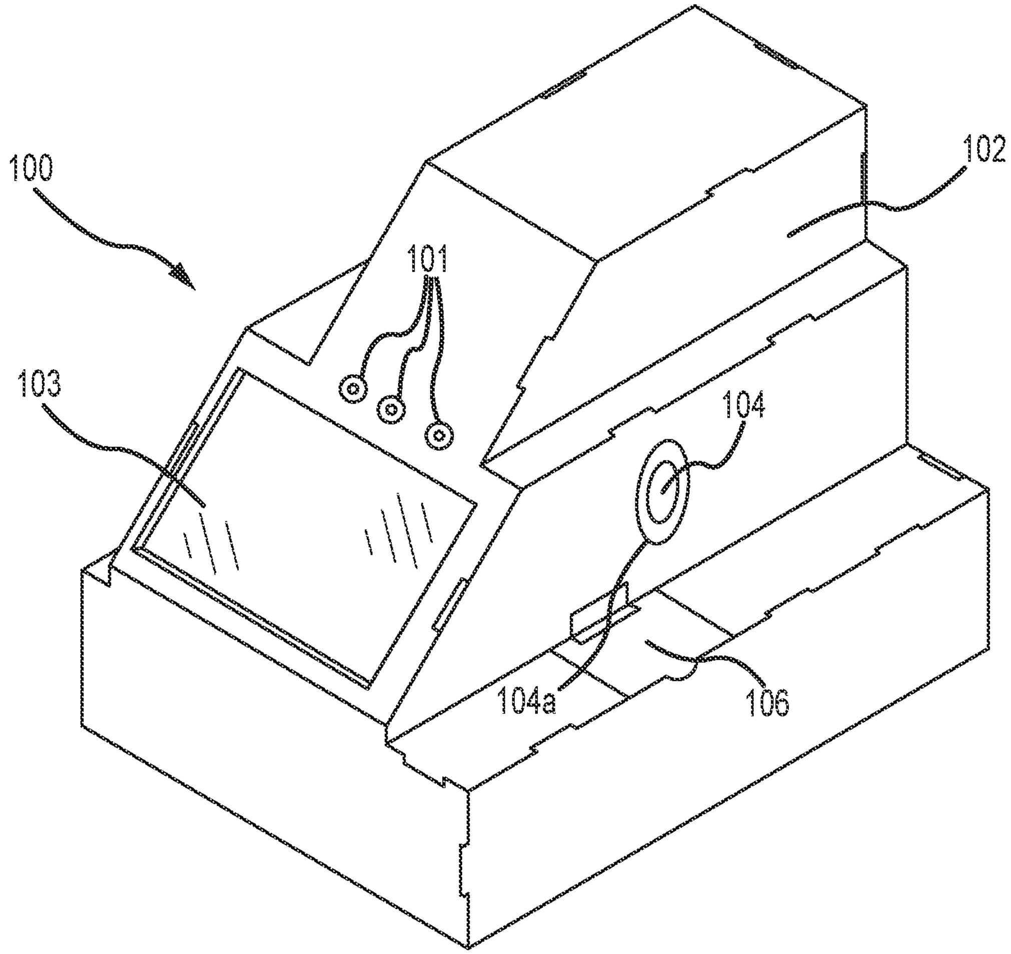
FIGS. 8A, 8B, 8C, and 8D, provide front isometric views of a further alternative pill dispenser hereof.

In some more particularity, the alternative implementations of FIGS. 8A-8D may include the following. For example, FIG. 8A shows a pill dispenser 100 including a housing 102 and with a touchscreen or user interface 103 (in other depictions a display 14/1104), which may be or include a touchscreen or otherwise and/or may provide visually and/or aurally perceived communications to a user, and if a touchscreen or otherwise may receive input communications from a user. A set of one or more buttons 101 may also/alternatively be provided for user interaction, input or the like, though again, same might be provided by touchscreen or other inputs, as for example from/through wireless or cabled communications, USB or Wi-Fi or otherwise to and/or from the device 100.

Figure 8B:
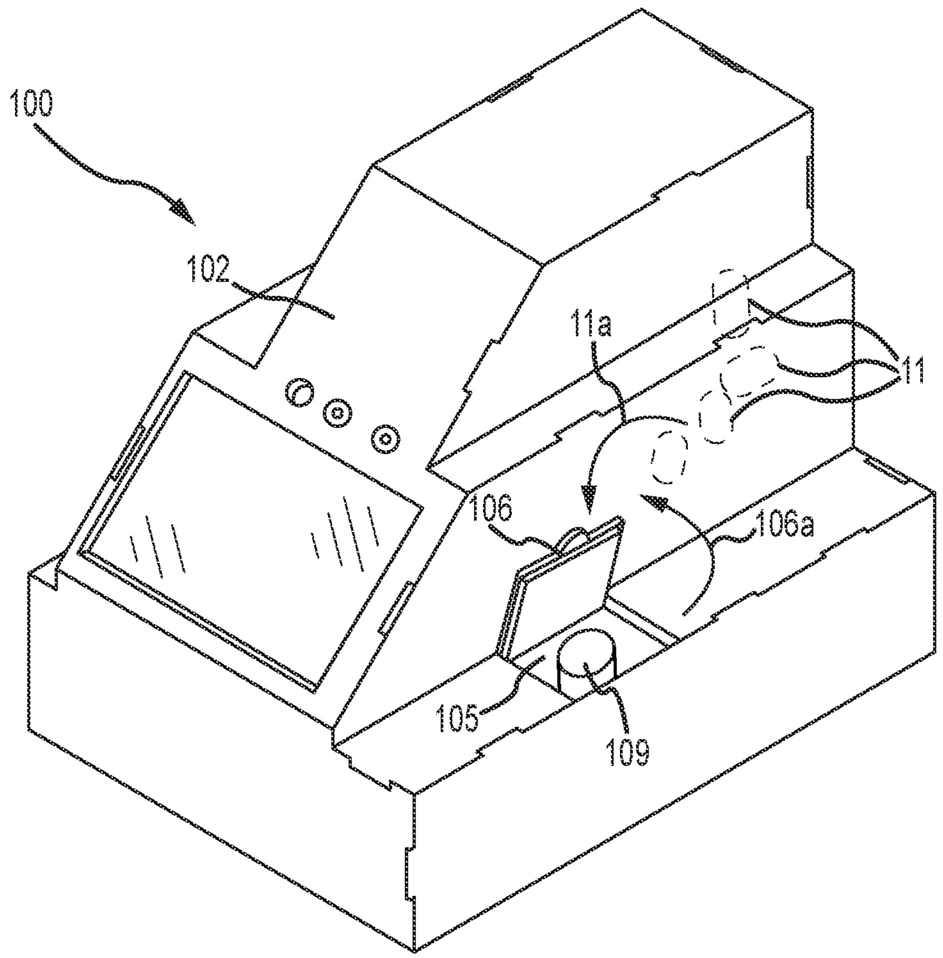
Figure 8C:
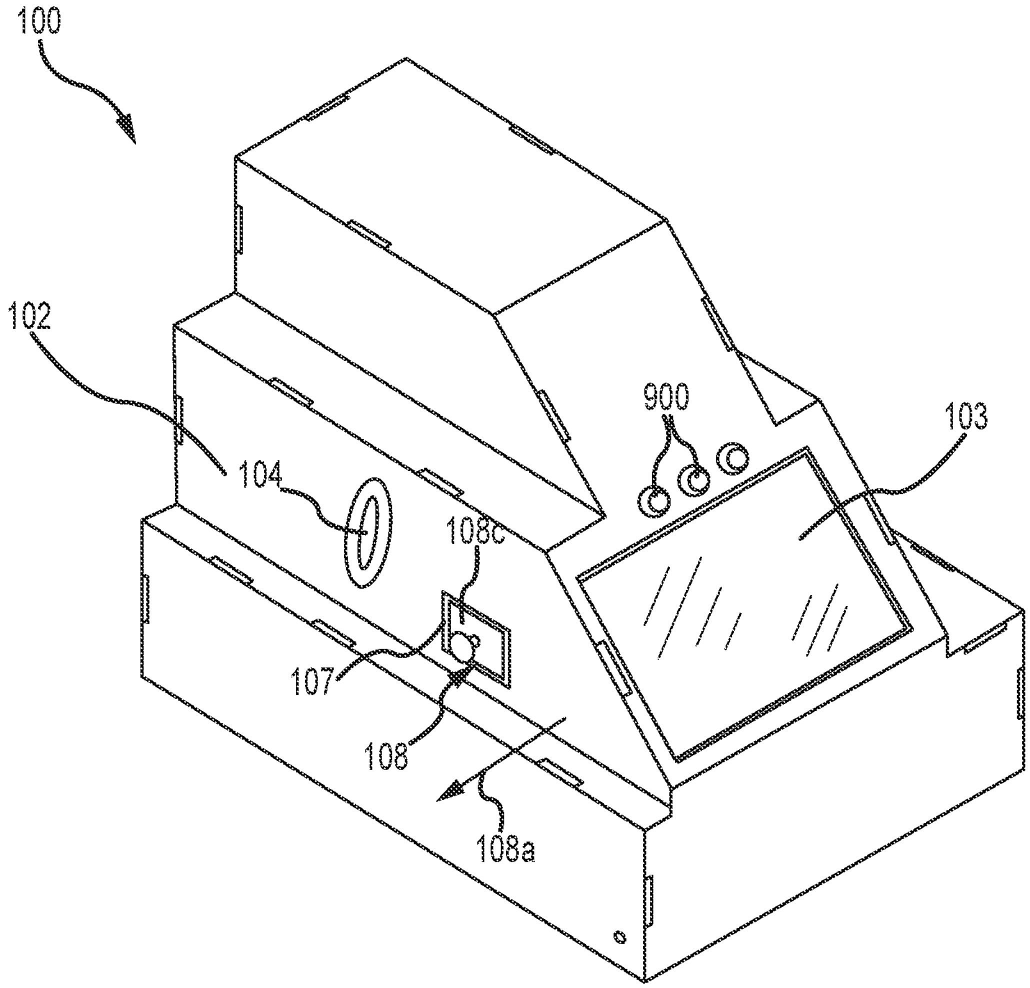

Further shown are respective openings 104*a* in and/or through the housing 102; represented in some instances by a hole pattern allowing sound from one or more speakers 104 which are mounted internally to openings 104*a* on either side of the device 100 as seen in FIGS. 8A and 8C.

Further shown, as in FIG. 8B, is a respective opening 105 that in a non-limiting exemplar implementation, is shown disposed in and/or through the housing 102; represented here by a door/lid 106. In the presently described and shown implementation of FIGS. 8A, 8B, 8C and 8D, inter alia, the door 106 is on a hinge (or alternatively the door may be slide-able) moveable toward the top (as indicated by arrow 106*a*) to an open position as shown in FIG. 8B, to provide for ingress for one or more pills 11 (four exemplar pills 11 shown in dashed lines) (ingress, as indicated generally by arrow 11*a* in FIG. 8B). Such pills 11 are received within one or more particular pill storage bin (pill bottles) 109 (shown in FIG. 8B) as described further below. A motor which may be disposed to actuate the door is not shown.

Figure 8D:
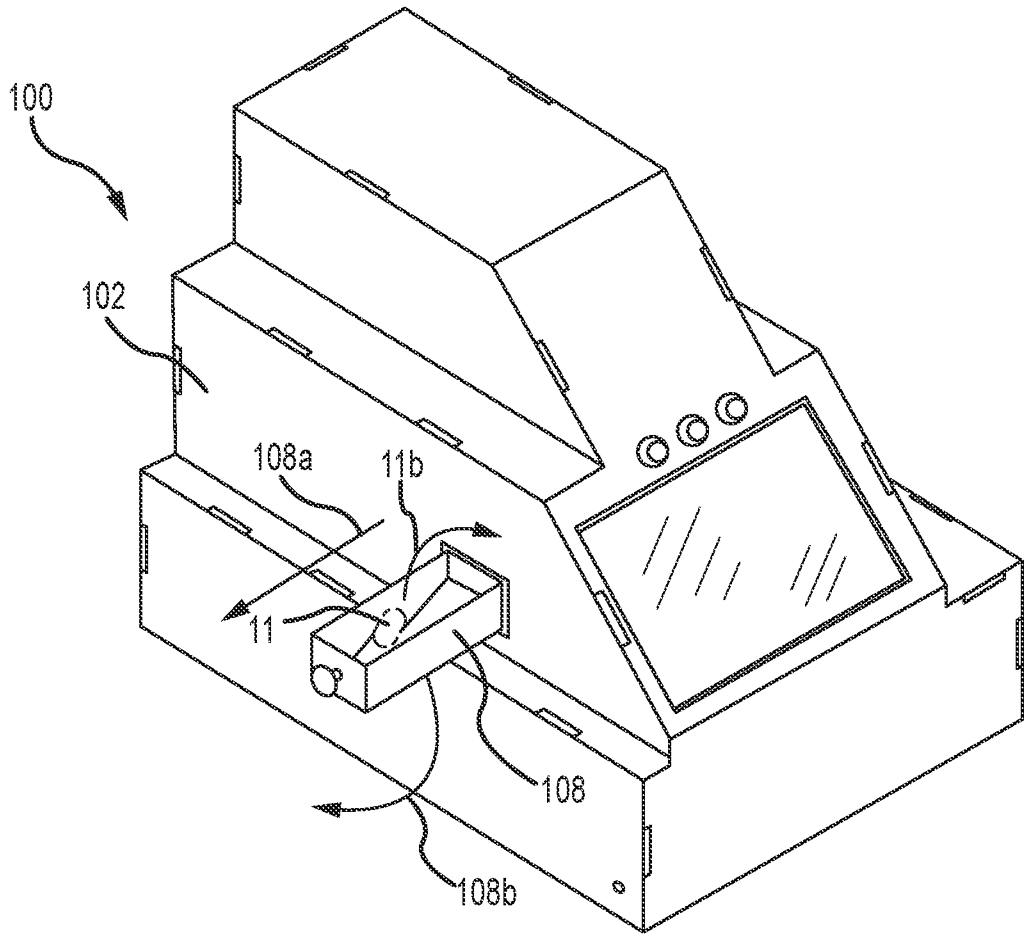

Further shown, as in FIGS. 8C and 8D, is a respective opening 107 that in another non-limiting exemplar implementation is shown as it may be disposed in and/or through the housing 102; represented here by the front surface of a moveable output cup 108 that may also include a door (slidable or otherwise) or other covering. In the presently described and shown implementation of FIG. 8C, inter alia, the output dispensing cup 108 is moveable away from the housing 102 (as indicated by arrow 108*a*) to an open position as shown in FIG. 8D, to provide for egress from the device for one or more pills 11 (one exemplar pill 11 shown in dashed lines) (egress, as indicated generally by arrow 11*b* in FIG. 8D). Such pills 11 are removed from output dispensing cup 108 (shown in non-limiting exemplar form in FIG. 8D).

Then, per the operation of the device 100 (described further below), one or more pills 11 will be delivered to the user as shown by/in FIG. 8D. In FIG. 8D, shown is a movement of a pill output dispensing cup 108 having a pill 11 (only one pill 11 shown in FIG. 8D) therein moved out translationally from the interior of the dispenser 100 (as represented by arrow 108*a*) ready for removal by a user (see arrow 11*b*). Note, the output dispensing cup 108 may be, as shown in one non-limiting interpretation of FIG. 8D, pivotally disposed to allow for optional tilting thereof (as shown by arrow 108*b*; down to the front for one option of an ultimate delivery).

Figure 9A:
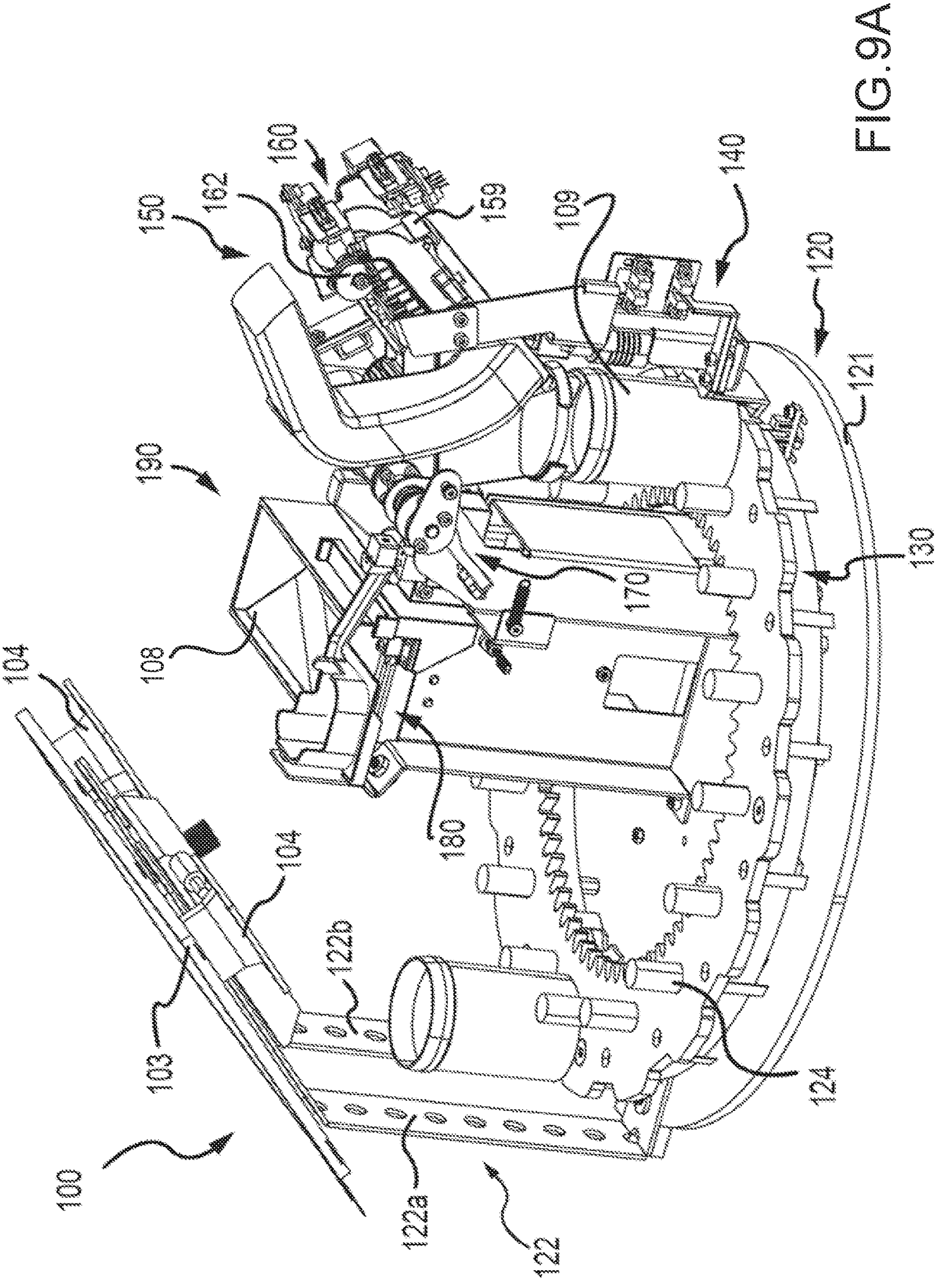
FIG. 9A provides a partially cut-away isometric view of many interior components of a further alternative pill dispenser according hereto.
Figure 9B:
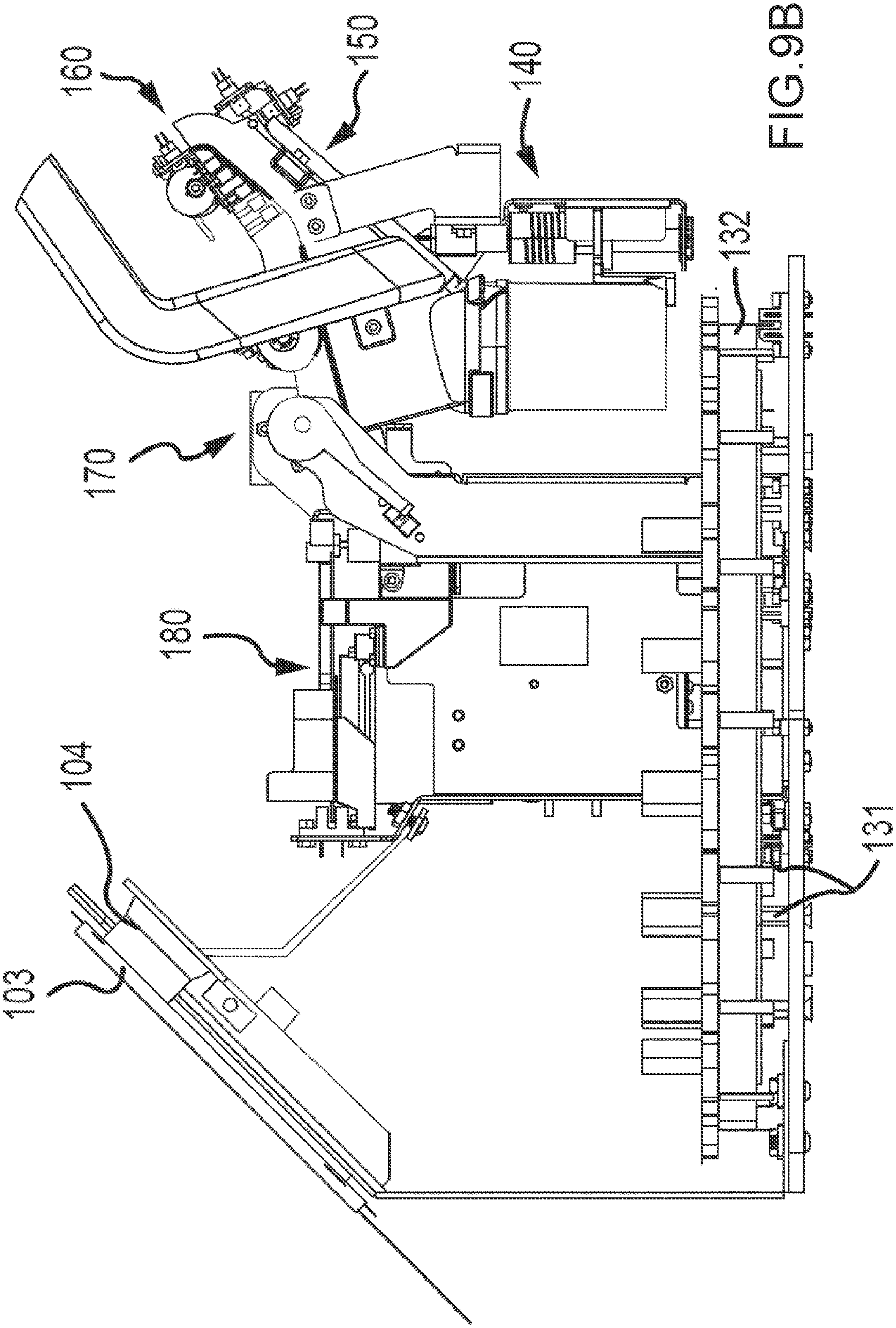
FIGS. 9B and 9C provide partially cut-away elevational view of some interior components of an alternative pill dispenser according hereto.
Figure 9C:
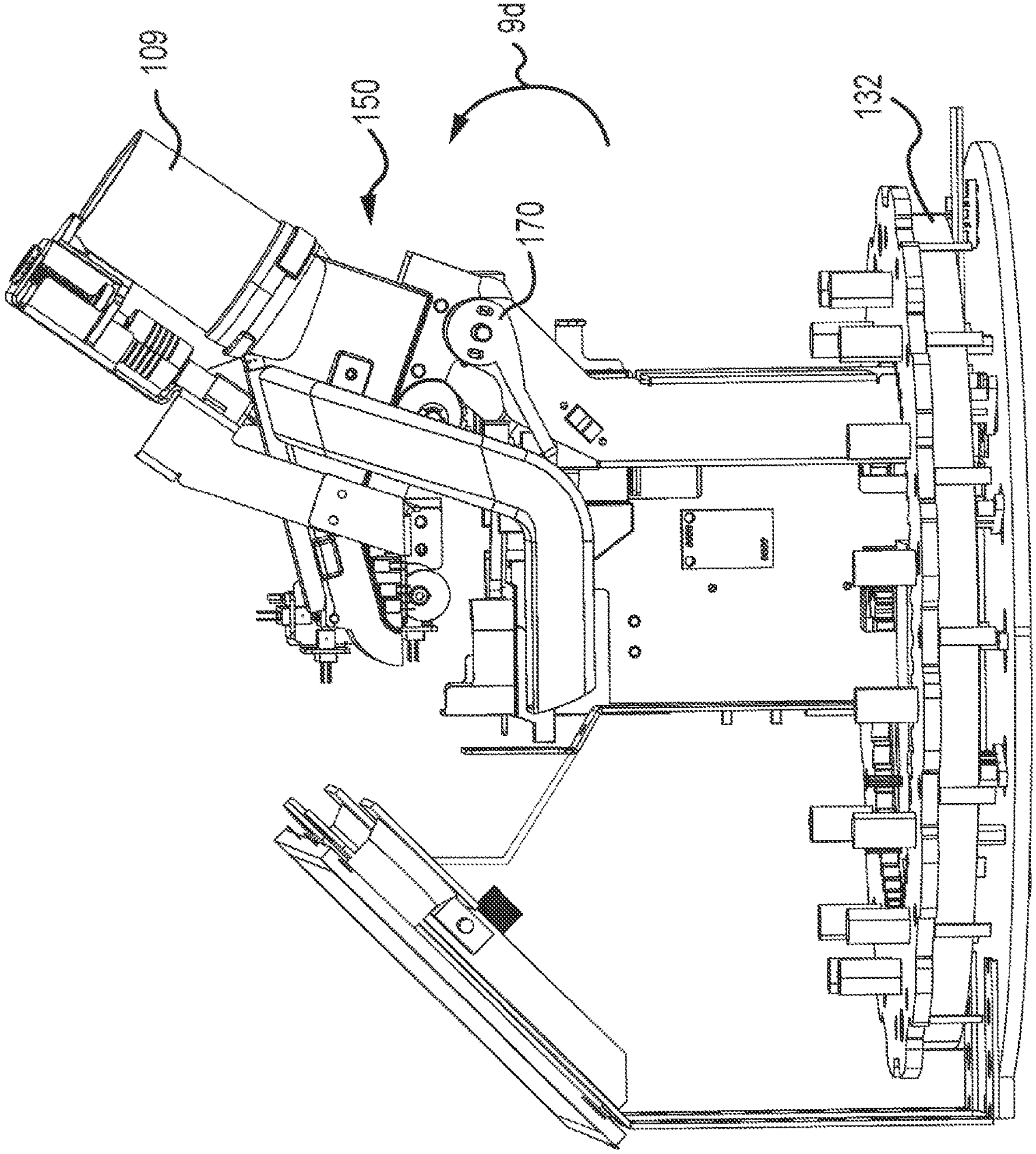

An isometric view of many alternatively-implemented internal working components of an exemplar pill dispenser 100 hereof is shown in FIGS. 9A, 9B and 9C. FIGS. 9A, 9B and 9C shows some of the major components of a pill dispenser 100 which may in this implementation, inter alia, include disposed in and operationally connected to a frame sub-assembly 120, an optional operationally rotationally movable turntable sub-assemblage 130 on or to which is/are disposed one or more pill storage bins or bottles 109, a motor driven, pill storage bin (bottle) moving lifter sub-assembly 140, an operationally rotationally movable nozzle sub-assembly 150; though shown in FIGS. 9A, 9B and 9C is moreover shown in detail in FIGS. 12A-12D. Each rotationally movable nozzle sub-assembly 150 has a pill control sub-assembly 160 (door 159 and cam(s) 162) described further below; see FIGS. 12A and 12B, inter alia; though shown in FIGS. 9A, 9B and 9C is a separate representative nozzle control sub-assemblage 170 in some instances also referred to as a rotational control sub-assembly. Still further sub-assemblies including a scale and swiper sub-assembly 180 and an output dispensing cup sub-assembly 190 are also shown in FIGS. 9A, 9B and 9C; these are described further below.

Figure 10A:
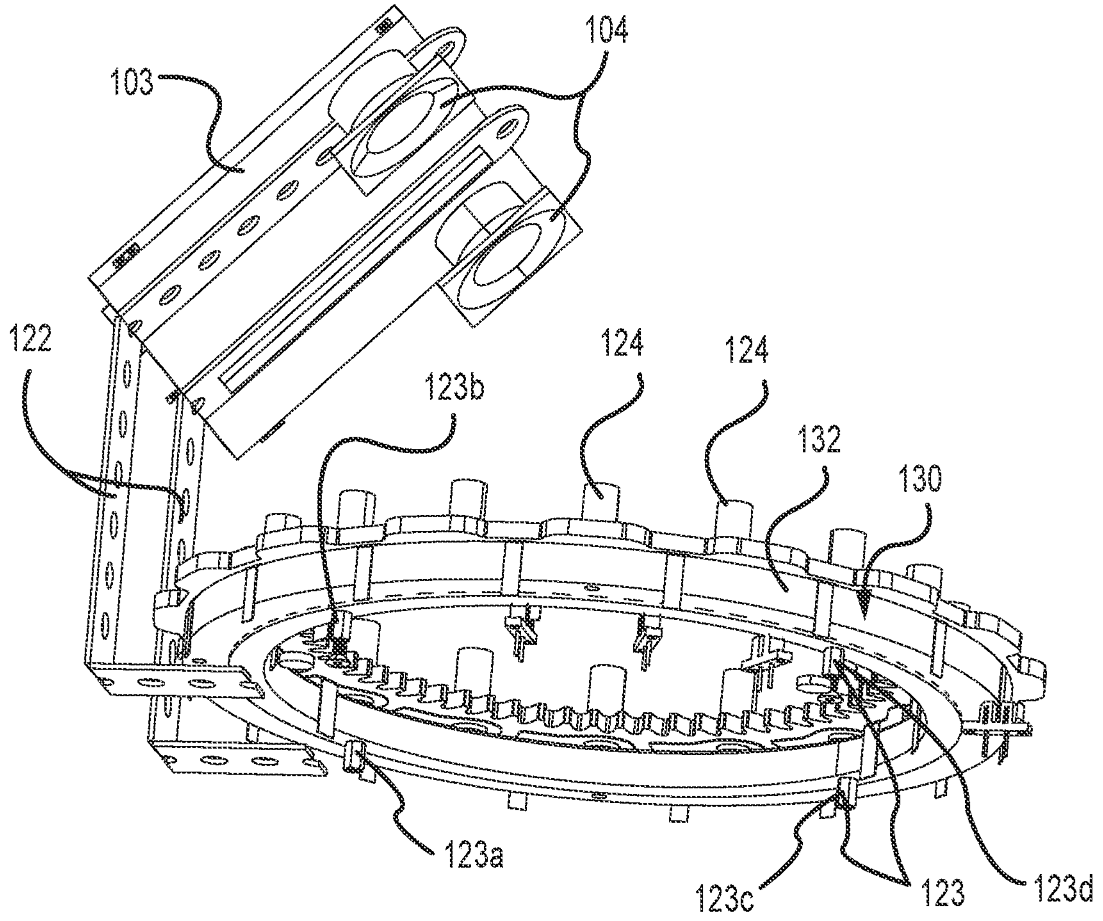
FIGS. 10A, 10B, and 10C provide isometric views of some interior components of a further alternative pill dispenser according hereto.

As shown at least in FIG. 9A, the frame sub-assembly 120 may include a main base plate 121 to which may be affixed one or more support arm/s 122 (such arms identified in FIGS. 9A, 9B and 9C); shown as respective arms 122*a* and 122*b* in FIGS. 9A, 9B and 9C (reference to an arm 122 includes one or more or all of the sub-part arms 122*a* and/or 122*b* unless otherwise specified) and rotational sub-assembly 130 mounting posts 123 (such posts identified in FIG. 10A. (reference to mounting post(s) 123 includes one or more or all of the sub-part posts 123*a*, 123*b*, 123*c* and/or 123*d*, unless otherwise specified). A touchscreen 103, whether resistive touch or capacitive touch, and one or more audio speakers 104 are shown in FIGS. 9A, 9B and 9C and in FIG. 10A.

Focusing next on the rotational sub-assemblage 130 as shown in FIGS. 9A, 9B and 9C, 10A and 10B (shown without the other sub-assemblies 140, 150, 160, 170, 180 and 190 disposed relative thereto), this may be disposed on/in the frame sub-assembly 120 and may in some alternative implementations be rotational therewithin and relative thereto. I.e., in this described implementation, the frame 120 is relatively fixed and the rotational parts of rotational sub-assembly 130 rotate relative thereto about an axis centered in the turntable bearing 132. Turntable bearing 132 rotates relative to the fixed mounting posts 123 (stand-offs) as shown in FIG. 10A. Alignment posts 124 are spaced uniformly and/or regularly around the turntable attached gear plate 134 of the rotational sub-assembly 130. The alignment posts 124 are in many instances round in shape and project and extend vertically from the gear plate 134. The alignment posts 124 allow the pill storage bins 109 to be consistently placed in a desired position on the turntable attached gear plate 134. Note, the gear plate 134 may be configured for alternative numbers of collection bins 109, from one (though with one, the turntable may be an option not implemented with no need for alternative pill bins to be used) to any reasonable or practical number; the collection bins being located at each of the inlets on the gear plate and that the platform is able to lift the collection bin by engaging the collection bin on the portion that it overhangs on the gear plate at each of the inlets. The alignment posts 124 may also keep the pill storage bins 109 held steady and in the proper place and position when the pill-lifter sub-assembly 140 engages and lifts a pill storage bin 109 from its resting position on turntable 132, as further shown and described in FIG. 11A, inter alia. In an alternative embodiment, not shown, a small magnet may be placed or integrated at positions around the gear plate and a small metal portion may be attached to the bottom of each bottle. In this way, the bottle may be consistently positioned at, and returned to, the appropriate and desired location on the gear plate after each use.

Figure 10B:
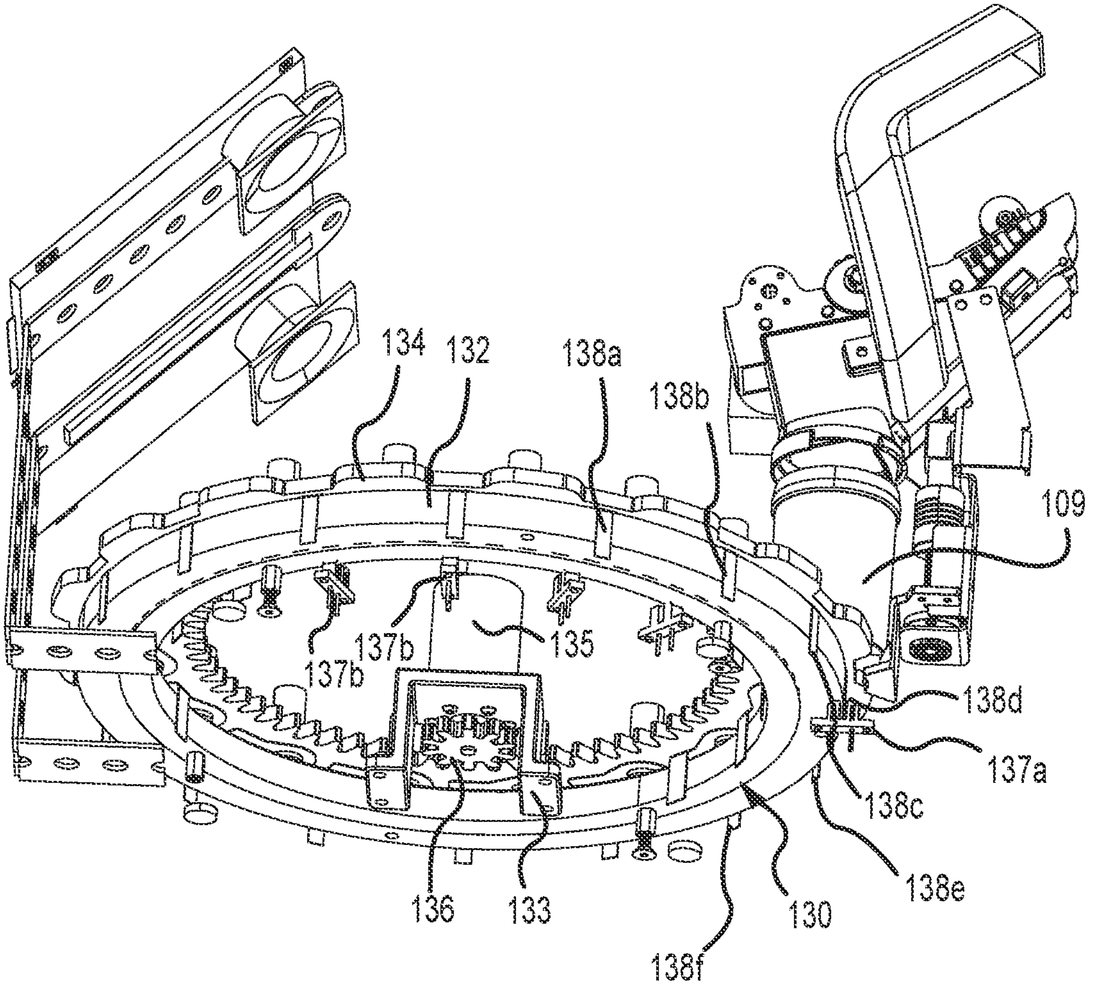

A motor mount 133 is also shown in more detail in FIG. 10B. In the shown implementation, turntable 132 is another rotational component or part of sub-assembly 130 and is rotatable/rotated therewith. A motor 135 (FIG. 10B) may be fixed to motor mount 133 with a drive gear 136 which engages with the turntable attached gear plate 134. Here shown is engagement of drive gear 136 with gear plate 134 which is directly attached to the upper (moveable) component of the turntable 132, by which the motor 135 rotates the turntable. The rotational connection/communication may be one or more of many sorts and may include, inter alia, a belt drive (not shown), gears 136 or a frictional engagement of the motor 135 with a surface or edge of the gear plate 134 and/or turntable bearing 132.

Figure 10C:
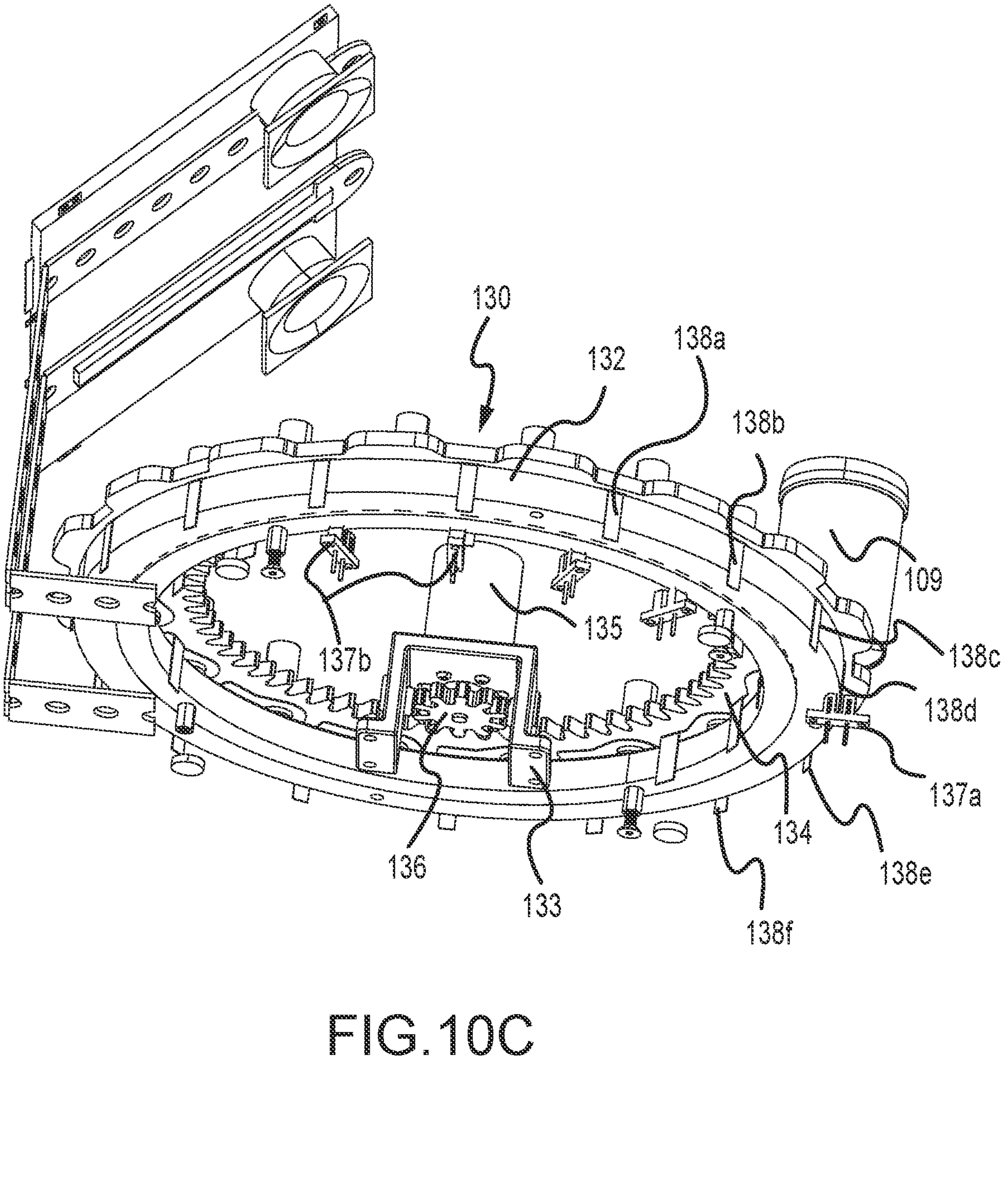

The turntable 132, if used, may be used for, inter alia, spinning the gear plate 134 upon which sit multiple movable pill storage bins 109 (as in FIGS. 10B and 10C, inter alia); and/or may be used for positional control and/or sensing. For this latter purpose, shown also in FIG. 10B is inclusion of an array of optional sensors 137 (reference to optical sensors 137 includes discrete sensors 137*a*, 137*b*) that may also be disposed to operationally interface with one or more parts of an encoder wheel; see flags or projections 138, which are referred to as "contacts" in wheel encoding terminology even in non-contact examples; hence, projections 138 are referred to as contacts. Contacts 138 are defined by and include the disparate contacts 138*a* and 138*b* as shown in FIG. 10B, inter alia (reference to one or more contacts 138 includes one or more or all of the sub-part contacts 138*a*, 138*b*, 138*c*, 138*d*, 138*e* and 138*f*, inter alia; potentially one or more not shown) to provide angular position information to control electronics or control system (described below). In some implementations, the contacts 138 correspond with the desired general position that an individual pill storage bin 109 may occupy on the gear plate 134. For example, in the turntable of FIGS. 10A, 10B, and 10C, there may be sixteen different positions available on the gear plate 134; however, in other examples there may be 2, 3, 4, 5, 6, 7, 8, 9, 10, 11, 12, 13, 14, 15, 17, 18, 19, 20, 21, 22, 23, 24, or more discrete positions available on the gear plate 134, and thus there may be an individual and discrete contact 138 to correspond to the discrete position on the gear plate 134. The array of strategically placed sensors 138 can be optical, electrical (e.g., capacitive), magnetic, contact or other form of sensor placements to sense corresponding indicia, here contacts, on the turntable or shaft or other part of the rotating sub-assembly. Though a variety of encoding options might be used (e.g., binary, et al.); in some alternatives, Gray encoding may be used.

In operation in short, when the turntable 132 is rotated by engagement of the motor 135 via gear 136 and gear plate 134, different combinations of contacts 138, or no contacts, will be disposed adjacent the sensors 137 and the array of sensors may be disposed to sense the relative presence or absence of those none, one or more contacts 138 (again, including one or more sub-part contacts 138*a*, 138*b*, 138*c*, 138*d*, 138*e* and 138*f*, inter alia), and by that information determine the relative position of the turntable 130 and by consequence any pill storage bin 109. The array of sensors are placed in two distinct locations, at different circumferences from the center point. Each pill storage bin 109 position/location contains an index contact 138*a*. A single sensor on the same circumference can then determine that a pill storage bin 109 is in position (index location) for movement of the storage bin and eventual extraction of pills. When stationary at this position, referred to as Index, a different set of sensors and contacts 138*b* or 138*c* or other, placed at a different radial position will determine an absolute position, referred to as Address, depending on the readings of those address sensors.

By this, the control electronics or control system will 'know' the location/position and therefore which pill storage bin 109 will there be disposed. In FIG. 10B, it appears that only contacts 138*a* is in relative of range of lone sensor 137*a* indicating a stop position (index) in order to read other sensors 137*b* to determine position of the turntable. And, referring briefly back to the view of FIG. 9A, inasmuch as any of the pill storage bin 109 can be rotated to the desired position; here, however, shown is pill storage bin 109 in the desired position/location relative to the pill storage lifting sub-assembly 140 (see FIGS. 11A and 11B described below); more details of the operation and relative dispositions of which to be provided below, the note being that a particular arrangement of contacts can be used to establish what pill storage bin 109 is disposed after rotation to be at the particular designated position for further operation/pill receiving and/or delivery. If and when a different pill or group of pills from/to a different pill storage bin 109 is desired to be delivered or received, then, the motor 135 may actuate and thereby be used to rotate the overall movable parts of the turntable sub-assembly 130 to move the newly desired pill storage bin 109 to the required position for delivery or receipt. Note, a number of robust alternative rotary position sensors may be available and/or substituted herefor.

Further shown in FIGS. 9A-9C, and to be described in further detail below are several parts of the pill storage lifter sub-assembly 140, the pill handling sub-system 150 (including sub-assemblages 160 and 170), the scale sub-assembly 180 and the output dispensing cup sub-assembly 190.

Figure 11A:
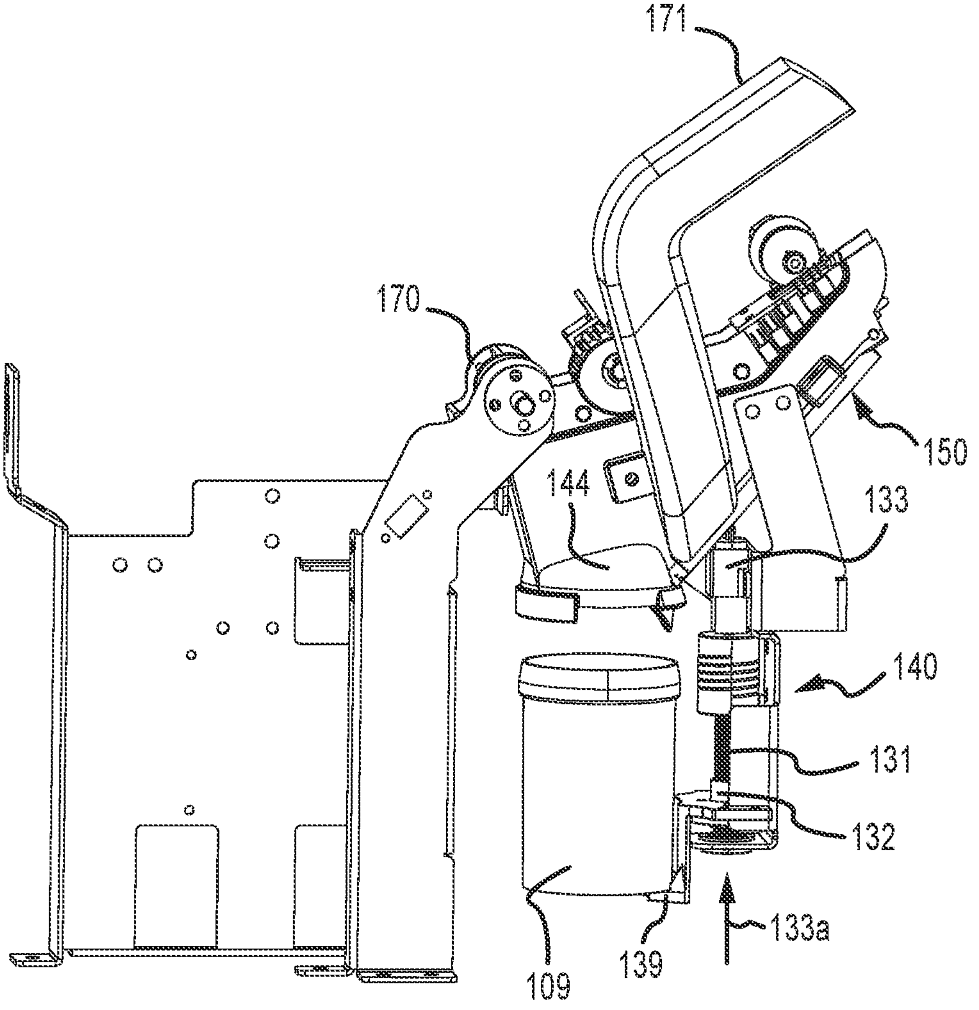
FIGS. 11A and 11B provide isometric views of some interior components, some partially cut-away, of a further alternative pill dispenser according hereto.
Figure 11B:
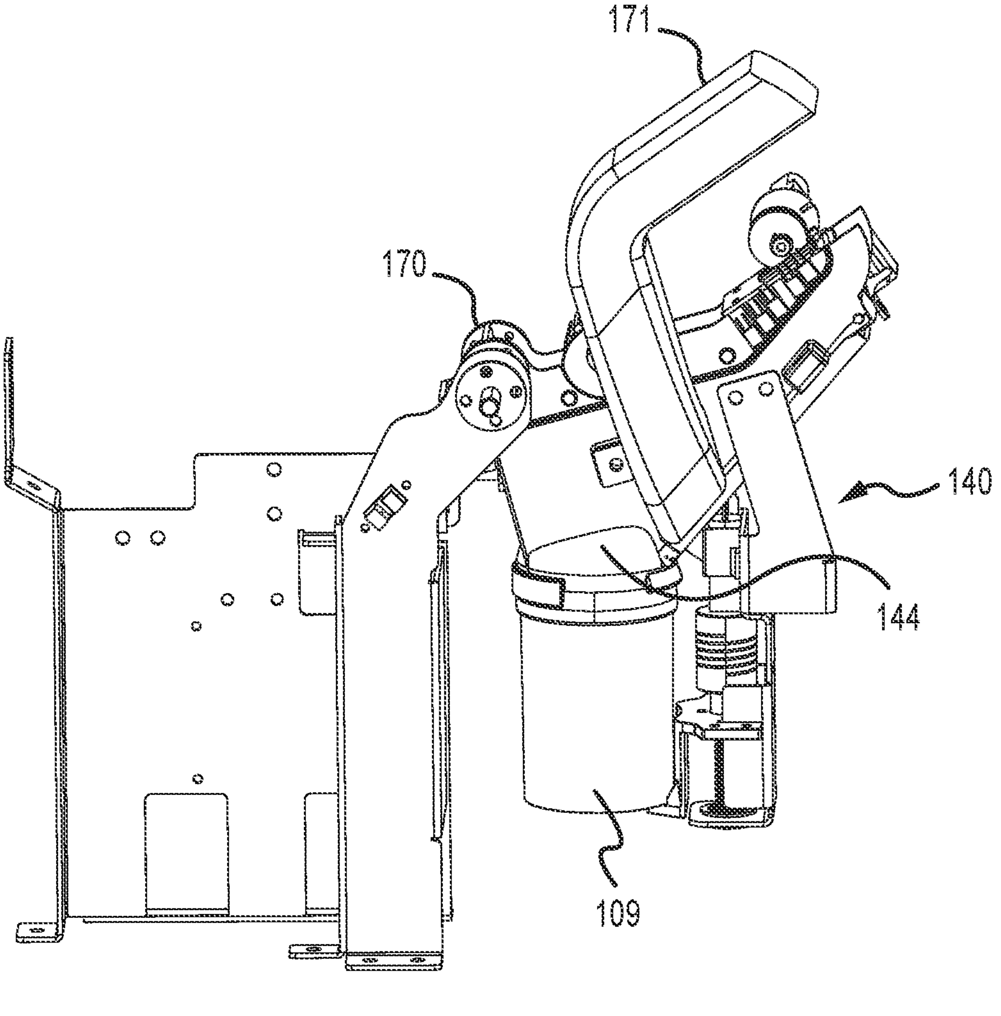

More details of pill storage lifter sub-assemblies 140 will now be described, with at least initial particular detail relative to FIGS. 11A and 11B. A trapezoidal lead screw 131 is used in this first implementation in conjunction with matching trapezoidal lead nut 132 and motor 133 to move platform 139 in the direction of arrow 133*a* to engage with pill storage bin 109. This engagement of pill storage bin 109 secures the top of the pill storage bin 109 to the pill collection nozzle or funnel 144 of sub-assembly 150. The purpose of this pill storage lifter sub-assembly is to secure the pill storage bin 109 with the pill collection funnel 144 for delivery of one or more pills to the delivery mechanisms and for return of excess or unused pills back to a storage bin 109. FIG. 11B shows platform 139 engaged with the pill storage bin 109 and thereby holding it to pill collection funnel 144. FIG. 9B shows pill storage bin 109 fully engaged with lifter sub-assembly 140.

Figure 12A:
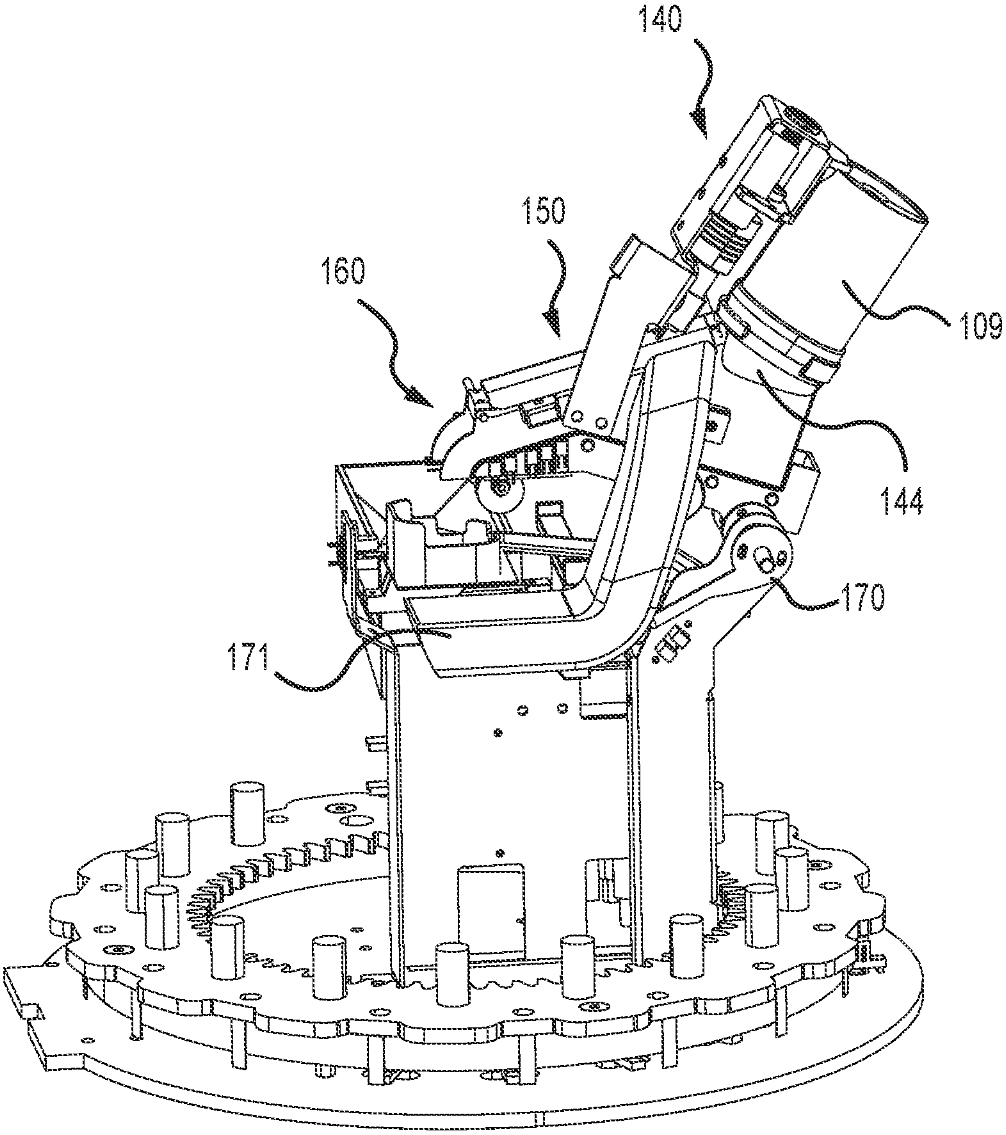
FIGS. 12A, 12B, 12C, and 12D, provide isometric views, some partially cut-away, of some interior components of a further alternative pill dispenser according hereto.
Figure 12B:
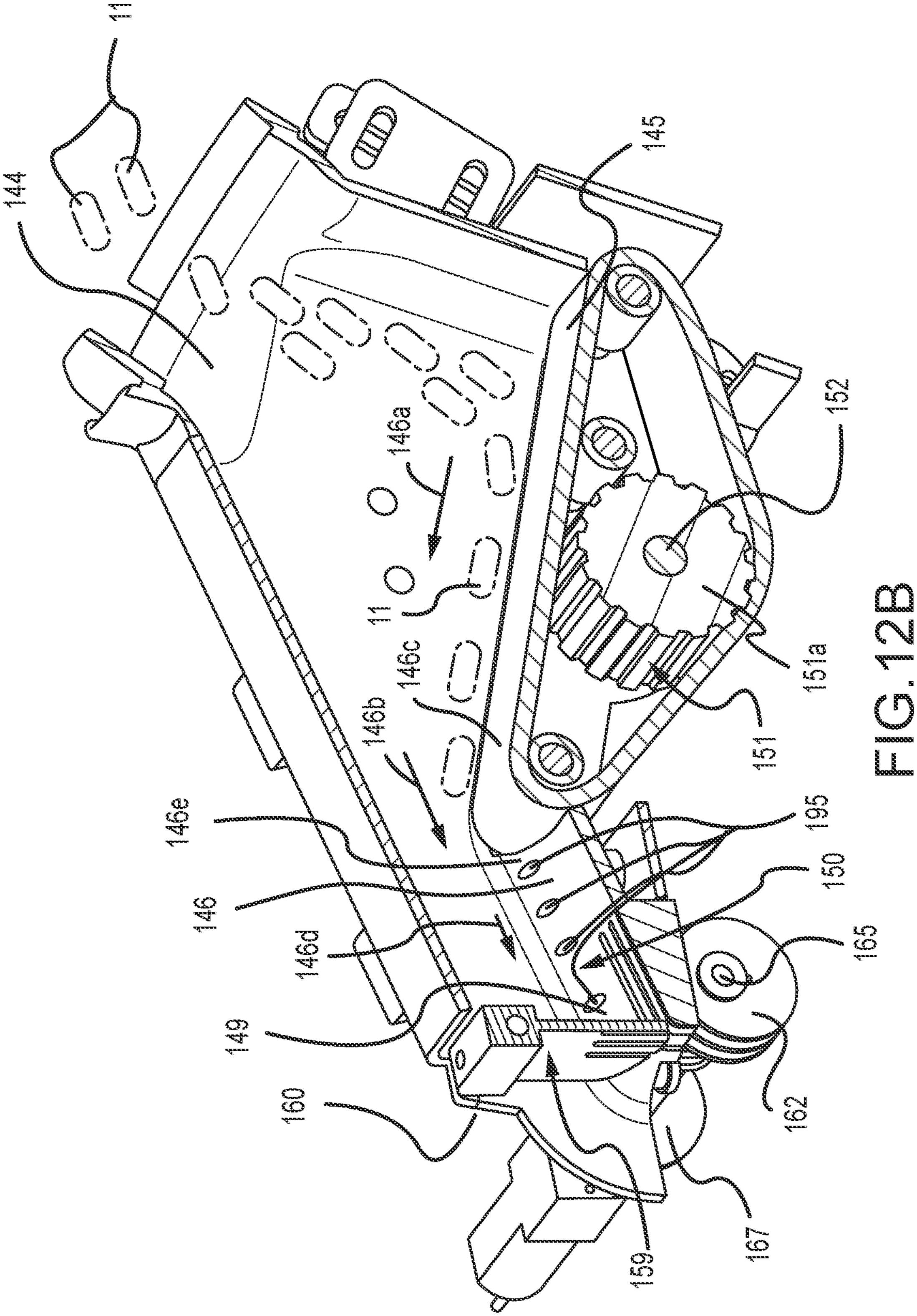
Figure 12C:
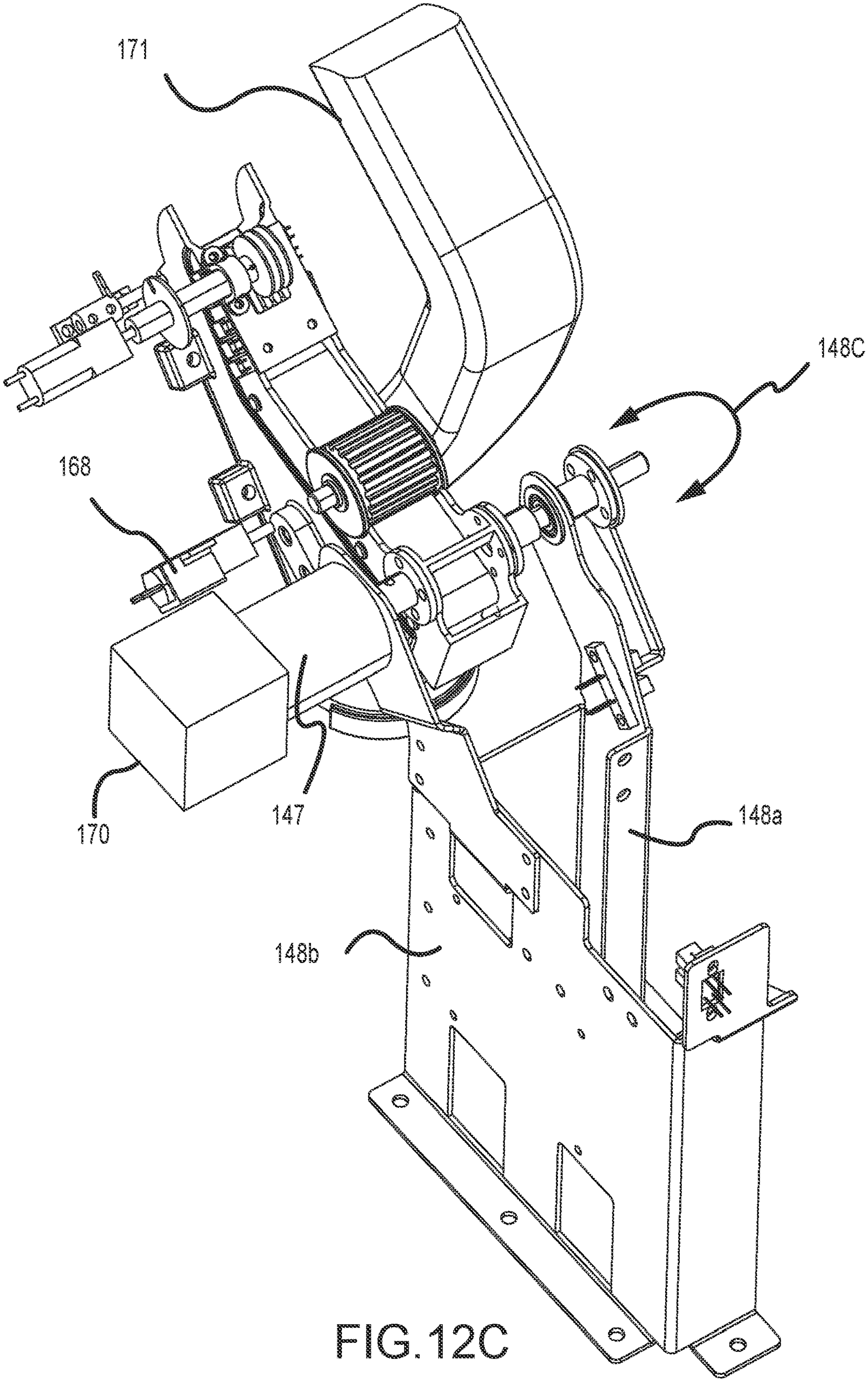

Also included as introduced relative to FIGS. 9A-9C may be one or multiple pill (singularizing) handling sub-assemblies 150 including sub-assemblages 160 and 170 which are shown and described in more detail in and relative to FIGS. 11A, 11B, 12A, 12B, and 12C inter alia. Each sub-assembly may, as shown in FIGS. 12A-12D include one pill collection nozzle or funnel 144, one or more ridged conveyor belts 145 (as in FIG. 12B), a chute or slide 146 and gate/delivery sub-assemblies 160 (all described further below), all of which being operationally rotatable on a respective nozzle mount 148 (148*a* and 148*b*; see FIG. 12C) by motor 147. These one or more pill handling assemblies 150 are in this implementation attached to mount 148, shown in FIG. 12C and is thereby rotatable therewith. FIG. 12C (and FIG. 9A) shows sub-assembly 150 in an orientation, home position, in which it can receive a pill storage bin 109 for dispensing. FIG. 9C shows sub-assembly 150 having rotated to an orientation for pill dispensing after the lifter motor 133 has attached pill storage bin 109 with pill collection bin 144 via lifting it and connecting via subassembly 150 as shown in FIG. 11B.

More details of pill handling (singularizing) sub-assemblies 150 will now be described, with at least initial particular detail relative to FIGS. 12A-12D, inter alia. The pill handling sub-assembly 150, as introduced above, is open to receive pills, here as defined as pill collection nozzle or funnel 144 to allow for pill loading (as from pill containers 109 when attached by the pill container lifting mechanism (subassembly) 140 as shown in FIGS. 12A and 11A and 11B.) A section of and/or communicative with the interior of each pill handling subassembly 150 may include a motor driven conveyor belt 145 which receives and delivers a desired and/or programmed and/or practical number of pills 11 to be placed into the corresponding pill trough or chute 146. This can be seen in further detail in FIG. 12B, for example, where one or more pills 11 may be picked up by the conveyor 145 in or from the pill collection nozzle or funnel 144 as connected to the pill container storage 109 due to the rotation of the pill lifter subsystem 140 and then carried by the conveyor belt 145 to a chute 146 toward (see arrow 146*a*) and delivered at sub-assembly 160 exit area or location 149. Chute 146 is also often herein also referred to as a slide 146. In FIG. 12B, the conveyor 145 receives the pill or pills 11 from the pill collection funnel 144 and moves the pill or pills 11 in direction of arrow 146*a* and then delivers them to a location where the pill or pills 11 fall, see arrow 146*b* from the conveyor belt 145 to the chute 146. Though a slightly lifting conveyor is shown here, a relative lateral or even decline conveyor (neither shown) could instead be used in an appropriate arrangement. It should be noted that, slide 146 is relatively straight in this implementation in FIG. 12B; however, in other examples such as those of FIGS. 4B and 4C, inter alia, the slide 146 may be curved or rounded to deliver the pill to the desired location.

A conveyor moving sub-assembly 151 may be as shown (unshown alternatives may be used instead). Such a conveyor moving sub-assembly 151 is shown in detail in FIG. 12B (inasmuch as a portion of the chute/slide 146 is shown cut-away in FIG. 12B). An internal toothed drum 151*a* is shown as it might engage the external ridges of the conveyor belt which spins the conveyor 145. To get the internal tooth drum 151*a* to turn, the shaft 152 is engaged by a motor 168 (shown in FIG. 12C).

First, returning to FIG. 12B, gravity may be used as shown to assist in delivery from the conveyor 145 to the chute 146, the pill or pills 11 falling from the conveyor 145 at the top or delivery end/location 146*c* thereof. The pill or pills 11 may then move along chute 146 as shown by arrow 146*d*. Here also, gravity may be used to assist in having the pill or pills 11 slide down the chute or slide 146, or the chute may be rather disposed for lateral movement or even upward movement depending upon circumstances and movement assist options that might be used. The pill or pills 11 would then be delivered to the next pill gate/delivery sub-assembly stage 160 described further below.

Also shown in FIG. 12C is a rotational motor 147 (may be a DC motor) that may also be used to encourage movement a pill or pills 11 along the chute 146. In an example such as that shown in FIG. 12B (although not visible in FIG. 12B), the motor 147 may be a rotational attached or operationally connected to the pill handling sub-assembly 150 so that it may cause a rotational fluctuation that results in a vibration on chute 146. The vibration can then cause the pill or pills 11 to move in and along the chute 146. Other vibratory devices or other movement assist methods or devices might be used in addition or instead. Gravity may also be sufficient in some implementations. As described further below, the pills 11 in a pill chute or trough 146 align in the trough to form a single line, generally end to end, the leading pill being at the end of the trough or chute 146 at the pill drop off location 149 (again, see FIG. 12B). This final stationary position of the pill 11 at the lower end 149 of the trough 146 is sometimes also referred to herein as "The Known Location."

Figure 12D:
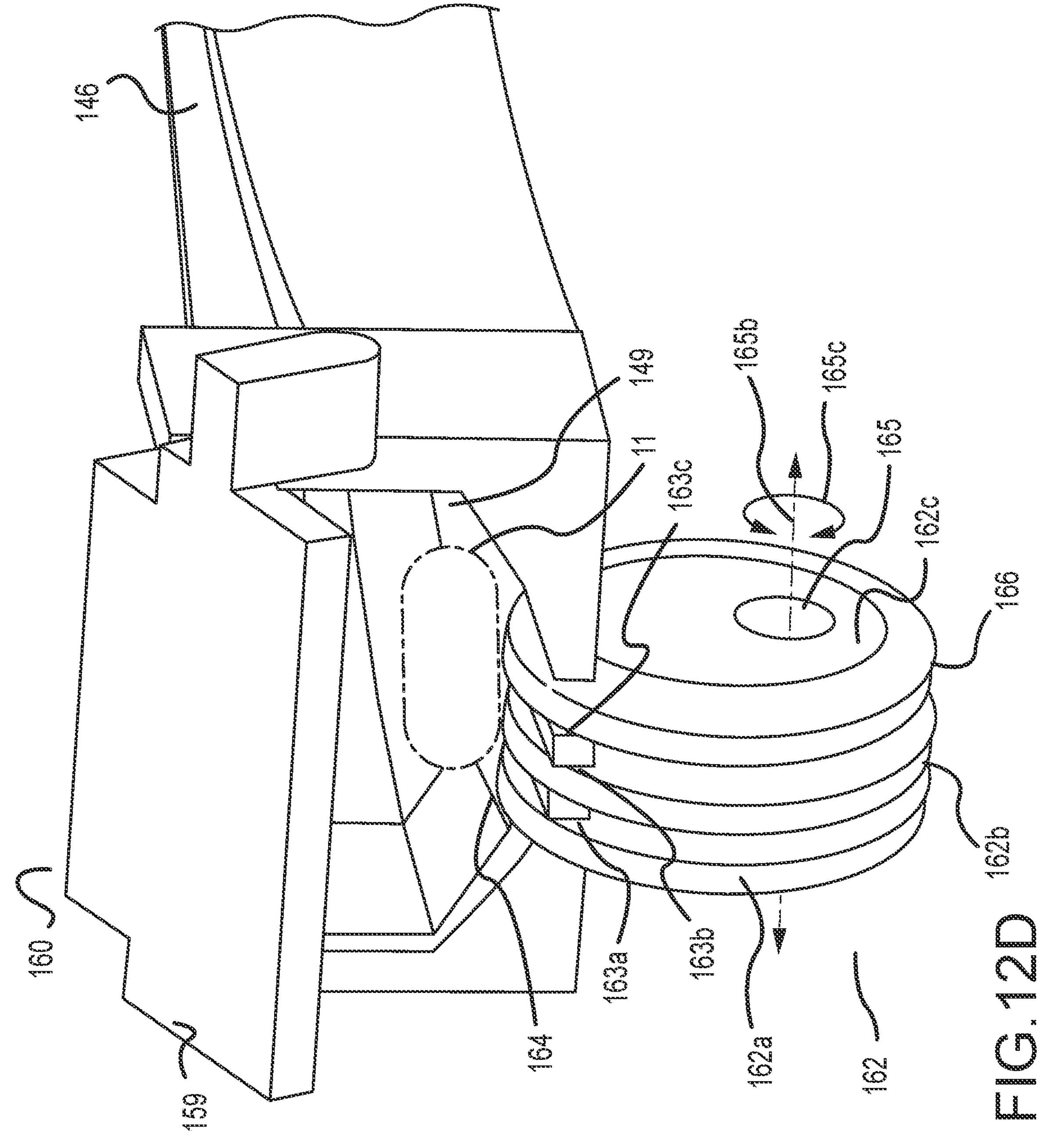

The Known Location 149 is thus disposed at and/or adjacent to the pill gate or delivery sub-assemblage 160 and more particularly at or adjacent to the door 159 of sub-assemblage 160. Though introduced above, sub-assembly 160 is shown in greater detail in FIG. 12D; the pill handling (delivery) sub-assembly 150 being shown enlarged and isolated from most of the other elements/sub-assemblies in FIG. 12B, but isometrically is shown operationally adjacent and together with other operational features 146 (or at least one or more parts thereof) in FIG. 12B. The sub-assembly 160 may, as shown in FIG. 12D, contain a gate or shutter 159 and one or more pick-up members 162*a*, 162*b*, and 162*c*, in the shown implementations also referred to as a delivery cam 162 (reference to either is intended to include one or more of these singly or in any combination herein). The shown implementation is of multiple rotational pick-up members 162, though non-rotational implementations may be used. Moreover, the shown implementation of cams 162 is as off-center cams, the cams being rotatable on a single relatively fixed axis, though off-center thereof so that alternately a smaller part and then a larger part of the cams are simultaneously rotated to and/or relative to the known location 149. The pick-up members or delivery cams 162 are shown being substantially and/or operationally near and disposed mostly below the lower end 149 of the pill trough or chute 146. The cams 162 are disposed relative to the chute 146 such that it is operatively movable within slots 163*a*, 163*b* and 163*c* corresponding to cams 162*a*, 162*b* and 162*c* defined by and within chute 146. The rotation of the cams 162 within the slots 163 is such that the cams 162 are at times disposed below the interior surface 164 of chute 146, and times above the surface 164 of chute 146; surface 164 being visible in FIGS. 12*b* and 12D. In FIG. 12D, pill 11 (shown with a dashed line) is located and positioned at the known location 149.

Also shown in FIG. 12D is an axle or shaft 165 and an engaging surface 166, both being operationally connected to pick-up and/or delivery members or cams 162. In FIG. 12D, the engaging surface 166 is shown, but, the cams 162 include only the aperture 165*a* in/through which the axle 165 is/would be disposed. An axis of rotation 165*b* is also shown in FIG. 12D with an indication at arrow 165*c* of rotation that may be used for the cams 162. The cams 162 may thus be operationally disposed upon an axle or shaft 165 (as shown and described in FIGS. 13D-13K, below) which can then impart rotation to the cams 162 to such that the cams 162 may engage a single pill 11 (dashed line representation in FIG. 12D), regardless of practical size (practical sizing including and/or meaning within an appropriate human or other animal condition; not too big to be delivered to the human or animal, and not too small to not be readily manipulatable for ordinary use), may be moved off the end of the trough or chute 146 and fall by gravity to the scale and/or dispensing sub-assemblies 180/190 as described further below, particularly with regard to FIG. 12 (defined by and including sub-part FIGS. 12A, 126, 12C, and 12D). Note, shown are eccentric or off-center cams 162, which here may be rotated about a relatively fixed axis 165 such that initially, the smaller part of the cams 162 is adjacent the known location 149, and then in further rotation, the larger part of the cams 162 rotates up into the slots 163 to the known location 149 eventually rising above surface 164 (if only minuscule, though to whatever extent necessary to engage and move a pill 11) and thereby engaging pill 11. Continued rotation moves the pill off surface 149, whether by lifting pill 11 off surface 164 or simply moving pill 11 along the surface 164 to ultimately drop off as described below. Other shapes or types of cams or moving members 162 may be employed in alternative to the desired effect.

Figure 13A:
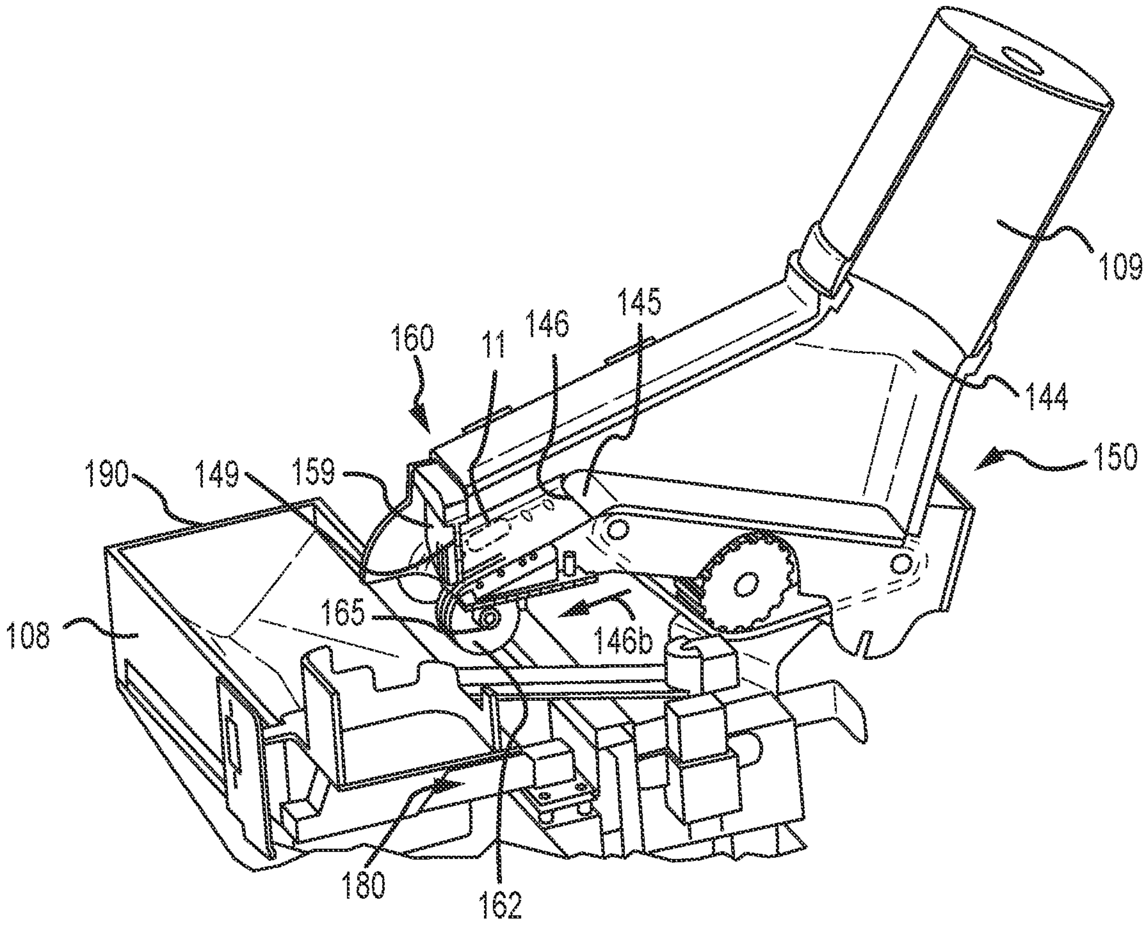
FIG. 13A provides a partially cut-away isometric view of some interior components hereof.

A pill delivery option will now be described relative to FIG. 13 (defined by and including sub-part FIGS. 13A, 13B, 13C, 13D, 13E, 13F, 13G, 13H, 13I, 13J, 13K, 13L, and 13M). First, shown in FIG. 13A is a corresponding pill handling control sub-assembly 150, a scale sub-assembly 180 and an output cup sub-assembly 190. The dominant parts thereof include pill collection funnel 144, conveyor 145 and chute 146 of pill handling assembly 150; gate/door 159, cams 162, shaft 165 and pill handling/engaging surface location 149 of sub-assembly 160; and output dispensing cup 108 of sub-assembly 190. Continuing the progression of a pill through a system or sub-combination hereof as from FIG. 12B; where a pill 11 was taken from a conveyor loading area 146*c* in a direction 146*b* on the conveyor 145 to a pill dropping location 146*e*, dropped in a direction 146*b* to the pill receiving location 146*e* of slide/chute 146; the pill then sliding along the slide/chute 146, first in direction 146*d* ultimately to the pill known location 149 (all shown in FIG. 12B). Shown as a furtherance thereof in FIG. 13A is a directional arrow 146B indicating a movement of the pill 11 along the chute/slide. Arrow 146*b* shows the pill 11 on final approach to the pill known location 149.

Figure 13B:
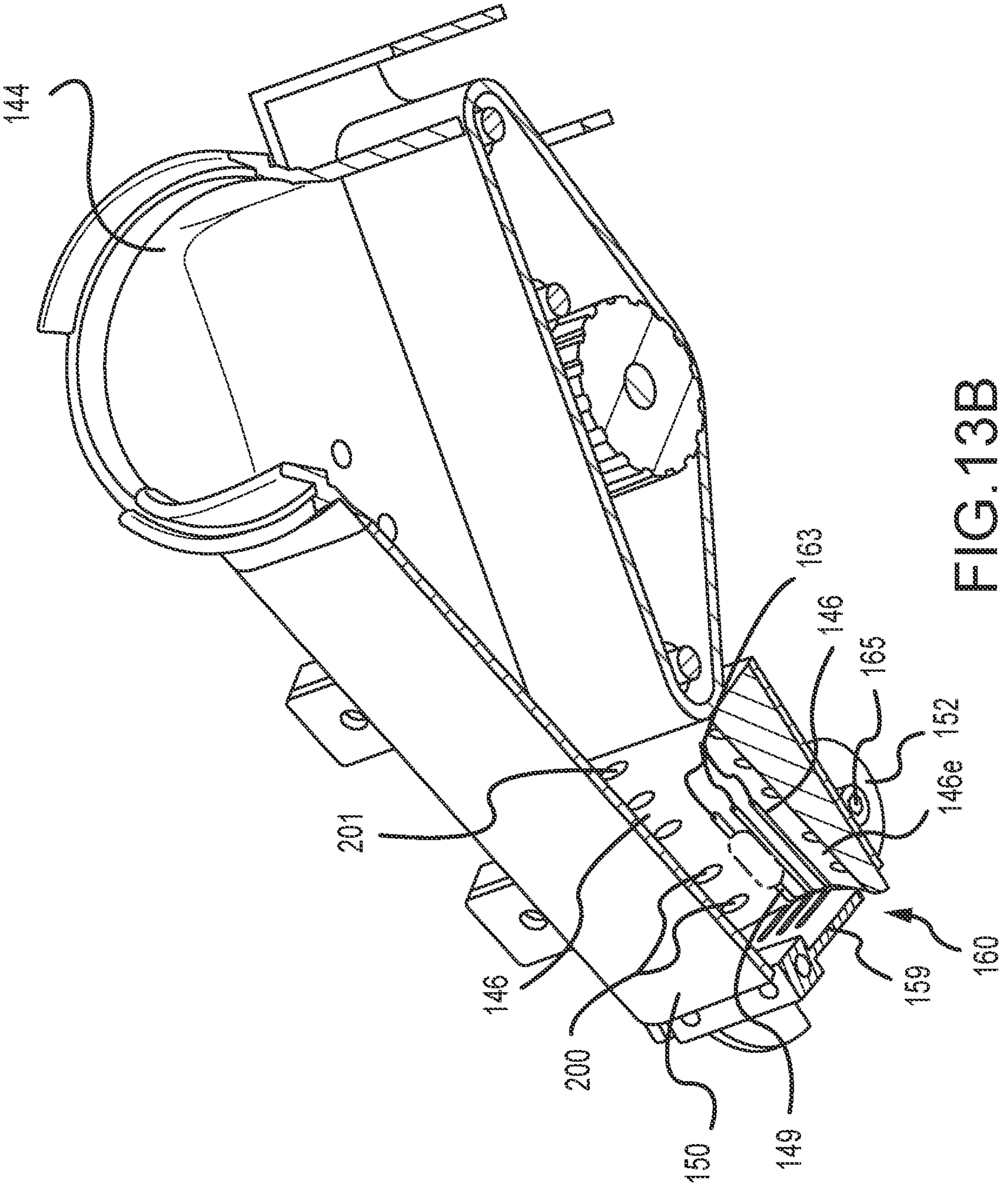
FIG. 13B provides an isometric partially cut-away view of some interior components hereof.

At this point, the pill gate/delivery sub-assembly 160 takes over control of the further handling and delivery of a single pill 11. Note, first, FIG. 13B shows an identical position of the pill 11 relative to the pill handling (delivery and control) sub-assembly 150, though enlarged for further detail in the description of the process, thus, here forward the process will be described relative to FIG. 13B, first, then, also to and through further FIGS. 13C, 13D, 13E, 13F, 13G, 13H, 13I, 13J, 13K, 13L, and 13M. As shown in FIG. 13B, the door 159 is closed at the close or end of the chute movement and the initiation of a control and delivery process using sub-assembly 160. Also at this initial point of the pill delivery sub-assembly 160 and movement of the pill process, the cams 162, here an eccentric or off-center cams 162, are disposed in an initial position of relative rotation (about shaft 165) relative to the slots 163 where the cams 162 are below the surface 146*e* of the chute 146 and thus as introduced above, a smaller part of cams 162 being directly under the known location 149, the cams are not yet engaged with the pill 11. Moving next to FIG. 13C, the cams 162 are shown in partial rotation, rotating in the direction set forth by arrow 169; the smaller part of cams 162 still substantially below the surface 146*e* and pill 11; however, as then shown in FIG. 13D, with still further continued rotation in the direction 169, the larger part of the eccentric or off-center cams 162 are then rotated up into the slot 163, eventually raising at least a little above the surface 146*e* and thereby lifting the pill 11 up, though it might simply engage and move the pill without perhaps actually lifting it per se. The pill-engaging surface 166 may be configured to be sufficiently frictional to in effect grab the pill 11 and move the pill 11 with the cam 162 and move it therewith in the direction of the arrow 169; see below (as such a rubberized surface as might be presented by an o-ring might be employed for surface 166).

Figure 13C:
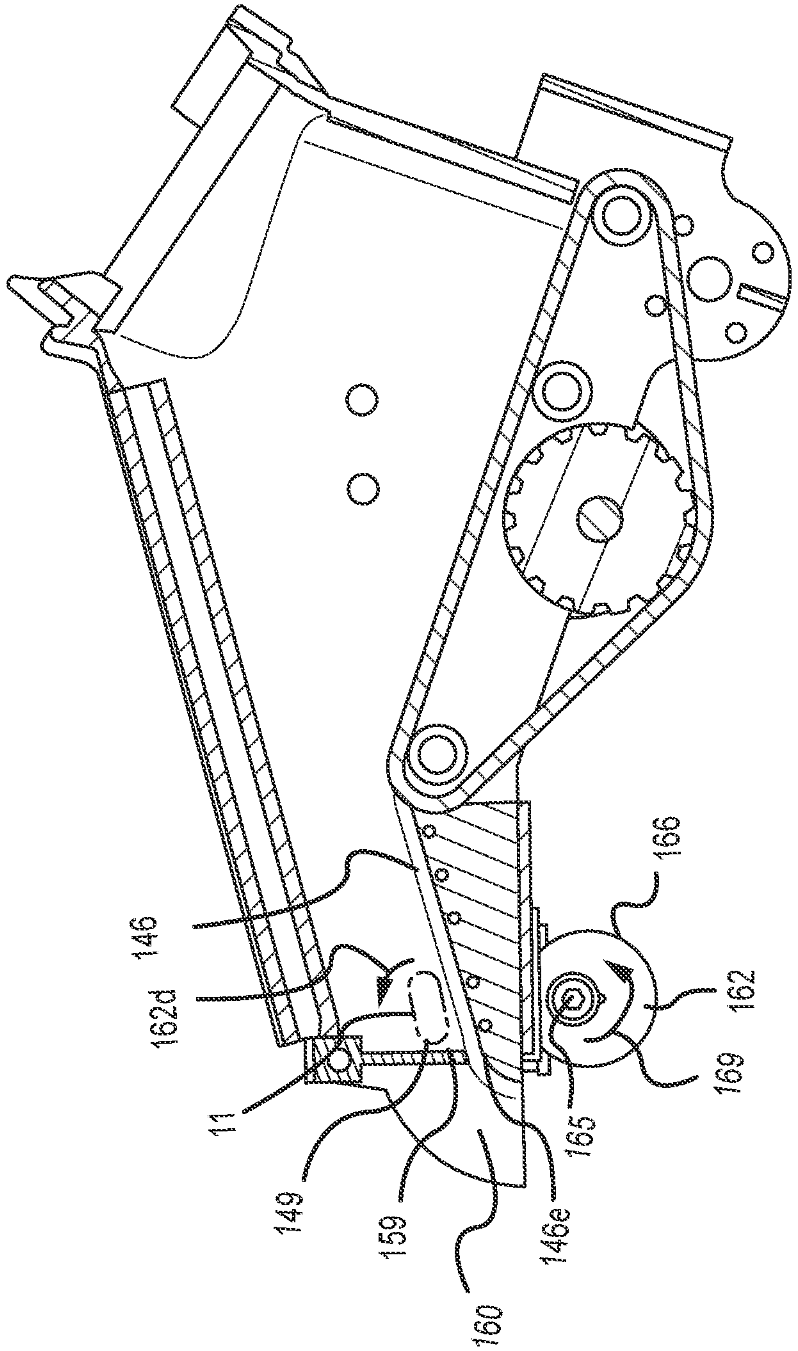
FIGS. 13C, 13D, and 13E provide cross sectional views of some interior components hereof.
Figure 13D:
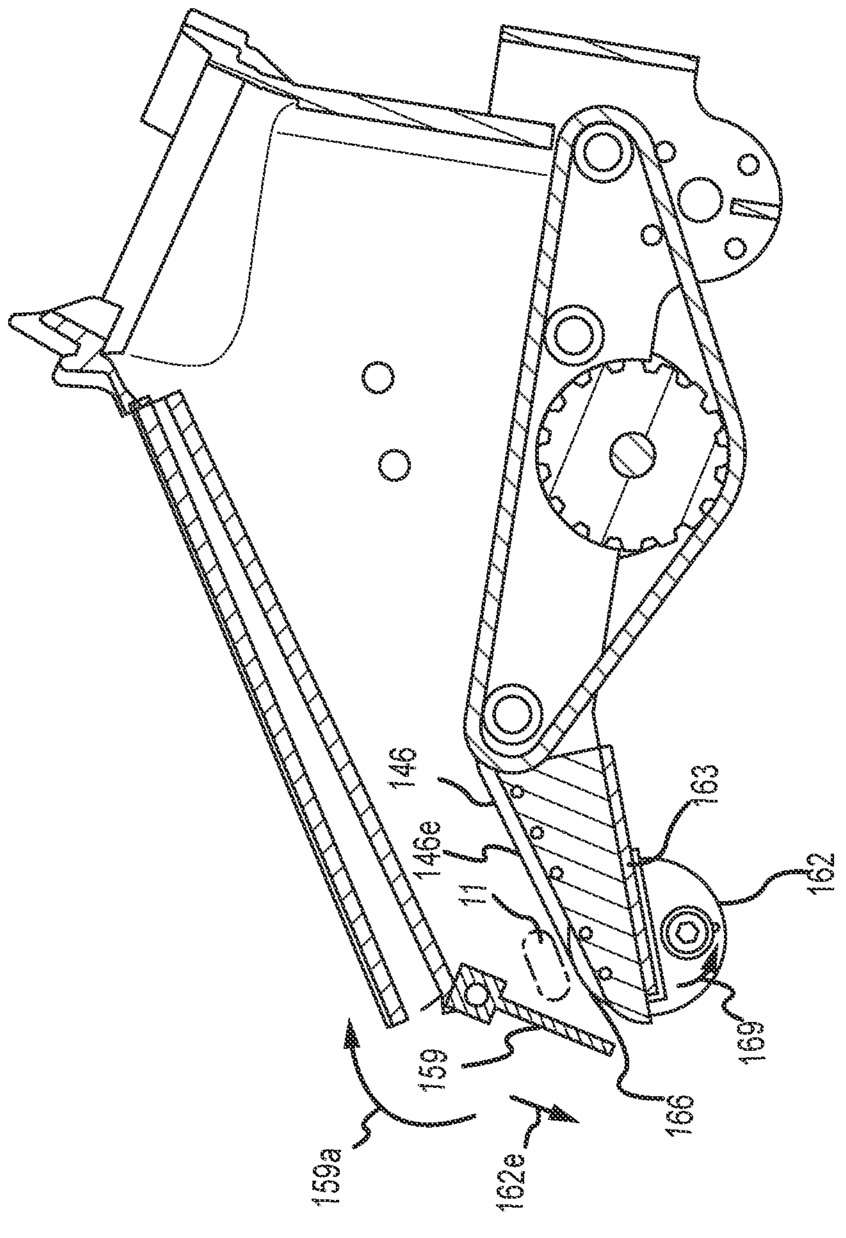
Figure 13E:
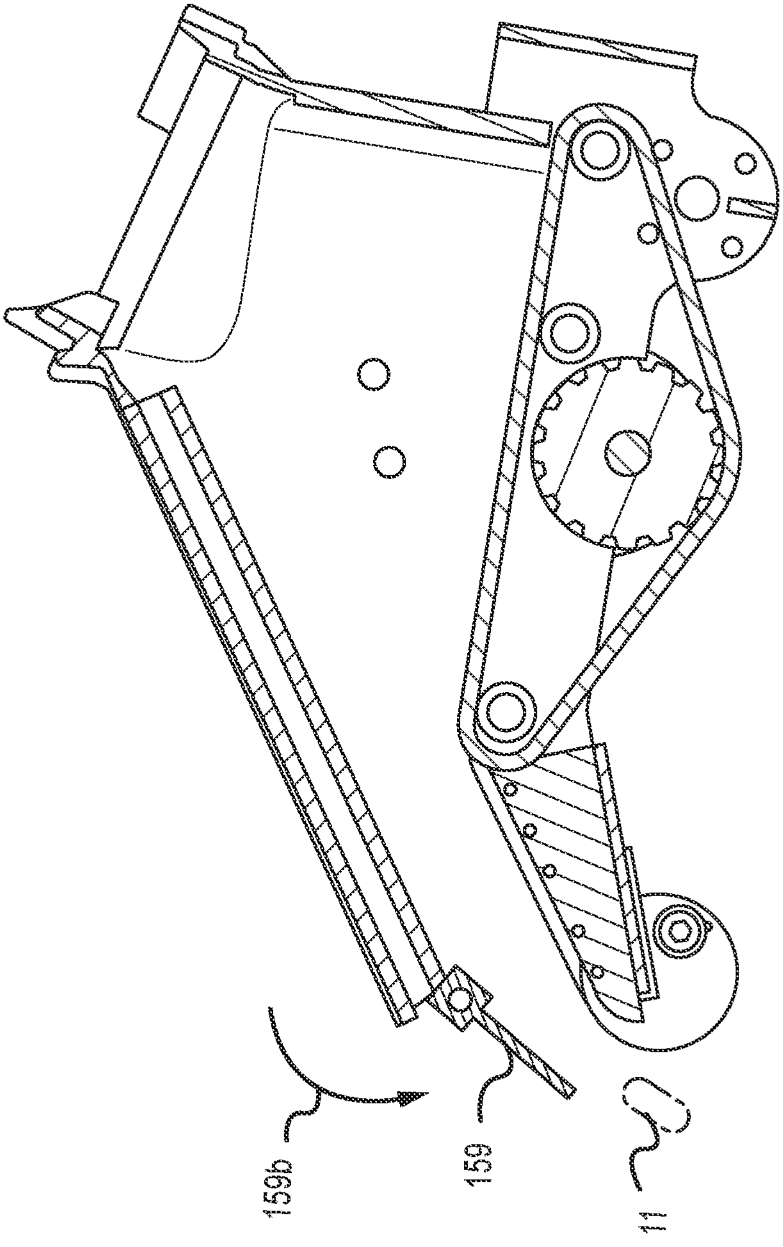

Remaining with FIG. 13D briefly, we see also that the door 159 is opened or at least in the process of opening, see arrow 159*a* indicating the rotational, hinge-like movement of the gate or door 159. It is noted briefly here that the door 159 may be opened with the lifting and moving of the pill 11 by cam 162. Indeed, the same mechanism for rotating cams 162 may be used for opening door 159, so operation thereof may be connected, or alternatively, the door 159 may be opened in a discrete operation and using a discrete motor (not separately shown). Operation of the door 159 may nevertheless occur simultaneous with or near in time to the lifting and moving of the pill 11, or in some implementations, operation, i.e., opening of the door 159 may be completely independent of the movement of the pill. Even so, the door 159 will be coordinated so that when the pill 11 is sufficiently ready for being moved off the cam 162, the door will be open or opened. In some implementations, separately controllable door opening and perhaps more interestingly (in perhaps some cases), door closing may be tightly controlled for different sized pills; e.g., smaller pills 11 may invoke a desire for quicker door closing operations to ensure catching any following pills in/on the chute 146 after the one being delivered; e.g., closing before the pill is completely dropped off to stop the next pill in line from moving out of turn. Larger pills may allow for longer or slower closing times.

An optional sensor sub-assembly 200 may include one or more sensor(s) 201 as shown in FIG. 13B. One or more sensors 201 may be used to determine whether a pill 11 is at the known location 149. The sensors may be of an optical sensor transmissive/slotted interrupter style or otherwise.

Figure 13F:
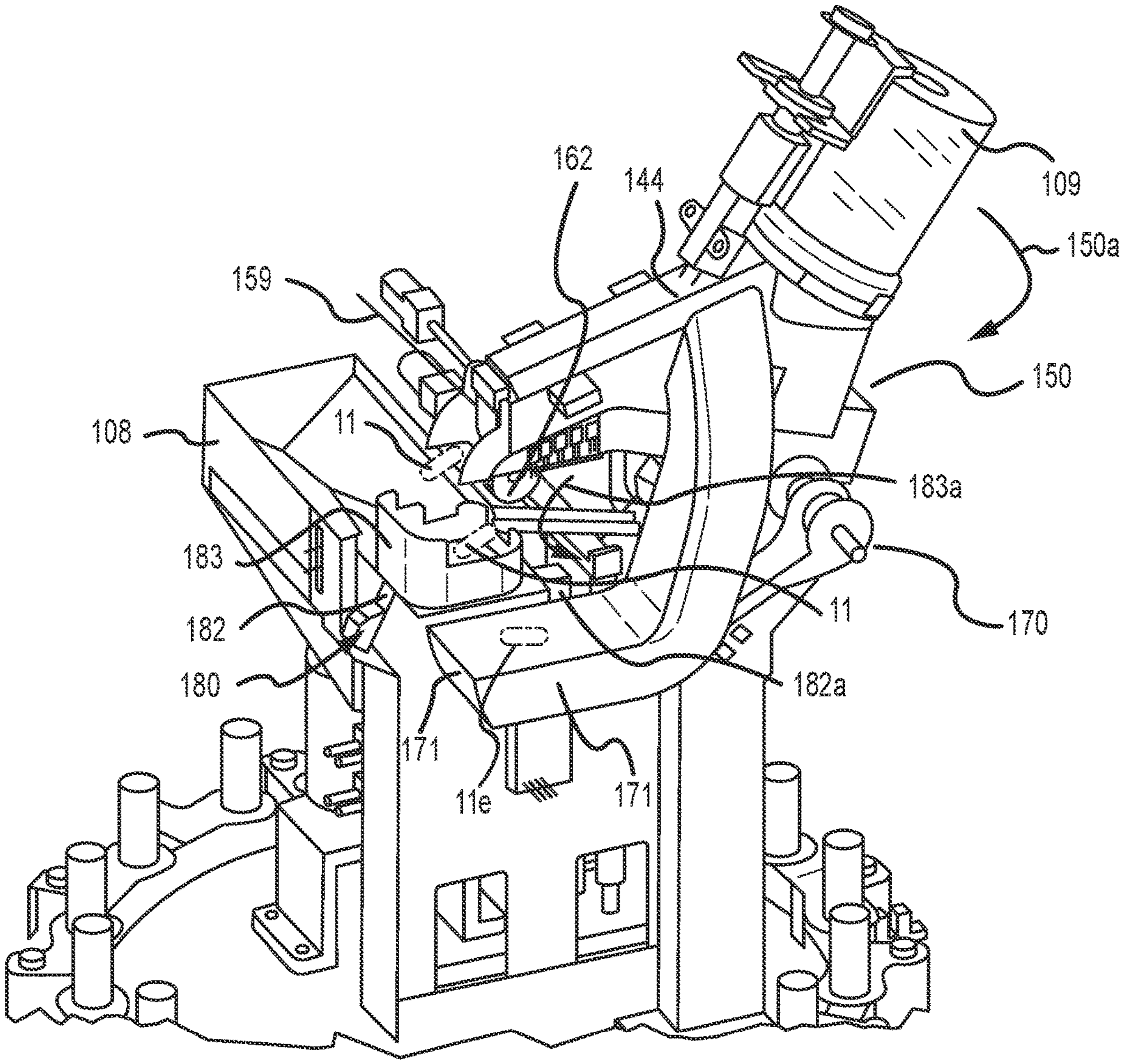

In FIG. 13C, an arrow 162*d* indicates where the pill 11 would be moving to as the cams 162 continue still further rotation in the same direction as indicated by arrow 169. FIG. 13D continues the rotation of cams 162 such that the larger part of each cam 162 thereof has moved mostly past the slots 163 and the pill 11 has thus moved on the cam 162, dis-engaging from surface 146*e*. The pill 11 then falls off in direction 162*e*. The door 159 is also shown closing, in FIG. 13E, and moves in the direction 159*b*. FIG. 13F includes the same relative position of the cams 162, pill 11 and door 159, though further includes the scale platform 182 of scale sub-assembly 180 into which the pill 11 is shown being deposited. The scale 182*a* then confirms the proper weight, as would be expected from the particular pill 11 by referencing the weight of the pill versus the known weight of the pill provided by FDA, CDC, or another database as described elsewhere herein. If the weight is not as expected, too little or too much (if the pill is either not delivered or a larger or smaller than expected pill, or even if multiple pills are un-expectedly delivered), then an alternative path, return tube 171 (FIG. 13A and FIG. 13F), is utilized by pushing pills 11 off of the scale platform 182 by the pill swiper 183, with motion 183*a* which places the erroneous pills into the open end of return tube 171. The erroneous pills 11*e* will then be returned to pill storage bin 109 following the complete resetting, or rotation, of the pill handling subsystem 150 by motion 150*a*. Return tube 171 has an internal opening and connection to nozzle or funnel 144 that allows the erroneous pills to be returned to collection bin, collection bottle, or collection receptacle 109. The erroneous pills 11*e* are moved by the pill swiper 183 to push the pills off the edge of the scale platform and into the open compartment of the return tube 171. If the proper weight is achieved, then, as shown in FIG. 13G, the pill swiper 183 is rotated per arrow 183*b* by swiper motor 183*c* which pushes the pill or pills off the scale platform 182 thus delivering the pill(s) 11 to the output delivery cup 108.

Figure 13G:
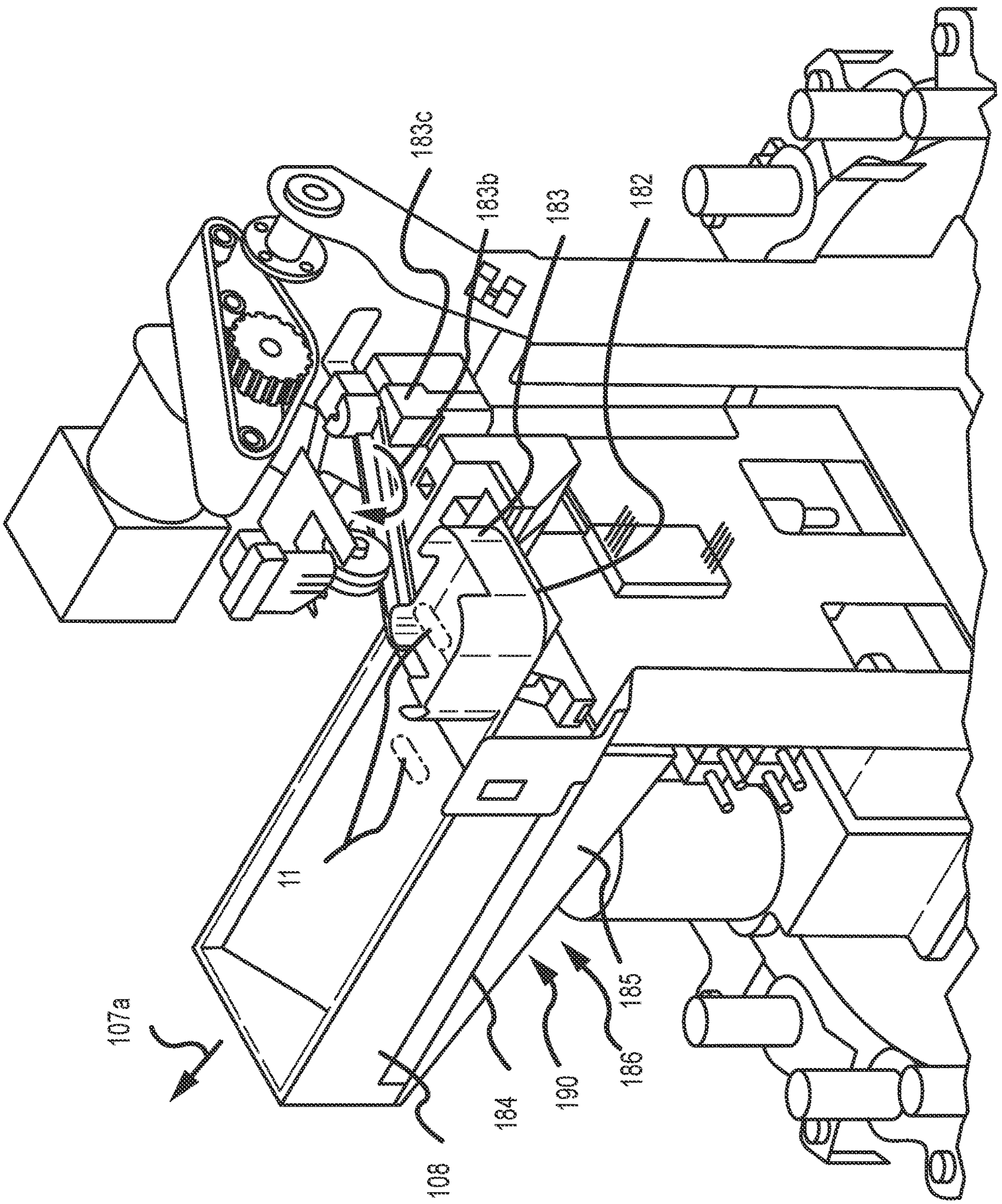

Then, further operation of the output cup subassembly 190 as shown in this implementation in FIG. 13G may include an output cup 108 mounted to a linear slide or base element 184 shown here disposed on and movable relative to one or more rails 185 powered by a motor 186. The slide element 184 and output cup 108 can then be moved (see direction indicated by arrow 107*a*) by the motor 186 (not shown) to which the slide element/base 184 is operationally attached. This motion may be computer controlled to deliver the pill(s) 11 to the user when desired and/or required (see FIG. 8C). A reverse motion (opposite of the direction of arrow 107*a*) can then be used to move the pill output cup 108 back to receive another one or more further pills 11 for ultimate delivery to a user. An alternative rotating motion of pill output cup may be implemented with a motor places at one corner of the pill output cup allowing it to rotate up to 270 degrees and be external to the enclosure.

For the full cycle then, returning briefly first to FIGS. 8B and 9B, the pill loading port 105 (FIG. 8B) accessed by door or shutter 106 (FIG. 8B) located on a side of the pill dispenser 100 is/are opened to and do receive the pills 11 for operational manipulation as described herein. In one or more implementations, this port may be operated by or include a computer controlled shutter, see shutter/door 106 in FIG. 8B, which may be configured to open to allow the user to pour one or more pills into a pre-selected pill storage bin 109; pre-selected having a variety of optional meanings, whether pre-selected by a user, or by a computerized selection process, or perhaps even in manufacturing, as for example when perhaps only a single bin might be included. In many implementations, the system and/or shutter may be configured so that the shutter 106 (FIG. 8B, if used) may be opened when some criteria, as for example, the name, dosage and/or manufacturer of the prescription or over the counter pill has been inputted and confirmed by the user via the GUI. Similarly, the system may be computer controlled to deliver through the processes described herein, one or more pills to output or opening 107 via output dispensing cup 108 as shown for example in FIG. 8D.

FIGS. 13H, 13I, 13J, 13K, 13L, 13M, 13N, and 13O further illustrate and demonstrate how the pick-up members or cams 162, individually 162*a*, 162*b*, and 162*c*, are rotated by axel or shaft 165. Thus, the cams 162*a*, 162*b*, and 162*c* are initially disposed and/or positioned below the chute surface 146*e*, as shown in FIG. 13H. As the axel or shaft 165 is rotated, the cams 162*a*, 162*b*, and 162*c* move circularly upward and in to the slots 163*a*, 163*b*, and 163*c*. For reference, axel connection points 176 and 177 are shown in FIGS. 13H through 13O, which may help to show how the axel 165 rotates and thus moves the cams 162*a*, 162*b*, and 162*c*. These axel connection points 176, 177 are used to connect the axel to a motor as described in FIG. 4D, inter alia. It should be noted that the chute gate/door 159 has been removed in FIG. 13H through FIG. 13O solely to help the viewer understand how the axel 165 rotates the cams 162*a*, 162*b*, and 162*c* through the slots 163*a*, 163*b*, and 163*c* of the chute 146.

Figure 13J:
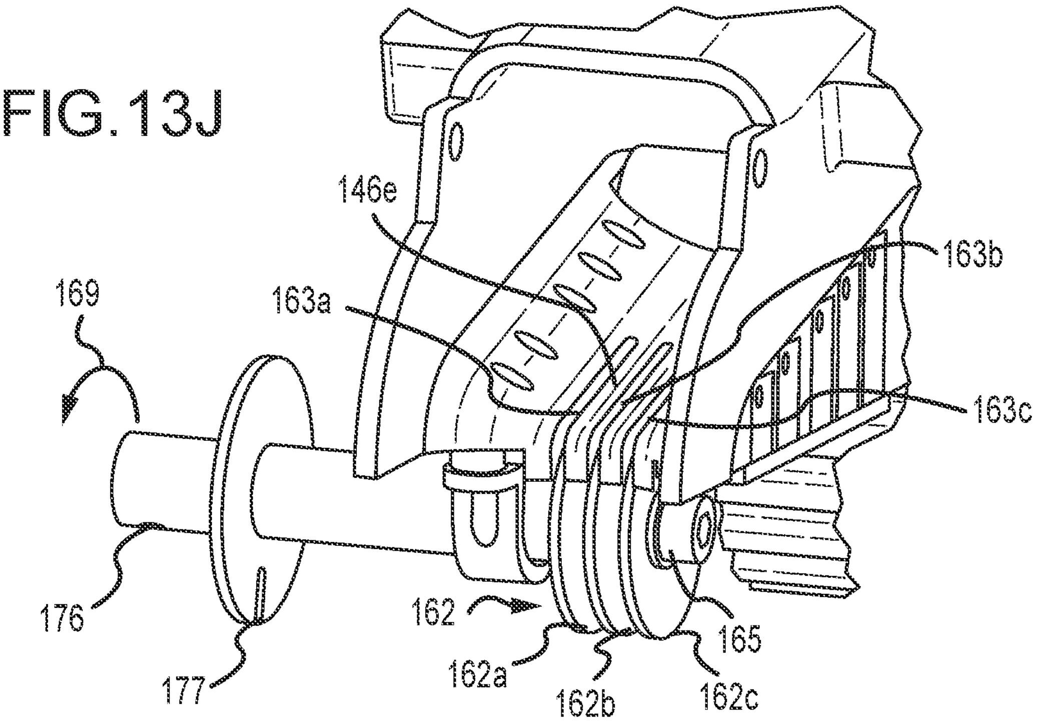

FIG. 13I shows a slight turn of the axel 165 in the direction of arrow 169. The movement of the axel 165 can be seen by observing the change in position of the axel connection points 176, 177. In FIG. 13I, the cams 162 have also moved relative to slots 163*a*, 163*b*, and 163*c*; however, due to the perspective, the chute surface 146*e* obscures ones ability to see the difference in the cams positioning. FIG. 13J shows the location of the cams 162*a*, 162*b*, and 162*c*, relative to the chute surface after another slight turn of the axel 165 in the direction of arrow 169. The difference in position and orientation of axel connection points 176, 177 helps to demonstrate how the axel is rotating relative to the chute.

Figure 13K:
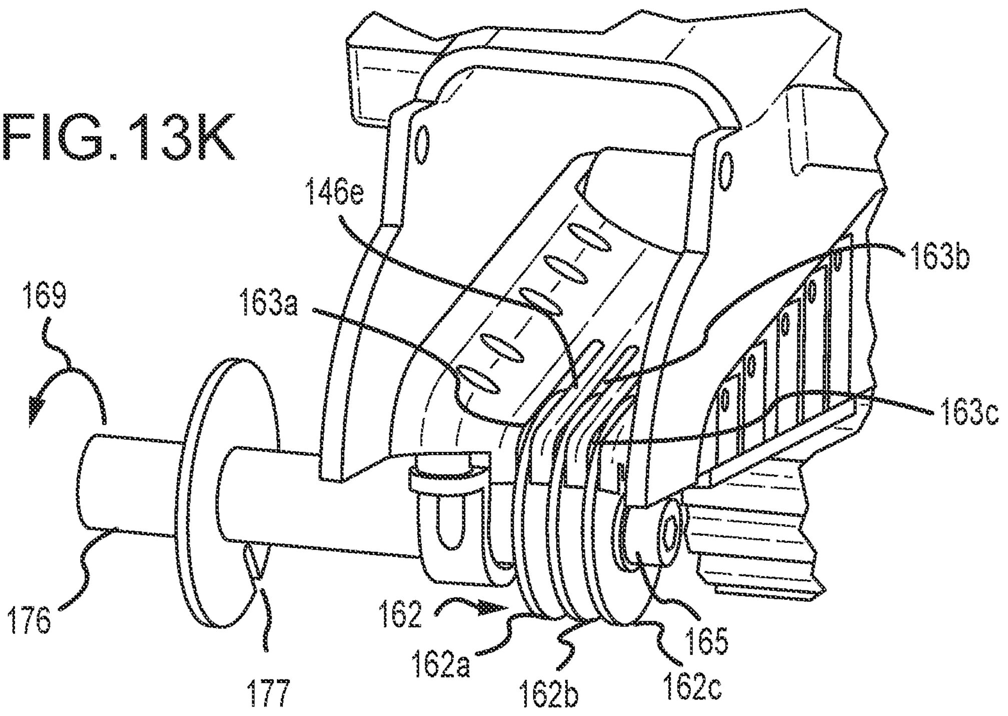

FIG. 13K shows yet another slight turn of the axel 165 in the direction of arrow 169. As the axel 165 rotates, the cams 162*a*, 162*b*, and 162*c* move up an into the slots 163*a*, 163*b*, and 163*c* and extend above the chute surface 146*e*. If a pill were present, the cams 162*a*, 162*b*, and 162*c* would make contact with the pill and move the pill towards the end of the chute. Note the axel connection points 176, 177 are rotated when compared to previous FIGS. 13H, 13I, and 13J. Also, in FIG. 13K, connection point 176 is obscured from view due to the rotation of the axel 165.

Figure 13L:
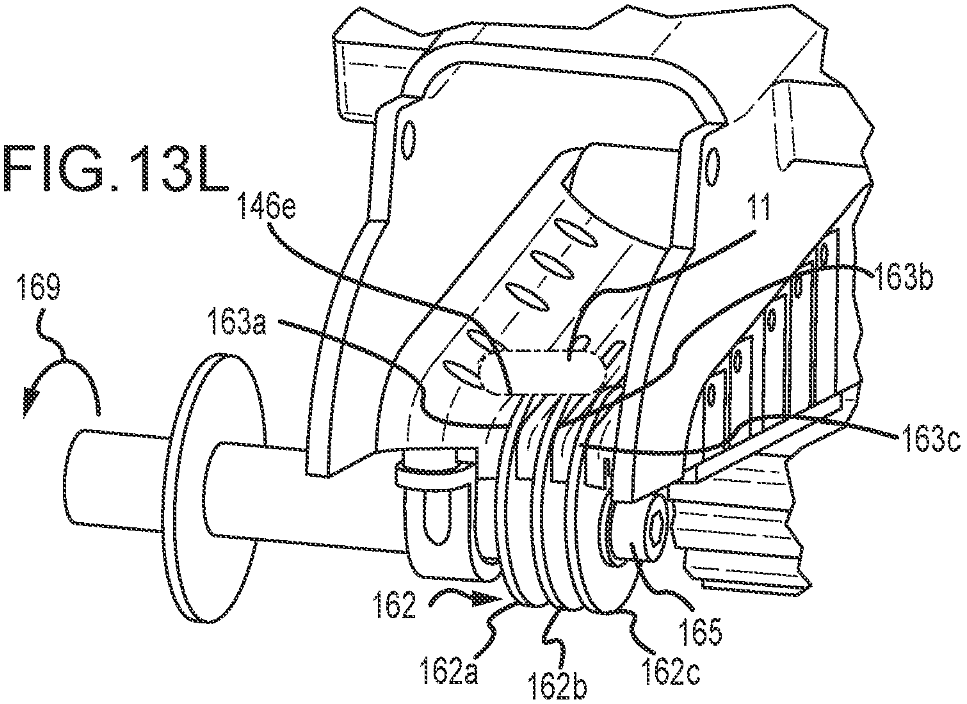

Additional rotation of the axel 165 in the direction of arrow 169 as shown in FIG. 13L shows how the cams 162*a*, 162*b*, and 162*c* may move through the slots 163*a*, 163*b*, and 163*c* and further extend above the chute surface 146*e* to make contact with a pill 11. The cams 162*a*, 162*b*, and 162*c* will thus lift and or push the pill 11 in the direction of the rotation of the axel 165 and cams 162*a*, 162*b*, and 162*c*. In FIG. 13L, neither of axel connection points 176, 177 are visible as they are obscured by the axel 165.

Figure 13M:
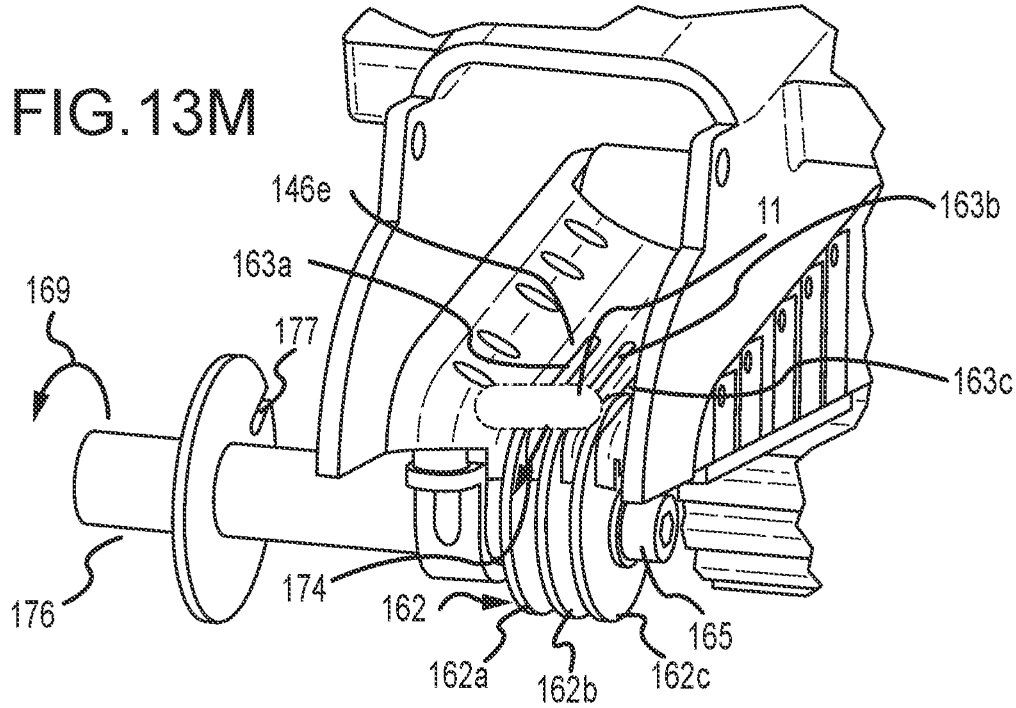

Moving to FIG. 13M, additional rotation of the axel 165 in the direction of arrow 169 causes the cams 162*a*, 162*b*, and 162*c* to move further up in and through slots 163*a*, 163*b*, and 163*c* which propels the pill 11 in the direction of arrow 174. The axel connection point 177 is once again viewable in this perspective as the axel 165 has rotated enough for the axel connection point 177 to be visible.

Figure 13N:
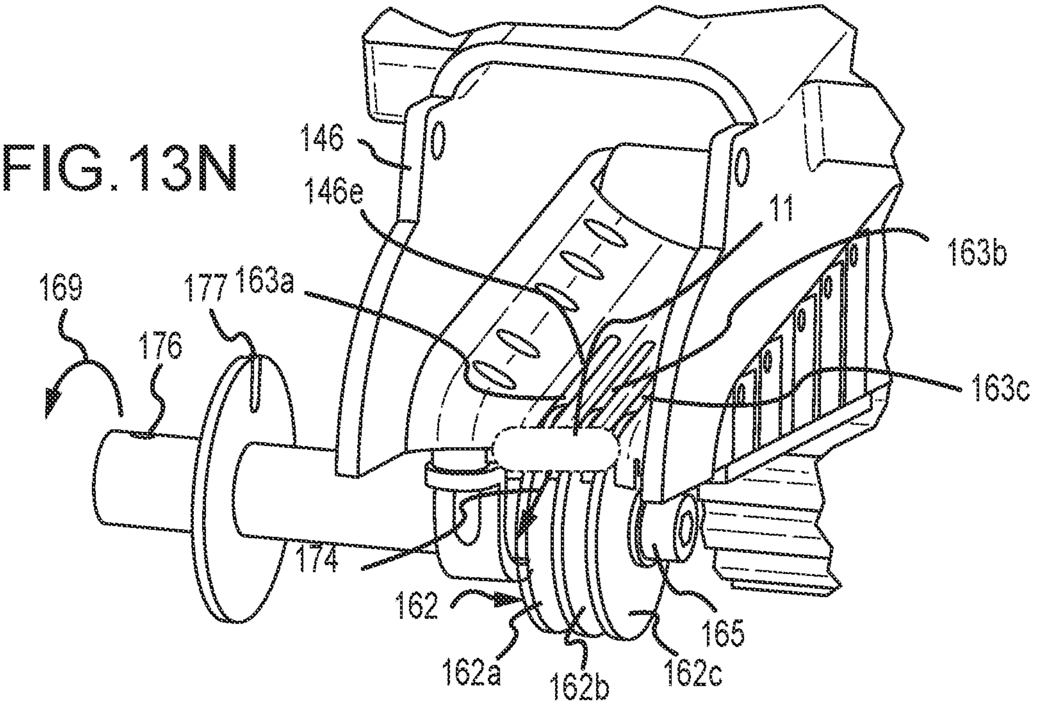
Figure 13O:
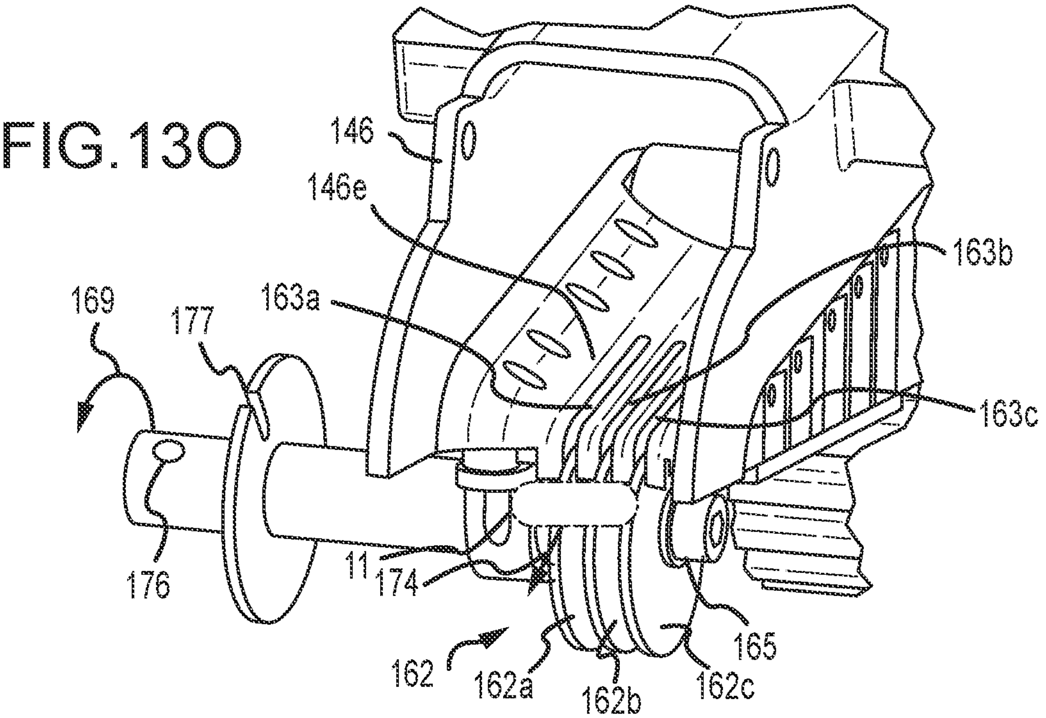

Next, in FIG. 13N, the axel 165 has been further rotated in the direction of arrow 169 which causes the cams 162 to continue to make contact with pill 11 and move it in the direction of dashed arrow 174. At this point, the cams may still be slightly above the chute surface 146*e* but have rotated such that the surface of the cams 162 is lower than it was in previous FIGS. 13L and 13M. The rotation and movement of the cams 162*a*, 162*b*, and 163*c* has pushed the pill 11 forward and out the end of the chute 146. The axel connection points 176, 177 are once again visible as the axel 165 has rotated enough to allow both connection points to be visible. Moving forward to FIG. 13O, the axel 165 has again been rotated in the direction of arrow 169. This further rotation has resulted in the cams 162 now being disposed below the chute surface 146*e*, and the slots 163*a*, 163*b*, and 163*c* are clearly visible. The movement of the cams 162*a*, 162*b*, and 162*c* has pushed the pill 11 off of the end of the chute 146 and in the direction of arrow 174. The pill 11 will thus fall via gravity in to the scale sub-assembly described in FIGS. 13F and 13G, inter alia. If the axel 165 is rotated further, it would return to the position described in FIG. 13H.

Figure 14:
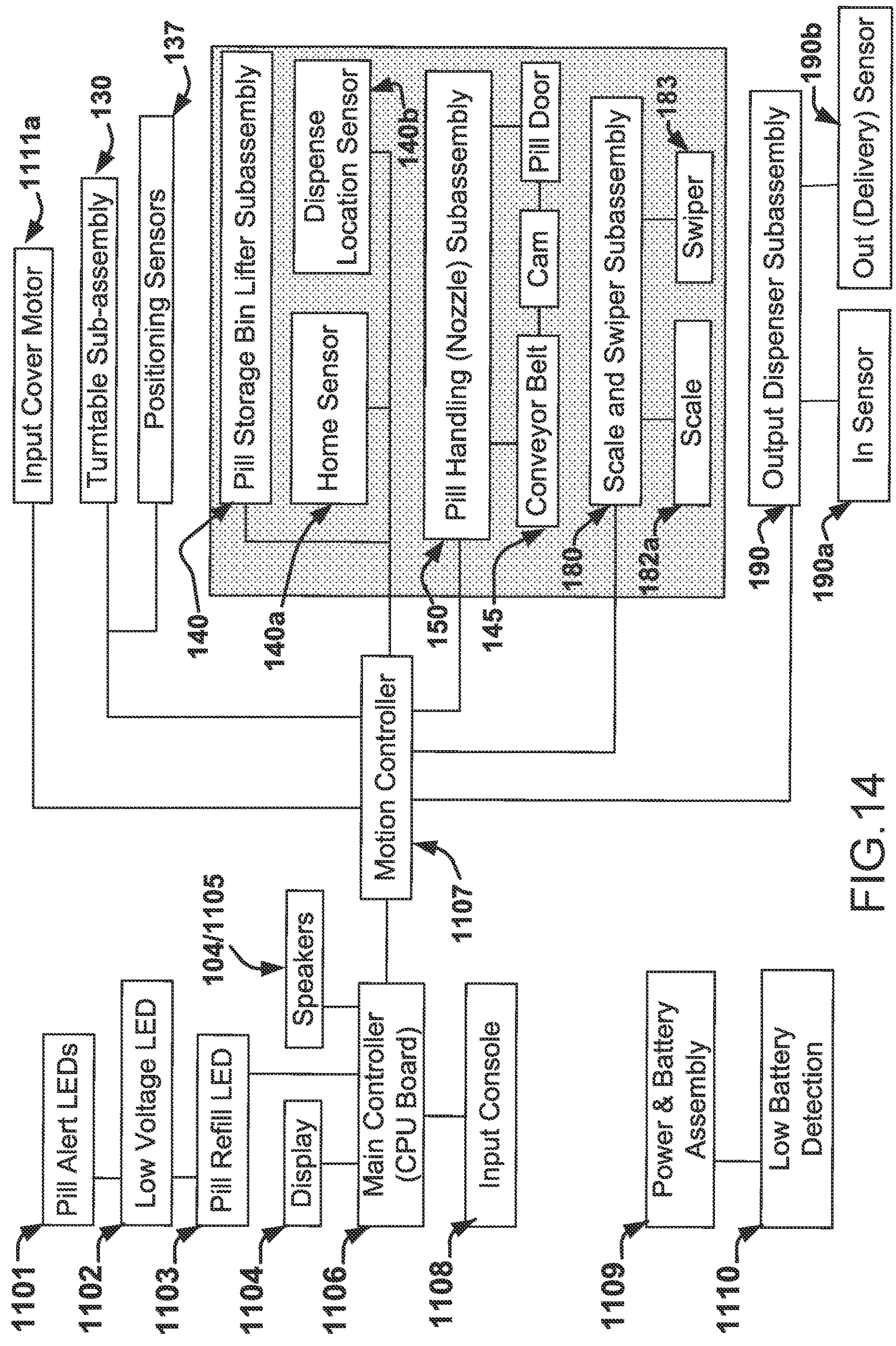
FIG. 14 is a block diagram of an electronics control combination or system according hereto.

FIG. 14 provides an electrical control system diagram that shows an implementation of a construction of some one or more circuits or combinations of one or more modules for possible use with/in the subject matter hereof. Although there are numerous ways a circuit may be designed to achieve a particular function or objective, some implementations herein/hereof may utilize one or more microprocessors and/or other circuit and/or other computer hardware. For a non-limiting example as shown in FIG. 14, a CPU board 1106 may be employed as a main controller for the pill dispenser. A motion control circuit board (motion controller) 1107 may also be used to provide the control circuitry and interface with the main controller/CPU board 1106. Additional driver circuits or modules may also be included to energize each motor and read and/or receive input from each sensor. The functions and interactions of motor driver circuits and sensor outputs are described below.

In FIG. 14 other modules may include the Power and Battery Assembly 1109 which may include an AC cord and plug for use with a standard wall outlet, an AC/DC transformer for supplying the proper DC voltages and may include a battery such as a 12 Volt DC battery. A low DC voltage detection circuitry 1110 may be included to monitor routinely or at designated times or constantly the DC power to the CPU board and directly to other circuits. A low voltage condition will, when/if used, be detected and cause activation of a Low Voltage/Battery Used LED 1102 and in some implementations may be configured to send an automatic message to the user and/or one or more third parties via internet or otherwise.

To initialize use of pill dispenser 100 hereof, or an alternative method with alternative devices, the user may first be disposed to connect to a power source, as for example, to attach the device to a standard U.S. power outlet (110V, AC). This may also charge the back-up battery, if used, as needed. If the needed voltage of the dispenser deteriorates to a level that will no longer meet the power requirements of the pill dispenser 100, low power detection circuitry 1110 may activate notifications to the user, caregivers and/or third parties as indicated in the SETUP files as may be configured by the user or a designee.

A pill refill LED 1103 may be used and may be set by software routines which may indicate the quantity of pills in each pill storage bin 109. The specific pill(s) needing to be refilled may be indicated on the display 1104, or touch screen display 103 as in FIG. 8A). Such software routines are explained below.

A set of User Alert LEDs 901 may be used and may be activated per a programmed timer in conjunction with a User Request command for pill dispensing. If the user has not activated the User Request command prior to the programmed pill taking time period, one or more User Alert LEDs 901 may be disposed to actively provide a visual alarm. When the visual alarm is active, and/or as an alternative to a visual alarm, an audio alarm may be used, in some examples an MP3 (audio) file may also be played through the speakers 104/1105 providing a simultaneous and/or alternative audio alarm.

During the pill dispensing period, a display 103/1104 (as shown in FIG. 8A and/or FIG. 6) operatively connected to the main controller 1106, may in some implementations be configured to display one or more of the following: an image of each pill being dispensed, the total number of pills being dispensed, and any special instructions associated with any of the pills being dispensed.

An input console 1108 may be included and may utilize a keyboard (see e.g., buttons 13, FIG. 1A), camera, microphone or touchscreen (see e.g., screen 103, FIG. 8A), either attached or disposed in the housing 102, or connected by cable or Bluetooth connection. Such an input console may be used by the User or their designee to enter data as described in the operation below.

The motion controller 1107 may be used to provide control to motor driver circuits for running the DC motors and similar motors and/or reading the optical sensors to provide functionality for the pill dispenser 100. Further alternatives may include a clock, in some implementations a continuous running clock, in and/or otherwise associated with the main controller 1106. Such a clock may be used to trigger one or more commands in the motion controller 1107 that activate control circuits to activate the motors and read sensors as follows. The motion controller 1107 may also be used to control the input cover motor 1111*a*, as shown in FIG. 14.

Pills 11 may initially be entered into the pill dispenser 100 through a shuttered opening 105 on the top of the pill dispenser 100 (as shown in FIGS. 8A and 8B). Initial information may be provided that specifically identifies each pill medication 11 to be entered. Following identification of the pills 11 immediately being entered, the input shutter 106 may be activated to slide back or open to reveal the opening 105 for pouring in the pills 11. The Input Shutter 106 may then be activated to close when the pills are completely inserted; in some implementations, a user communication of this completion may be by pressing a button and/or may include entry of the pill count of the number of pills 11 inserted.

A programmed timetable or other interval for delivery may be generated and used, or other demand instructions may be used. When a specific pill 11 is requested whether per a programmed timetable, or upon other appropriate command, the movable sub-assembly 130, which has attached thereto all of the pill storage bins 109, may then be rotated into the desired specific pill drop off position corresponding to whichever pill is to be delivered. The positioning information for this rotation may be achieved using optical sensors 137 specifically positioned to ensure that only a single sensor changes state during the rotation (see FIGS. 10A, 10B, and 10C, inter alia). This may provide an unambiguous, fixed number of discreet positions (whether 1, 2, 4, 8, 16 or otherwise herebetween or hereabove). Each position may be uniquely identified by a single Gray Code (though incremental or binary or other encoding options could be used in addition or instead). (See example of a Gray Code Table 1 set forth herebelow; three bit rotary coding for eight positions; though other variables are available, e.g., 2 or 4 positions, or 16 positions, et cetera.) Moreover, see FIG. 16 and Table 1 which provide a rotary encoder for angle-measuring devices marked in 3-bit binary. The inner ring in FIG. 16 corresponds to Contact 1 in the table. Black sectors are "on". Zero degrees is on the right-hand side, with angle increasing counterclockwise.)

TABLE 1

| Gray Coding | | | | |
|---|---|---|---|---|
| Sector | Contact 1 | Contact 2 | Contact 3 | Angle |
| 0 | off | off | off | 0° to 45° |
| 1 | off | off | ON | 45° to 90° |
| 2 | off | ON | ON | 90° to 135° |
| 3 | off | ON | off | 135° to 180° |
| 4 | ON | ON | off | 180° to 225° |
| 5 | ON | ON | ON | 225° to 270° |
| 6 | ON | off | ON | 270° to 315° |
| 7 | ON | off | off | 315° to 360° |

After the rotational sub-assembly 130 has reached the pill drop off position, the pill container lifter 140 is activated to secure pill storage bin 109 to pill collection funnel 144, as described above in relation to FIG. 11A. The entire pill handling sub-assembly 150 is then rotated to move pills from pill collection funnel 144 to the respective conveyor belt 145 leading to the chute or slide 146, if used, to get the pill to the known location 149. The motor used for sub-assembly 150 may be activated in such a way to cause a vibration, or shaking, in chute or slide 146 thus causing the pills to align within the pill chute 146 so that one pill 11 is in the known location 149 directly over the moveable cams 162. The cams 162 may be activated to rotate, at a controlled speed, until the cams positioning sensor 167 (see FIG. 12B), if used, changes state thereby indicating the cam may have rotated sufficiently to cause a single pill 11 to move off the end of the pill chute 146.

With the pill handling sub-assembly 160 having the cam 162 thereof rotated to a position for the pill 11 to be over the scale 182 and/or the respective output dispenser cup 108 (in some implementations, the cam(s) 162 may deliver directly to an output cup 108), the pill is moved by the cams 162 off the end of the chute 146 and allowed to fall by gravity into the scale 182 or output dispensing cup 108.

Depending on the number of pills 11 contained in the pill chute 146, the conveyor belt subassembly 145 may be activated to refill the pill chute 146 with one or more pills 11. This is determined by reading sensors 195 (see FIG. 12B) to determine if any pill 11 is within the chute 146. An electric motor 168 may be used to rotate the conveyor belt subassembly 145 to the required position.

After a successful drop of pill 11 to the scale platform 182 as shown in FIG. 13F, the pill handling sub-assembly 150, as shown in FIG. 9C, is rotated by motor 147 in the opposite direction of arrow 9*d* as shown in FIG. 9C to return the pill storage bin 109 to sub-assembly 130. The pill storage bin 109 is then released by lifter sub-system 140 putting the pill storage bin 109 back on its original position on gear plate 134 (FIG. 10B).

The movable/rotatational sub-assemblage 130 may then be moved/rotated, as needed or desired, to the next position for the lifter sub-assembly 140 to allow additional pills 11 to be dropped into the output cup 108 via the routine described herein and per the preprogrammed timetable or other appropriate demand initiation.

After the final pill 11 has been loaded/dropped into the output dispensing cup 108 for a particular pill taking period, the output dispensing cup 108 may then be moved into position for delivery of the pills 11 to the user. The output dispenser cup motor may be activated which moves the output dispensing cup 108, mounted on a slide assembly 184 (see FIG. 13G), to a position external to the footprint of the pill dispenser 100 (FIG. 8D). The motion may be stopped in some implementations when either a Move Out (Delivery) Sensor (not shown), if used, is tripped, or some other initiating indicator is activated. The pills 11 may then be manually removed from the output dispensing cup 108 by tipping the cup 108.

A dispensing sensor (not shown) may be used and may hereby change state to indicate the output dispensing cup 108 has been turned sufficiently to remove or other indication is made that all pills 11 are taken therefrom. When such a sensor returns to its initial state, indicating the pills have been removed, the linear slide assembly 184 may be configured to retract until a Move In (Return) Sensor (not shown), if used, or other indicating signal production indicates the end of travel.

Figure 15:
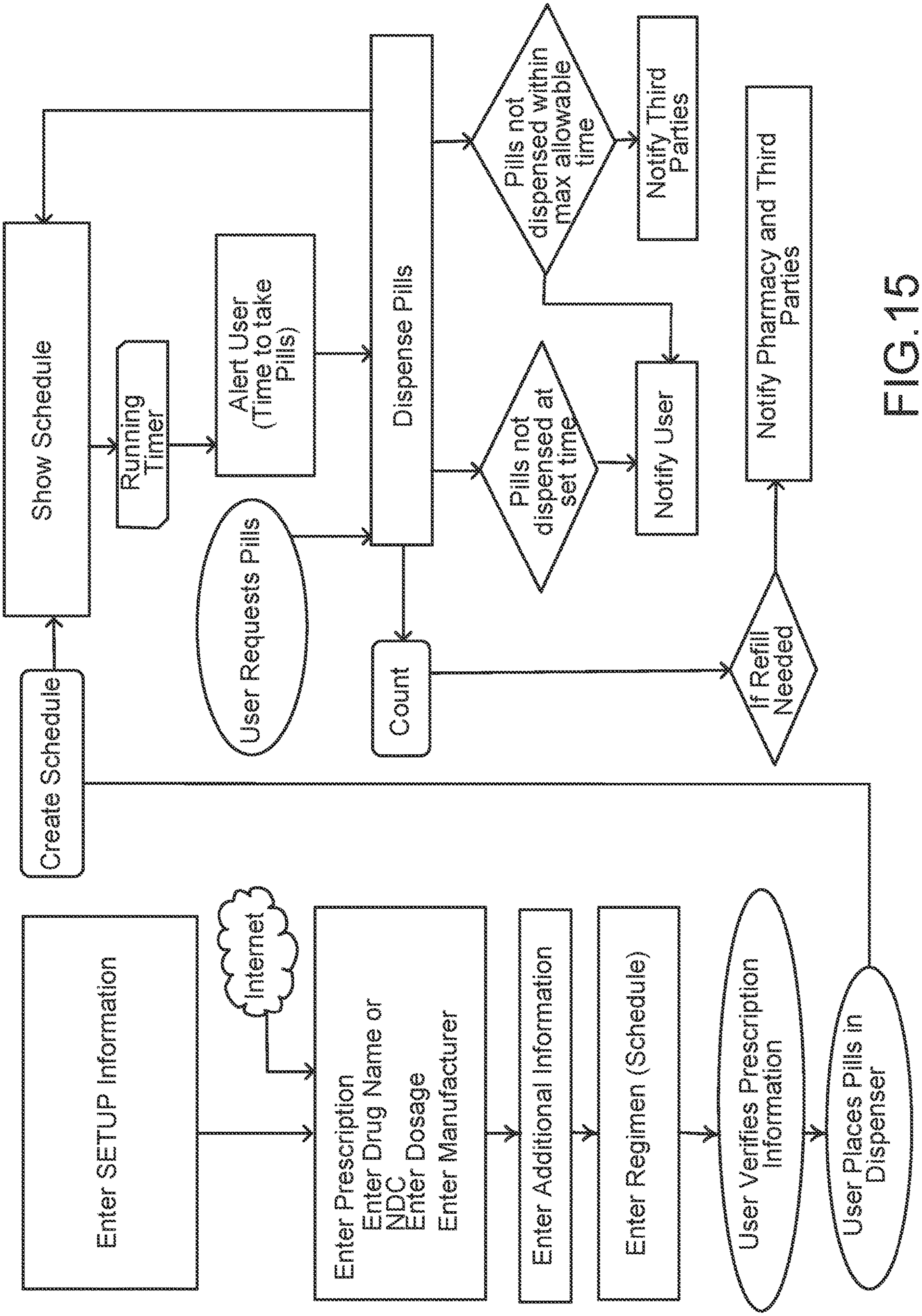
FIG. 15 is a block diagram of a combination or system or method according hereto; and, FIG. 16 is a schematic diagram of a Gray scale coding system or method according hereto.

There are numerous ways to program a particular function or objective. In an exemplar implementation, an Android™ operating system implementation may be used, but other OS programs could be utilized. A diagram of exemplar software architecture is shown in FIG. 15.

The operation and an exemplar software flow may be as follows.

The user or their designee may initialize use of the system by selecting an initiating command, such as SETUP, from the main menu. The user sets initial information which may include one or more of the language of choice, the user's name, user's mobile information, the email address or addresses or other contacts for third party notifications, the remote account name and the remote access password.

The user may then set parameters such as for the duration of each alert to the user to take pills, the time span of continuing alerts (snooze control) for each pill taking time period and the time delay before notifying one or more third parties, such as caregivers or medical professionals, that pills have not been requested or removed from the output dispensing cup.

The user may then enter a time of day for each pill taking period in some examples, Pre-Breakfast, Breakfast, Lunch, Dinner and Bedtime or accept the default times provided. Additional pill taking periods within the day may also or alternatively be named and added.

The system after being initialized may contain some one or more or all of the following information:

- Display Language
- User's name
- User's email address
- User's cellphone number
- User's device specific passCODE
- User's device specific passWORD
- Recipient(s) (i.e. caregiver) email address(es)
- Recipient(s) cellphone number(s)
- Delay for Recipient Notification (in minutes)
- Initial Alert Active Period (in seconds)
- Alert Wait (Snooze) Period (in minutes)
- Time Period Information:
  - Pre-Breakfast (default 7:30 am)
  - Breakfast (default 8:00 am)
  - Lunch (default 12:00 pm)
  - Dinner (default 5:30 pm)
  - Bedtime (default 10:00 pm)

The setup routine may be edited at any time.

Following the system setup as described above, the drug and supplement information may be entered.

The user may initiate a program for loading pills 11 by selecting the icon, such as "Rx" on the display 103. Each pill storage bin 109, each generally for discrete pills 11, may then be loaded as follows: pill name or National Drug Code (NDC) is entered, the correct dosage of the pill 11 may be identified from a dropdown list of options, and the manufacturer may be selected from a dropdown list of manufacturers. The drug or supplement may be entered into the initial drug entry screen by utilizing one of the available input methods. This implementation may contain databases from the U.S. Food and Drug Administration (FDA) and the National Institute of Health (NIH), or other national or international database, which may be part of an initial load of software. The databases may be maintained automatically as new data becomes available from the FDA and/or the NIH and/or other national or international database. The drugs may be entered via their National Drug Code (NDC) which may uniquely identify its name/manufacturer/dosage/strength or by first entering the drug name.

When the NDC code is not used for initially identifying the pill 11, the name of the drug may be searched as a fill in, look ahead drop-down menu of all drugs which may be configured to appear as each additional letter of the drug's name is entered. The User may then select the drug from a drop-down menu list that exactly matches the prescription. Supplement names are entered manually. Following the entry of a drug name, the next screen may contain a drop-down menu list of all available doses of the prescription or over-the-counter FDA approved drug. Dosage (strength) information may only be entered manually for supplements, e.g. Vitamin D3 25 mcg. Following the selection of the dosage, the next screen may provide a drop down menu list of all manufacturers for the entered pill in the dosage selected. The manufacturer of the supplement may be configured to only be entered manually.

When a pill 11 has been entered which meets the identification criteria, it may be configured that an image, photograph or description of the pill 11 or OTC (over-the-counter) drug is shown graphically or in text, if available, on the dispenser's display 103. In some implementation such information may be obtained from and/or providing the pill dispenser 100 is connected to the internet. Following the image or description or other identification of the pill 11, the user may acknowledge the pill 11 is correctly identified and then a loading shutter 106 may automatically be repositioned (opened) to allow pouring the pills 11 from their original container into the pill dispenser 100. The pills 11 will be directed into a predetermined pill storage bin 109. There is no limitations on how many unique pill storage bins 109 may be used in pill dispenser 100 because the pill storage bins are independent from the pill handling assembly 150.

After loading one particular or discrete set or at some point during loading or after loading each set of unique pills 11 in the pill dispenser 100, the user may enter the regimen (schedule) per instructions provided with the prescription or supplement.

A set of display pages may be provided for viewing on the display 103 to deal with entering the regimen (schedule). The user can select from several options for the type of time period in which the drug is taken; non-limiting examples including:

On-Going (daily or cyclical days)

Limited Period (start and end date)

As Needed [PRN] (with optional restrictions on frequency)

After setting the regimen, the user and/or designee may enter additional information such as the name of the prescribing doctor, the doctor's contact information, the reason for taking the medication and/or special instructions given for taking or handling the medication. Additional information may also be entered as follows:

Rx Prescription Number

Pharmacy

Pharmacy Contact Information

In the case of non-solid or non-oral medications or medication requiring special handling such as refrigeration, the device may be employed to only act as a reminder and confirmation of adherence and may not typically be used to store or dispense the supplement or drug. The user may indicate if the form of the supplement is a solid oral medication for the correct handling of the medication within pill dispenser 100. Following the entry of all information regarding the medication, the data may be stored in a locally stored database and a schedule for the next set number of days is created. In one implementation, the schedule may be displayed as the home page of the pill dispenser 100. The user may have optional views of the schedule in durations of the current day (today), some number of days into the future from today or some number of days prior to today.

The procedure may be repeated for each unique set of pills and as new pills are added for medical purposes.

When the pill loading and regimens have been entered, the pill dispenser 100 may then be ready for use.

To begin use of the pill dispenser 100, a pill dispensing icon on the display 103 may be touched to activate the pill gathering cycle required to load the output dispensing cup 108 for the next pill taking time period. The one or more pills 11 may then be dispensed. In this manner, the pill or pills 11 can be dispensed either a short time prior to the programmed first alert or a limited period of time after the first alert. Multiple alerts may be given during the full alert period of each pill taking time period. If the pill dispensing icon has not been activated within a preset time from the first alert, the dispenser may be configured to send an alert to the personal mobile device of the user. If the pill dispensing icon has not been activated within the time parameter for an optional caregiver notification, the dispenser may be configured to send a notification to one or more caregivers and/or medical professionals to investigate the situation.

The pill counter memory, a part of the microprocessor or CPU board 1106 as in FIG. 14, may be used to track pill count and may be reduced for each pill dispensed based on the number of pills that have been dispensed. When the number of pills falls below a preset limit, the dispenser may be configured to send a notification whether via the internet or other methods or devices or systems to the user or specified pharmacy and/or one or more other third parties. An LED 1103 may also be activated on the unit to indicate, to the User, that a refill is needed and/or expected for at least one dispensable medication.

Software routines may be used to count each pill 11 as they are dispensed. The device 100 may maintain quantity information for each pill type and can then provide refill information. The pill dispenser 100 may continue to automatically dispense the needed pills 11 to the pill taker as long as it contains the necessary quantity of pills 11 and power is applied, whether from the AC source or the back-up battery.

If the user has not initiated a request for pill dispensing, as the actual time of day reaches the start of a pill taking period for which pills or supplements are available, visual and/or audio alerts may in some implementations be issued by the device. Some configurations may provide for alerts to be simultaneously or otherwise activated in devices in other locations or rooms.

If the User has not initiated a request for pills to be dispensed within a preset time period after the initial alert (wait time), a notification may be sent to the User's personal remote device and may be done so repeatedly over a particular time period. The User may selectively turn off all notifications for a limited amount of time. If the User has not requested the pills past a maximum allowable time, the User and/or one or more or all third parties may receive notification via the internet enabled communication, Bluetooth®, Wi-Fi or other communication methods.

The removal of the pills 11 from the output dispensing cup 108 may include actuation of a sensor or other indicator that will initiate return of the output dispensing cup and in some configurations also store the time and list of pills that were dispensed. This database of pills dispensed may be stored on the device and in some cases copied to a remote data storage device for secure access by caregivers or medical professionals.

At the time the output dispensing cup 108 has been moved into its dispensing position, the display may be configured to indicate all relevant special instructions for one or more of the pills 11 being dispensed.

The dispenser may continue to operate in the manner described above for each successive pill taking time for which one or more pills 11 are available and required or desired for the user.

As seen from the preceding description, the dispenser may in some implementations involve an electromechanical system that can be programmed and loaded with the proper pill(s) so that the proper pill(s) in the proper quantity can be dispensed at the desired time(s) with in some cases an alert signal for the pill taker. In addition to the alert, the pill taker may in some situations be provided additional information as necessary or desired to take the pills as advised by the prescribing doctor or medical advisor or otherwise.

The system may also provide for alerting a caregiver or medical professional when scheduled pills are not taken by the user or when there is a problem in the operation of the dispenser. One of the main advantages of a pill dispenser such as this may be in the ability for reminding the User to take their medication in a timely manner and removing the manual dispensing of pills into compartments related to fixed pill taking periods. Additionally, pill schedules and dosages can be changed by user or their designee or by computer input, either or both locally and/or remotely.

The system advantages may, though need not necessarily, include one or more of the following: (1) Verifying with the use of FDA (Food & Drug Administration) and NIH (National Institute of Health) or other national or international databases that each specific group of same pills 11 is loaded into a pill storage bin designated by the pill dispenser 100 for that particular pill 11; (2) Issuing a visual and/or audible alarm to alert the pill taker to remove the pill(s) from the non-removable, extended output dispensing cup; (3) Displaying any special instructions for taking the dispensed pills per the prescribing doctor's orders; (4) Obtaining the proper quantity of each pill on a single pill basis for dispensing per user programmed input; (5) Physically storing all medication in a secure, locked manner; (6) Sending notifications to the third parties, such as caregivers and medical professionals, when dispensed pills have not been removed from the device; (7) Sending reminders to third parties, such as caregivers and pharmacies, when refills of prescriptions or supplements are needed or expected; (8) Allowing and assisting in managing changes to the pill regimen (schedule) or quantity to be dispensed remotely via internet enabled device; and (9) Insuring safe, continuous operation including a battery back-up power system. The system may also in some implementations include a locking mechanism to prevent unauthorized changes to the programming or removal of medication.

Accordingly, an aspect of the presently-described subject matter may, though not necessarily include providing an improved programmable automatic pill dispenser without the deficiencies and disadvantages of previous pill dispensing devices; specifically, to provide a simple and reliable programmable automatic pill dispenser that has one or more of the ability to provide each pill, as needed or desired, having been confirmed to match the prescription at time of loading, is dispensed per preset time(s), has a locking mechanism for security, and/or provides the necessary additional instructions during the dispensing to the user.

Still further objects and advantages may, though not necessarily, include one or more of: (a) providing a programmable automated pill dispenser that is capable of verifying the actual pill medication being loaded prior to placement in the device; (b) providing a programmable automated pill dispenser that has a system to select individual pills for dispensing per a programmable timetable; (c) providing a programmable automated pill dispenser with the capability of storing pills in a secure manner; (d) providing displaying of special instructions or messages associated with corresponding pills during the dispensing process; (e) providing a programmable automated pill dispenser with capability of alerting the user by visual and audio alarms to pill taking periods; (f) providing alerting of or to a third party, such as a caregiver or medical professional, when pills have not been dispensed, quantities stored are low or the device is malfunctioning; (g) providing for notifying a third party, such as a pharmacy, when quantity is low in regards to planned dispensing over a pre-set amount of time; (h) providing a programmable automatic pill dispenser that is simple to use, compact, and reliable including back-up battery operation; (i) providing a programmable automated pill dispenser with a pill storage bin and handling arrangement that can be easily removed as needed for medical and/or cleaning purposes; (j) providing a method of changing the pill quantity or schedule remotely via secure internet access; (k) providing a user initiated command for dispensing pills on an as needed basis; (l) providing a programmable automated pill dispenser that reduces the possibility of the pill taker taking an improper accumulation of dispensed pills which may result in an overdose; (m) providing software controls that prevent dispensing pills in such a way as to avoid an overdose.

Some other advantages of a dispenser hereof may, though not necessarily, include one or more of: (a) Pill storage bins which may be rotated for simple loading of the pills and as needed for the dispensing of pill(s); (b) Automated, non-removable, output dispensing cup for simple dispensing to the user; (c) Pill dispensing software which may prevent an accumulation of dispensed pills to eliminate the possibility of overdosing caused by the dispenser; (d) Refill tracking software which may provide messages to caregivers or pharmacies as needed for re-fills; (e) Remote setting of dispensing instructions via internet; (f) Remote setting of refill instructions for refilling pill storage bins.

The possible variations and ramifications of the present developments may be numerous. For example, additional levels of pill storage, pill handling and gate assemblies can be added to increase the number of unique pills serviced by the pill dispenser.

Another variation may be to remove the need for manual entry of pill information into the device by including a bar code reader for prescription and supplemental drug related information. Another variation may employ a voice recognition system or communication with or through the internet or other communication line for data stored with each pill.

A method may be included herein for automatically dispensing a verified, preselected pill and alerting a user to take said preselected pill at a preset time, comprising:

a. verification of pill identity with FDA/NIH databases;
b. avoiding unrecognized pill loading;
c. providing a programmable time table for presetting pill taking time periods;
d. programming said time table to transmit a signal at said preset time;
e. providing a method of input for pill data including one or more of Name of Doctor, Reason for Taking Medication, Contact Information for Doctor, Contact Information for Caregiver;
f. providing a series of movable storage and gate assemblies of pill storage compartments, each compartment of series being movable to a position for the extraction of a single pill;
g. a mechanical cam assembly that can remove a single pill from a preselected storage and gate assembly;
h. discharging a single pill by gravity from the end of a pill trough into a dispensing cup;
i. providing an actuator for automatically moving said storage and gate assembly into position with said dispensing cup assembly in response to signal from a user or programmable time table;
j. providing an audio and visual alarm to alert said user to take the pill(s) that is contained in the dispensing cup;
k. providing a message to a remote person such as a caregiver or medical professional regarding user's pill taking compliance;
l. providing a message to a remote person such as a caregiver or medical professional regarding the pill inventory status;
m. providing for continuous operation in the event of AC power failure;
n. providing for changing parameters related to the pill quantity and/or schedule by local or remote computer access;
o. providing storage of medications in a secure manner.

Alternatively included may be a web-enabled device that can be loaded with appropriate pills (solid oral medication) and programmed to automatically dispense the proper quantity of the proper type(s) of pill(s) at the proper time(s) each day. The device may include the following systems:

System for identifying pills prior to storage
- Pills can be identified by name or National Drug Code (NDC)

System for storing pills
- Identified pills are placed in the device and stored for later dispensing System for handling pills on an individual basis for dispensing (multiple implementations)
  Device is capable of dispensing pills in required quantities
System for programming pill schedules (regimens)
  Times can be set to dispense pills throughout each day
System for remote programming
  Password protected system allows remote changes to schedule (regimen) via internet web based and/or smart device
  Password protected system allows remote setup of system for proper refilling by user
System for alerting user
  Users are alerted to pill disbursement time with visual and audio alarms
System for notifying third-parties
  Third parties, such as caregivers and medical staff, can be notified by text and other electronic messages when pills are not taken, unit malfunctions, or refills are needed
System for electronic controls
  Control electronics ensure pills are located and handled properly
System for back-up power
  Device remains functional if there is an AC power source failure
Software controller with operating system Major components of the device may include, though not necessarily and not limited hereto: a rotary assembly 30 with storage and handling assemblies 40, mechanical cam and door or gate subassembly 50, a trough vibration shaker mechanism 49, storage bin and conveyor belt mechanism 44 and 46, control electronics 1100-1110, output dispensing cup assembly 70, scale assembly 80, back-up power storage assembly 1109, LED based visual alert circuit 1101, a WiFi internet connection system, and/or a 3G (and/or LTE, 4G, 5G) connection system.

Major process flow software components include may include, though not necessarily and not limited hereto: pill identification, prescription information data storage, programmable scheduling, user defined audio alert, cloud database storage capability, remote smart device application and/or web-based device and database controls.

One implementation of the developments hereof may include a method for dispensing one or more pills from a pill dispensing device comprising: attaching a pill storage bin, bottle, or other pill receptacle to a nozzle sub-assembly; rotating the nozzle sub-assembly greater than about 90° from the nozzle sub-assembly starting position; and delivering one or more pills from the pill storage bin, bottle, or receptacle to an end of a chute, or known location, that is cooperatively connected to the nozzle sub-assembly. The method may further include rotating the nozzle sub-assembly back to the nozzle sub-assembly starting position. The method may further include rotating one or more cams to lift, move, or propel a pill from the end of the chute, or the known position on to a scale sub-assembly, or scale. The method may further include weighing the one or more pills on the scale. The method may further include determining whether the proper one or more pills have been dispensed on to the scale. The method may further include swiping or sweeping one ore more pills to an output cup sub-assembly, or alternatively to a return tube that is cooperatively connected to the nozzle sub-assembly.

An alternative implementation of the developments hereof may include a pill dispenser, device, system, or method for delivering one or more pills comprising: collecting one or more pills in a pill receptacle area, bin, or bottle; rotating the pill receptacle area, bin, or bottle; moving the one or more pills from the receptacle area through a nozzle or funnel formation to a chute known location; delivering one or more pills from the chute known location to a delivery area; and rotating the pill receptacle, bin, or bottle back to a collecting disposition. This order of the operations are limited to the order provided herein. Moreover, an alternative implementation of the developments hereof may further include rotating the nozzle or funnel formation and chute concurrent with the rotating of the pill receptacle, bin, or bottle. Furthermore, in this implementation the rotating of the pill receptacle may include rotating a pill return connection or pill return tube, which may return a portion of the one or more pills to the pill receptacle area, bin, or bottle. Furthermore, in this implementation, the chute known location may include one ore more cams for lifting one or more pills from the known location and moving the one or more pills to the delivery area.

Another alternative implementation of the developments hereof includes an apparatus for delivering one or more pills comprising: a receptacle bin sub-assembly including a receptacle bin, the sub-assembly configured for collecting one or more pills in the pill receptacle bin; a rotational control sub-assembly including a rotational motor connected to the receptacle bin sub-assembly for rotating the pill receptacle area; a nozzle sub-assembly including a nozzle configured for connecting to the receptacle bin for receiving and passing the one or more pills from the receptacle bin through the nozzle; a chute sub-assembly including a chut and a chute known location connected to the nozzle sub-assembly for receiving one or more pills from the nozzle sub-assembly and moving the pill to the known location; a delivery sub-assembly for receiving one or more pills from the chute known location to then deliver the one or more pills to a final delivery position; and, the rotational control sub-assembly also providing for rotating the pill receptacle back to a collecting disposition. This implementation may also have a return tube cooperatively connected to the nozzle sub-assembly, having a collection area for collecting erroneous pills and a return tube having an internal opening connection to the nozzle sub-assembly configured for returning one or more erroneous pills to the receptacle bin. Furthermore, this alternative implementation may also have a delivery sub-assembly having one ore more pick-up members or cams, a door or shutter, and one or more cam sensors. Moreover, this implementation may also have a scale sub-assembly having a scale platform. Additionally, this implementation may also have a swiper sub-assembly cooperatively connected to a motor configured to move one or more pills to an output delivery cup, or the collection area of the return tube.

The components, whether of apparatus, system and/or method, described above are meant to exemplify some types of possibilities within the scope hereof. In no way should the aforementioned examples limit the scope of the invention and/or claimed subject matter, as they are only exemplary embodiments or implementations. While embodiments or implementations of the present invention and/or claimed subject matter relate to devices, systems, and/or methods, that have been described above, various alternatives, modifications, and equivalents will be apparent to those skilled in the art without varying from the spirit of the invention and/or claimed subject matter. Therefore, the above description should not be taken as limiting the scope of the invention or claimed subject matter, which is defined by the appended claims.

Other ramifications and variations of the basic concept which have not been described will be apparent to those skilled in the art. It is intended that all such ramifications and variations be included within the scope of the appended claims and their legal equivalents, and the scope of the invention not be limited by the examples given, or the claims hereof.

What is claimed is:

1. A system for dispensing one or more pills comprising:
- a pill storage bin configured for disposing one or more pills therewithin;
- a nozzle control sub-assembly including a rotational motor connected to the pill storage bin for rotating the pill storage bin;
- a nozzle sub-assembly including a nozzle configured for connecting to the pill storage bin for receiving and passing the one or more pills from the pill storage bin through the nozzle;
- a chute and a known location disposed as part of the nozzle sub-assembly for receiving one or more pills from the nozzle sub-assembly and moving the pill to the known location;
- a delivery sub-assembly for receiving one or more pills from the chute known location to then deliver the one or more pills to a final delivery position; and,
- a lifter for lifting a pill storage bin from a resting position and connecting the pill storage bin to the nozzle sub-assembly, comprising one or more of:
  - a motor;
  - a trapezoidal lead screw;
  - a trapezoidal lead nut; and
  - a platform.

2. A system for dispensing one or more pills according to claim 1, the nozzle sub-assembly having a return tube cooperatively connected to the nozzle sub-assembly.

3. A system for dispensing one or more pills according to claim 2, the return tube having a collection area for collecting erroneous pills and an internal opening connection to the nozzle sub-assembly configured for returning one or more erroneous pills to the pill storage bin.

4. A system for dispensing one or more pills according to claim 1, the nozzle sub-assembly further comprising:
- a conveyor belt motor;
- a conveyor belt for moving one or more pills to the chute.

5. A system according to claim 1 further comprising a scale sub-assembly further comprising one or more of:
- a scale platform;
- a swiper motor; and
- a pill swiper cooperatively connected to a swiper motor.

6. A system according to claim 1 further comprising, one or more of:
- a main controller and a motion controller, for one or more of:
  - initiating and controlling an input cover motor to open or close an input cover;
  - controlling the lifter;
  - lifting a platform of the lifter;
  - rotating the nozzle sub-assembly;
  - initiating and controlling one or more of: a conveyor belt, one or more cams, and/or a pill door;
  - receiving feedback or signal from one or more of: a cam sensor, an optical sensor, and/or a transmissive/slotted interrupter sensor;
  - receiving information from a scale;
  - initiating and controlling a swiper motor to move a swiper laterally;
  - initiating and controlling an output motor to move an output dispenser subassembly;
  - receiving feedback or signal from one or more of: an output dispenser in sensor or out sensor.

7. An apparatus according to claim 1 further comprising:
- a scale sub-assembly having a scale platform.

8. A system according to claim 1 comprising one or more of:
- a pill control sub-assembly comprising one or more pick-up members; and
- a housing;
- a frame sub-assembly;
- a rotational sub-assembly;
- a pill handling sub-assembly;
- a motor sub-assembly;
- a pill delivery sub-assembly;
- a scale sub-assembly;
- a sensor sub-assembly; and,
- a control system.

9. An apparatus for delivering one or more pills comprising:
- a pill storage bin, the pill storage bin configured for collecting one or more pills;
- a nozzle control sub-assembly including a rotational motor connected to the pill storage bin for rotating the pill storage bin;
- a nozzle sub-assembly including a nozzle configured for connecting to the pill storage bin for receiving and passing the one or more pills from the pill storage bin through the nozzle;
- a chute and a known location connected to the nozzle sub-assembly for receiving one or more pills from the nozzle sub-assembly and moving the pill to the known location;
- a delivery sub-assembly for receiving one or more pills from the known location to then deliver the one or more pills to a final delivery position; and,
- the nozzle control sub-assembly providing for rotating the pill storage bin back to a collecting disposition; and,
- a scale sub-assembly having a scale platform.

10. A system according to claim 9 further comprising a lifter for lifting a pill storage bin from a resting position and connecting the pill storage bin to the nozzle sub-assembly, comprising one or more of:
- a motor;
- a trapezoidal lead screw;
- a trapezoidal lead nut; and
- a platform.

11. An apparatus according to claim 9 further comprising a conveyor belt for moving one or more pills to the known location.

12. An apparatus of claim 9 further comprising:
- a plurality of pick-up members configured and disposed to pick up a pill at a known location;
- the pick-up members being movable to alternately not in contact with the pill at the known location, and then in contact with the pill at the known location, and then moving the pill from the known location.

13. An apparatus according to claim 12 further comprising one or both of:
- an openable gate; or,
- a chute having a lower end;
- either or both of which defining the known location or being operational to hold the pill at the known location.

14. An apparatus according to claim 13, wherein the chute has a slot at the known location, the slot being operationally disposed relative to the rotational pick-up members for the rotational pick up members to move therein so that the rotational pick-up members are rotatable to alternately not be in contact with the pill at the known location, and then in contact with the pill at the known location, and then moving the pill from the known location.

15. An apparatus according to claim 12 wherein the pick-up members are either non-rotational; or are one or more of rotational; off-center rotational pick-up members or otherwise-shaped rotational members so that the rotational pick-up members are movable to alternately be not in contact with the pill at the known location, and then in contact with the pill at the known location, and then disposed to move the pill from the known location.

16. An apparatus according to claim 12 further comprising one or both of:

an axle upon which a rotational pick-up members are disposed; the axle being rotatable and thereby imparting rotational motion to the rotational pick-up member; or an engaging surface disposed on each pick-up member; the engaging surface being configured to engage the pill at the known location to move the pill therefrom.

17. An apparatus of claim 12 further comprising a control system; the control system connected to and disposed to control the pick-up members.

18. An apparatus of claim 12 further comprising a sensor sub-assembly; the sensor sub-assembly having at least one sensor disposed to sense one or more pills at a location.

19. An apparatus according to claim 18 wherein one or more of:

the sensor sub-assembly provides a signal to a control system that one or more pills are at the known location;

the sensor sub-assembly provides a signal to a control system that one or more pills are in the chute;

the sensor sub-assembly provides a signal to a control system that provides one or more electrical or electronic signals to control the operation of the pick-up members;

the sensor sub-assembly provides a signal to the control system that provides one or more electrical or electronic signals to a pick-up members motor to control the operation of the pick-up members motor to one or both operate or dis-engageably engage the pick-up members and control operation thereof.

* * * * *